(12) United States Patent
Wengreen et al.

(10) Patent No.: US 10,479,319 B1
(45) Date of Patent: Nov. 19, 2019

(54) SELF-DRIVING VEHICLE SYSTEMS AND METHODS

(71) Applicant: DRIVENT LLC, Bellevue, WA (US)

(72) Inventors: Eric John Wengreen, Sammamish, WA (US); Wesley Edward Schwie, Minneapolis, MN (US)

( * ) Notice: Subject to any disclaimer, the term of this patent is extended or adjusted under 35 U.S.C. 154(b) by 0 days.

(21) Appl. No.: 16/524,110

(22) Filed: Jul. 28, 2019

Related U.S. Application Data

(63) Continuation-in-part of application No. 16/362,509, filed on Mar. 22, 2019, and a continuation of application No. 16/524,108, filed on Jul. 28, 2019.

(60) Provisional application No. 62/822,863, filed on Mar. 23, 2019, provisional application No. 62/821,524, filed on Mar. 21, 2019.

(51) Int. Cl.
| | |
|---|---|
| *B60R 25/01* | (2013.01) |
| *E05F 15/40* | (2015.01) |
| *E05F 15/72* | (2015.01) |
| *E05B 81/56* | (2014.01) |
| *B60K 35/00* | (2006.01) |
| *B60Q 5/00* | (2006.01) |
| *E05B 77/54* | (2014.01) |
| *G05D 1/00* | (2006.01) |
| *B60Q 9/00* | (2006.01) |

(52) U.S. Cl.
CPC ............ *B60R 25/01* (2013.01); *B60K 35/00* (2013.01); *B60Q 5/005* (2013.01); *B60Q 9/00* (2013.01); *E05B 77/54* (2013.01); *E05B 81/56* (2013.01); *E05F 15/40* (2015.01); *E05F 15/72* (2015.01); *G05D 1/0088* (2013.01); *B60K 2370/146* (2019.05); *B60K 2370/148* (2019.05); *B60K 2370/152* (2019.05); *B60K 2370/178* (2019.05); *B60K 2370/21* (2019.05); *E05Y 2400/30* (2013.01); *E05Y 2800/252* (2013.01); *E05Y 2900/531* (2013.01); *E05Y 2900/55* (2013.01)

(58) Field of Classification Search
CPC combination set(s) only.
See application file for complete search history.

(56) References Cited

U.S. PATENT DOCUMENTS

| | | |
|---|---|---|
| 4,212,069 A | 7/1980 | Baumann |
| 5,769,471 A | 6/1998 | Suzuki |
| 5,798,695 A | 8/1998 | Metalis |
| 5,871,063 A | 2/1999 | Young |

(Continued)

OTHER PUBLICATIONS

Google Self-Driving Vehicle—Online prior to Apr. 13, 2016 at www.google.com/selfdrivingcar/.

(Continued)

*Primary Examiner* — Travis R Hunnings

(57) ABSTRACT

A vehicle fire is an emergency in which seconds count. Each second saved until the rider exits the vehicle can significantly reduce the severity of injuries due to the fire. Accordingly, a safety system can include a self-driving vehicle configured to transport a rider, a vehicle management system configured to autonomously drive the self-driving vehicle, a seat coupled to the self-driving vehicle, and a seat belt configured to alternatively have a buckled state and an unbuckled state. In many embodiments, the safety system includes a smoke detection system coupled to the self-driving vehicle and configured to detect smoke inside a cabin of the self-driving vehicle.

26 Claims, 22 Drawing Sheets

(56) References Cited

U.S. PATENT DOCUMENTS

| | | |
|---|---|---|
| 5,945,919 A | 8/1999 | Trask |
| 5,960,523 A | 10/1999 | Husby |
| 5,986,420 A | 11/1999 | Kato |
| 6,011,478 A | 1/2000 | Suzuki |
| 6,081,088 A | 6/2000 | Ishihara |
| 6,530,251 B1 | 3/2003 | Dimig |
| 7,093,515 B2 | 8/2006 | Yamanoi |
| 7,298,250 B2 | 11/2007 | Inoue |
| 7,413,357 B2 | 8/2008 | Badalian |
| 7,698,078 B2 | 4/2010 | Kelty |
| 7,777,619 B2 | 8/2010 | Yopp |
| 7,999,701 B1 | 8/2011 | Xu |
| 8,078,359 B2 | 12/2011 | Small |
| 8,180,379 B2 | 5/2012 | Forstall |
| 8,255,124 B2 | 8/2012 | Van Houten |
| 8,325,025 B2 | 12/2012 | Morgan |
| 8,433,934 B1 | 4/2013 | On |
| 8,634,980 B1 | 1/2014 | Urmson |
| 8,686,844 B1 | 4/2014 | Wine |
| 8,700,251 B1 | 4/2014 | Zhu |
| 8,818,608 B2 | 8/2014 | Cullinane |
| 8,849,494 B1 | 9/2014 | Herbach |
| 8,874,305 B2 | 10/2014 | Dolgov |
| 8,948,993 B2 | 2/2015 | Schulman |
| 8,949,016 B1 | 2/2015 | Ferguson |
| 8,954,217 B1 | 2/2015 | Montemerlo |
| 8,954,252 B1 | 2/2015 | Urmson |
| 8,965,621 B1 | 2/2015 | Urmson |
| 8,996,224 B1 | 3/2015 | Herbach |
| 9,008,890 B1 | 4/2015 | Herbach |
| 9,019,107 B2 | 4/2015 | Biondo |
| 9,026,300 B2 | 5/2015 | Ferguson |
| 9,119,038 B2 | 8/2015 | Woods |
| 9,120,484 B1 | 9/2015 | Ferguson |
| 9,120,485 B1 | 9/2015 | Dolgov |
| 9,139,133 B2 | 9/2015 | Eng |
| 9,194,168 B1 | 11/2015 | Lu |
| 9,262,914 B2 | 2/2016 | Purushothaman |
| 9,272,713 B1 | 3/2016 | Dvoskin |
| 9,290,174 B1 | 3/2016 | Zagorski |
| 9,429,947 B1 | 8/2016 | Wengreen |
| 9,459,622 B2 | 10/2016 | Abhyanker |
| 9,514,623 B1 | 12/2016 | Urrutia |
| 9,527,217 B1 | 12/2016 | Lowy |
| 9,562,785 B1 | 2/2017 | Racah |
| 9,646,326 B2 | 5/2017 | Goralnick |
| 9,646,356 B1 | 5/2017 | Schwie |
| 9,685,058 B2 | 6/2017 | Schmidt |
| 9,701,307 B1 | 7/2017 | Newman |
| 9,733,096 B2 | 8/2017 | Colijn |
| 9,894,484 B1 | 2/2018 | Pao |
| 9,915,949 B2 | 3/2018 | Schwie |
| 9,916,703 B2 | 3/2018 | Levinson |
| 9,953,283 B2 | 4/2018 | Sweeney |
| 9,953,539 B1 | 4/2018 | Gkiotsalitis |
| 10,036,642 B2 | 7/2018 | Ross |
| 10,050,760 B2 | 8/2018 | Ross |
| 10,082,789 B1 | 9/2018 | Szybalski |
| 10,093,324 B1 | 10/2018 | Szybalski |
| 10,115,029 B1 | 10/2018 | Day |
| 10,127,795 B1 | 11/2018 | Hwang |
| 10,176,517 B2 | 1/2019 | Goralnick |
| 10,223,844 B1* | 3/2019 | Schwie .................. G07C 5/008 |
| 10,240,938 B1 | 3/2019 | Wengreen |
| 10,255,648 B2 | 4/2019 | Wengreen |
| 10,268,192 B1 | 4/2019 | Wengreen |
| 10,274,950 B1 | 4/2019 | Wengreen |
| 10,282,625 B1* | 5/2019 | Wengreen .......... G06K 9/00845 |
| 10,286,908 B1 | 5/2019 | Wengreen |
| 10,289,922 B1 | 5/2019 | Wengreen |
| 10,299,216 B1 | 5/2019 | Wengreen |
| 2002/0077876 A1 | 6/2002 | O'Meara |
| 2002/0121291 A1 | 9/2002 | Daum |
| 2003/0195696 A1 | 10/2003 | Jones |
| 2003/0214585 A1 | 11/2003 | Bakewall |
| 2004/0068354 A1 | 4/2004 | Tabe |
| 2004/0076280 A1 | 4/2004 | Ando |
| 2004/0219933 A1 | 11/2004 | Faith |
| 2005/0156726 A1* | 7/2005 | Rubel .................. B60R 22/48 340/457.1 |
| 2007/0096447 A1 | 5/2007 | Tabe |
| 2007/0132567 A1* | 6/2007 | Schofield ............... B60C 23/00 340/438 |
| 2007/0198144 A1 | 8/2007 | Norris |
| 2008/0030906 A1 | 2/2008 | Sato |
| 2008/0144944 A1 | 6/2008 | Breed |
| 2009/0140886 A1 | 6/2009 | Bender |
| 2009/0287367 A1 | 11/2009 | Salinger |
| 2010/0169199 A1 | 7/2010 | Fuller |
| 2011/0059341 A1* | 3/2011 | Matsumoto ........ B60H 1/00278 429/82 |
| 2011/0098017 A1 | 4/2011 | Berry |
| 2011/0267186 A1 | 11/2011 | Rao |
| 2012/0009845 A1 | 1/2012 | Schmelzer |
| 2012/0083960 A1 | 4/2012 | Zhu |
| 2012/0158251 A1 | 8/2012 | Van Houtan |
| 2013/0085817 A1 | 4/2013 | Pinkus |
| 2013/0132140 A1 | 5/2013 | Amin |
| 2013/0138460 A1 | 5/2013 | Schumann, Jr. |
| 2013/0197674 A1 | 8/2013 | Lowry |
| 2013/0231824 A1 | 9/2013 | Wilson |
| 2013/0246301 A1 | 9/2013 | Radhakrishnan |
| 2013/0335213 A1 | 12/2013 | Sherony |
| 2014/0129132 A1 | 5/2014 | Yoshizu |
| 2014/0129951 A1 | 5/2014 | Amin |
| 2014/0172727 A1 | 6/2014 | Abhyanker |
| 2014/0207541 A1 | 7/2014 | Nerayoff |
| 2014/0253314 A1 | 9/2014 | Rambadt |
| 2014/0316616 A1 | 10/2014 | Kugelmass |
| 2014/0336935 A1 | 11/2014 | Zhu |
| 2014/0350855 A1 | 11/2014 | Vishnuvajhala |
| 2015/0012833 A1 | 1/2015 | Foy |
| 2015/0046080 A1 | 2/2015 | Wesselius |
| 2015/0066284 A1 | 3/2015 | Yopp |
| 2015/0088421 A1 | 3/2015 | Foster |
| 2015/0120504 A1 | 4/2015 | Todasco |
| 2015/0148077 A1 | 5/2015 | Jelle |
| 2015/0149283 A1 | 5/2015 | Horstemeyer |
| 2015/0185034 A1 | 7/2015 | Abhyanker |
| 2015/0199619 A1 | 7/2015 | Ichinose |
| 2015/0248689 A1 | 9/2015 | Paul |
| 2015/0271290 A1 | 9/2015 | Tao |
| 2015/0295949 A1 | 10/2015 | Chizeck |
| 2015/0339923 A1 | 11/2015 | Konig |
| 2015/0339928 A1 | 11/2015 | Ramanujam |
| 2015/0346727 A1 | 12/2015 | Ramanujam |
| 2015/0348221 A1 | 12/2015 | Pedersen |
| 2016/0027306 A1 | 1/2016 | Lambert |
| 2016/0027307 A1 | 1/2016 | Abhyanker |
| 2016/0034828 A1 | 2/2016 | Sarawgi |
| 2016/0034845 A1 | 2/2016 | Hiyama |
| 2016/0046261 A1 | 2/2016 | Gulash |
| 2016/0071056 A1 | 3/2016 | Ellison |
| 2016/0092976 A1 | 3/2016 | Marusyk |
| 2016/0116293 A1 | 4/2016 | Grover |
| 2016/0125735 A1 | 5/2016 | Tuukkanen |
| 2016/0140835 A1 | 5/2016 | Smith |
| 2016/0129880 A1 | 6/2016 | Cuddihy |
| 2016/0182170 A1 | 6/2016 | Daoura |
| 2016/0187150 A1 | 6/2016 | Sherman |
| 2016/0209220 A1 | 7/2016 | Laetz |
| 2016/0209843 A1 | 7/2016 | Meuleau |
| 2016/0216130 A1 | 7/2016 | Abramson |
| 2016/0227193 A1 | 8/2016 | Osterwood |
| 2016/0247095 A1 | 8/2016 | Scicluna |
| 2016/0247106 A1 | 8/2016 | Dalloro |
| 2016/0247109 A1 | 8/2016 | Scicluna |
| 2016/0264021 A1 | 9/2016 | Gillett |
| 2016/0277560 A1 | 9/2016 | Gruberman |
| 2016/0301698 A1 | 10/2016 | Katara |
| 2016/0339928 A1 | 11/2016 | Mankin |
| 2016/0342934 A1 | 11/2016 | Michalik |
| 2016/0360382 A1 | 12/2016 | Gross |
| 2016/0364812 A1 | 12/2016 | Cao |

(56) References Cited

U.S. PATENT DOCUMENTS

| | | |
|---|---|---|
| 2016/0364823 A1 | 12/2016 | Coa |
| 2016/0370194 A1 | 12/2016 | Colijn |
| 2017/0024393 A1 | 1/2017 | Choksi |
| 2017/0050321 A1 | 2/2017 | Look |
| 2017/0068245 A1 | 3/2017 | Scofield |
| 2017/0075358 A1 | 3/2017 | Zhang |
| 2017/0089715 A1 | 3/2017 | Guo |
| 2017/0090480 A1 | 3/2017 | Ho |
| 2017/0103490 A1 | 4/2017 | Haparnas |
| 2017/0127215 A1 | 5/2017 | Khan |
| 2017/0129399 A1 | 5/2017 | Appukutty |
| 2017/0132540 A1 | 5/2017 | Haparnas |
| 2017/0144774 A1 | 5/2017 | Pollard |
| 2017/0147951 A1 | 5/2017 | Meyer |
| 2017/0147959 A1 | 5/2017 | Sweeney |
| 2017/0169535 A1 | 6/2017 | Tolkin |
| 2017/0213165 A1 | 7/2017 | Stauffer |
| 2017/0248949 A1 | 8/2017 | Moran |
| 2017/0248950 A1 | 8/2017 | Moran |
| 2017/0256147 A1 | 9/2017 | Shanahan |
| 2017/0277191 A1 | 9/2017 | Fairfield |
| 2017/0300053 A1 | 10/2017 | Wengreen |
| 2017/0301220 A1 | 10/2017 | Jarrell |
| 2017/0313321 A1 | 11/2017 | Jefferies |
| 2017/0316516 A1 | 11/2017 | Goldman-Shenhar |
| 2017/0316533 A1 | 11/2017 | Goldman-Shenhar |
| 2017/0316621 A1 | 11/2017 | Jefferies |
| 2017/0327082 A1 | 11/2017 | Kamhi |
| 2017/0337437 A1 | 11/2017 | Kanagaraj |
| 2017/0344010 A1 | 11/2017 | Rander |
| 2017/0352250 A1 | 12/2017 | de Barros Chapiewski |
| 2017/0357973 A1 | 12/2017 | Van Os |
| 2017/0363430 A1 | 12/2017 | Al-Dahle |
| 2017/0365030 A1 | 12/2017 | Shoham |
| 2017/0372394 A1 | 12/2017 | Chan |
| 2017/0372431 A1 | 12/2017 | Perl |
| 2018/0060778 A1 | 3/2018 | Guo |
| 2018/0061242 A1 | 3/2018 | Bavar |
| 2018/0075565 A1 | 3/2018 | Myers |
| 2018/0096601 A1 | 4/2018 | Chow |
| 2018/0108103 A1 | 4/2018 | Li |
| 2018/0109934 A1 | 4/2018 | Grube |
| 2018/0115924 A1 | 4/2018 | Harris |
| 2018/0126960 A1 | 5/2018 | Reibling |
| 2018/0130161 A1 | 5/2018 | Wengreen |
| 2018/0137693 A1* | 5/2018 | Raman ............... G07C 5/008 |
| 2018/0156625 A1 | 6/2018 | Mangal |
| 2018/0157268 A1 | 6/2018 | Mangal |
| 2018/0189717 A1 | 7/2018 | Cao |
| 2018/0191596 A1 | 7/2018 | Bhaya |
| 2018/0196417 A1 | 7/2018 | Iagnemma |
| 2018/0211540 A1 | 7/2018 | Bedegi |
| 2018/0211541 A1 | 7/2018 | Rakah |
| 2018/0220189 A1 | 8/2018 | Hodge |
| 2018/0225749 A1 | 8/2018 | Shoen |
| 2018/0225890 A1 | 8/2018 | Jales Costa |
| 2018/0300816 A1 | 10/2018 | Perl |
| 2018/0356239 A1 | 12/2018 | Marco |
| 2018/0357907 A1 | 12/2018 | Reiley |
| 2019/0035277 A1 | 1/2019 | Son |

OTHER PUBLICATIONS

Tesla Autopilot—Online prior to Apr. 13, 2016 at www.technologyreview.com/s/600772/10-breakthrough-technologies-2016-tesla-autopilot/.
Tesla Model S Software Version 7—Autopilot—Online prior to Apr. 13, 2016 at www.teslamotors.com/presskit/autopilot.
BMW Heads Up Display—Online prior to Apr. 13, 2016 at www.autotrader.com/car-news/full-color-heads-up-display-to-debut-on-new-3-series-132586.
Uber Details—Online prior to Apr. 13, 2016 at www.wikihow.com/Use-Uber.
Raspberry Pi: How can I detect the direction of a sound—Online prior to Apr. 13, 2016 at www.quora.com/Raspberry-Pi-1/How-can-I-detect-the-direction-of-a-sound.
Wikipedia: Biometric Device—Downloaded on Aug. 19, 2016 from en.wikipedia.org/wiki/Biometric_device.
Self-Driving Cars Go Public; Uber Offers Rides in Pittsburgh—Downloaded on Aug. 19, 2016 from www.yahoo.com/news/uber-autonomous-cars-haul-people-125127470.html?ref=gs.
Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.
Zach Epstein, You'll be riding in self-driving cars as soon as next year, May 6, 2016, BGR.com, http://bgr.com/2016105'06/lyfl-self-driving-cars-2017/, pp. 1-5.
Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4.
Explain That Stuff: Smoke Detectors—Downloaded on Sep. 28, 2018 from www.explainthatstuff.com/smokedetector.html.
Nittan: EV-DP Smoke Detector—Downloaded on Sep. 28, 2018 from nittan.co.uk/products/products/ev/ev-dp.
Nikipedia: Rain Sensor—Downloaded on Sep. 28, 2018 from en.wikipedia.org/wiki/Rain_sensor.
Nest: Split-Spectrum White Paper—Downloaded on Oct. 1, 2018 from nest.com/support/images/misc-assets/Split-Spectrum-Sensor-White-Paper.pdf.
How Police Visually Detect Drunk Drivers—Downloaded on Oct. 19, 2018 from thelaw.com/law/how-police-visually-detect-drunk-drivers.185.
Velodyne VLS-128 LiDAR Sensor—Downloaded on Oct. 22, 2018 from velodynelidar.com/vls-128.html.
Waymo's Suite of Custom-Built, Self-Driving Hardware—Downloaded on Oct. 22, 2018 from medium.com/waymo/introducing-waymos-suite-of-custom-built-self-driving-hardware-c47d1714563.
Lidar—Downloaded on Oct. 24, 2018 from en.wikipedia.org/wiki/Lidar.
Radar—Downloaded on Oct. 24, 2018 from en.wikipedia.org/wiki/Radar.
Assisted GPS—Downloaded on Nov. 19, 2018 from lifewire.com/assisted-gps-1683306.
How GPS Works—Downloaded on Nov. 19, 2018 from lifewire.com/iphone-gps-set-up-1683393.
Indoor Positioning System—Downloaded on Nov. 19, 2018 from en.wikipedia.org/wiki/Indoor_positioning_system.
LTE—Downloaded on Nov. 27, 2018 from en.wikipedia.org/wiki/LTE_(telecommunication).
OTDOA—Downloaded on Nov. 27, 2018 from en.wikipedia.org/wiki/OTDOA.
Ping for Beginners—Downloaded on Jan. 30, 2019 from https://social.technet.microsoft.com/wiki/contents/articles/30110.ping-for-beginners.aspx.
How Power Door Locks Work—Downloaded on Jul. 16, 2019 from https://auto.howstuffworks.com/power-door-lock.htm/printable.

* cited by examiner

SELF-DRIVING VEHICLE SYSTEMS AND METHODS

CROSS-REFERENCE TO RELATED APPLICATIONS

The entire contents of the following application are incorporated by reference herein: U.S. patent application Ser. No. 16/134,190 (issued as U.S. Pat. No. 10,289,922); filed Sep. 18, 2018; and entitled SELF-DRIVING VEHICLE SYSTEMS AND METHODS.

The entire contents of the following application are incorporated by reference herein: U.S. patent application Ser. No. 16/148,940 (issued as U.S. Pat. No. 10,223,844); filed Oct. 1, 2018; and entitled SELF-DRIVING VEHICLE SYSTEMS AND METHODS.

The entire contents of the following application are incorporated by reference herein: U.S. patent application Ser. No. 16/230,410 (issued as U.S. Pat. No. 10,282,625); filed Dec. 21, 2018; and entitled SELF-DRIVING VEHICLE SYSTEMS AND METHODS.

The entire contents of the following application are incorporated by reference herein: U.S. Patent Application No. 62/782,887; filed Dec. 20, 2018; and entitled SELF-DRIVING VEHICLE SYSTEMS AND METHODS.

The entire contents of the following application are incorporated by reference herein: U.S. Patent Application No. 62/821,524; filed Mar. 21, 2019; and entitled SELF-DRIVING VEHICLE SYSTEMS AND METHODS.

The entire contents of the following application are incorporated by reference herein: U.S. Patent Application No. 62/822,863; filed Mar. 23, 2019; and entitled SELF-DRIVING VEHICLE SYSTEMS AND METHODS.

The entire contents of the following application are incorporated by reference herein: U.S. patent application Ser. No. 16/362,509; filed Mar. 22, 2019; and entitled SELF-DRIVING VEHICLE SYSTEMS AND METHODS.

BACKGROUND

Field

Various embodiments disclosed herein relate to vehicles. Certain embodiments relate to self-driving vehicles.

Description of Related Art

Vehicles typically require a driver. These vehicles often can only perform actions when directly steered by the driver. However, self-driving vehicles are not reliant upon drivers and can perform actions based upon particular events. Self-driving vehicles can dramatically increase travel safety and convenience. As a result, there is a need for systems and methods that enable self-driving vehicles to perform actions based upon particular events.

SUMMARY

Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles have unlimited attention spans and can process complex sensor data nearly instantaneously. The ability of self-driving vehicles to save lives is so impressive that society has a moral imperative to develop self-driving technology such that it can be widely adopted.

Self-driving vehicles also have the ability to dramatically save time and improve convenience in roadway travel. Specifically, self-driving vehicles have unlimited potential to learn and predict human behavior and perform actions accordingly. Some embodiments enable a self-driving vehicle to monitor human activity and predict when and where the human will be located and whether the human needs a ride from the self-driving vehicle. Self-driving vehicles will be able to perform such tasks with incredible efficacy and accuracy that will allow self-driving vehicles to proliferate at a much faster rate than would otherwise be the case.

Some embodiments comprise a maintenance system configured to be used with a self-driving vehicle. In some embodiments, maintenance systems comprise a camera system coupled to an interior of the vehicle. The camera system can be configured to take a picture of an item left behind by a first rider. Maintenance systems can comprise a vehicle management system configured to autonomously drive the vehicle to a first location to remove the item.

In some embodiments, the camera system comprises a first camera coupled to a ceiling of the vehicle and directed towards a first row of the vehicle, and the camera system comprises a second camera coupled to the ceiling of the vehicle and directed towards a second row of the vehicle.

In some embodiments, the camera system comprises a first camera coupled to a rear-view mirror of the vehicle and directed towards a first row of the vehicle, and the camera system comprises a second camera coupled to a ceiling of the vehicle and directed towards a second row of the vehicle.

In some embodiments, the camera system comprises a first camera located in a trunk area of the vehicle such that the first camera is configured to enable an image analysis system to determine if the item is left in the trunk area.

In some embodiments, the maintenance system comprises an image analysis system configured to detect the item left behind by comparing a first baseline image taken by the camera system of the interior of the vehicle to a second image taken by the camera system after the first baseline image.

In some embodiments, the vehicle management system is configured to automatically drive the vehicle to the first location to remove the item in response to the image analysis system detecting the item left by the first rider.

Some embodiments comprise a communication system configured to send a first wireless communication to a remote computing device associated with the first rider in response to the image analysis system detecting the item left behind by the first rider. The first wireless communication can be configured to notify the first rider that the item was left behind.

In some embodiments, the communication system is configured to send a second wireless communication comprising a third image of the item to the remote computing device in response to the image analysis system detecting the item left behind by the first rider. The third image can enable the rider to see the item on a display of her remote computing device.

In some embodiments, the vehicle management system is configured to receive an address of the first location from the remote computing device in response to the communication system sending the first wireless communication.

In some embodiments, the first location is an address at which the first rider has requested to pick up the item. The address can be the rider's current address. The address can also be a location at which the rider is not currently located by at which the rider (or the rider's representative) plans to meet the vehicle (or another vehicle carrying the item) to retrieve the item.

In some embodiments, the communication system is configured to receive a third wireless communication from the remote computing device associated with the first rider in response to the communication system sending the first wireless communication. The third wireless communication can comprise instructions for shipping the item.

In some embodiments, the first location is a shipping location (such as a FedEx, UPS, or USPS facility) configured to remove the item from the vehicle and configured to ship the item according to the shipping instructions. The vehicle management system can be configured to enable removing the item from the vehicle once the vehicle is located at the shipping location.

In some embodiments, the vehicle management system is configured to receive the first location of a service area configured to clean the vehicle. The vehicle management system can be configured to drive the vehicle to the service area to remove the item in response to the image analysis system detecting the item left by the first rider.

Some embodiments comprise a third image taken by the camera system in response to the vehicle leaving the service area. Some embodiments comprise a communication system configured to send a first wireless communication comprising the third image to a remote computing device associated with a manager of the vehicle. The first wireless communication can be configured to enable the manager to verify that the item was removed from the vehicle.

Some embodiments comprise a third image taken by the camera system. The image analysis system can be configured to compare the third image to the second image to detect that the item was removed from the vehicle.

In some embodiments, the vehicle management system is configured to fine an account of the first rider in response to the image analysis system detecting the item left behind by the first rider.

In some embodiments, a communication system is configured to send a first wireless communication to a remote computing device associated with the first rider in response to the image analysis system detecting the item left behind by the first rider. The first wireless communication can comprise a third image taken by the camera system. The third image can be configured to show the item. The first wireless communication can be configured to ask the first rider if the item belongs to the first rider. The communication system can be configured to receive a second wireless communication from the remote computing device in response to the first wireless communication. The second wireless communication can be configured to inform the maintenance system that the first rider is an owner of the item. The maintenance system can comprise a memory configured to record that the first rider is the owner of the item.

In some embodiments, the maintenance system comprises a location detection system configured to receive the first location of a remote computing device associated with the first rider to enable the vehicle management system to autonomously drive the vehicle to the first location in response to an image analysis system detecting the item left by the first rider.

In some embodiments, the maintenance system comprises an image analysis system configured to detect the item left behind by comparing a first baseline image taken by the camera system of the interior of the vehicle to a second image (of the interior) taken by the camera system after the first baseline image.

In some embodiments, the maintenance system comprises a communication system having an antenna, a transmitter, and a receiver. The communication system can be configured to send a first wireless communication to a remote computing device associated with a manager of the vehicle in response to the image analysis system detecting the item left behind by the first rider.

In some embodiments, the first wireless communication is configured to notify the manager that the item was left behind. The communication system can be configured to send a second wireless communication comprising a third image of the item to the remote computing device in response to the image analysis system detecting the item left behind by the first rider.

In some embodiments, the vehicle management system is configured to receive a third wireless communication from the remote computing device in response to the communication system sending the first wireless communication. The third second wireless communication can be configured to instruct the vehicle management system to autonomously drive the vehicle to the first location to remove the item.

In some embodiments, the vehicle management system is configured to determine that the first rider has exited the vehicle. The vehicle management system can be configured to cause the camera system to take a first interior image of the interior of the vehicle in response to determining that the first rider has exited the vehicle.

In some embodiments, the maintenance system further comprises an image analysis system having at least one processor and a memory comprising program instructions (e.g., code modules configured to be executed by one or more computers) that when executed by the at least one processor are configured to cause the image analysis system to detect the item left behind by analyzing the first interior image taken by the camera system after the first rider has exited the vehicle. The first location can be a vehicle cleaning facility. The vehicle management system can be configured to drive the vehicle to the vehicle cleaning facility to remove the item in response to the image analysis system detecting the item.

In some embodiments, the vehicle management system comprises a first mode and a second mode. In the first mode, the vehicle management system can be configured to make the vehicle available to accept a pick-up request of a second rider. In the second mode, the vehicle management system can be configured to make the vehicle unavailable to accept the pick-up request. The vehicle management system can be configured to be in the second mode from a first time at which the image analysis system detects the item left behind. The vehicle management system can be configured to exit the second mode and enter the first mode in response to at least one of the item being removed, receiving an indication that the vehicle has been cleaned, and the vehicle leaving a vehicle cleaning station.

In some embodiments, the vehicle management system is configured to determine that the first rider has exited the vehicle in response to (1) receiving a location of a remote computing device associated with the first rider and determining that the location is not inside the vehicle, (2) failing to detect a direct wireless communication from the remote computing device to an antenna of the vehicle, (3) determining, by the image analysis system, that a second interior image does not show the first rider, and/or (4) determining, by the image analysis system, that an infrared image of the interior of the vehicle does not show the first rider.

In some embodiments, the maintenance system comprises at least one processor and a memory comprising program instructions that when executed by the at least one processor cause the maintenance system to (1) compare a first baseline image taken by the camera system of the interior of the vehicle to a second image taken by the camera system after the first baseline image to detect the item left behind by the first rider, and/or (2) drive, by the vehicle management system, the vehicle to the first location to remove the item in response to the detecting the item. The program instructions can comprise code modules configured to be executed by one or more computers located in the vehicle and/or located away from the vehicle.

In some embodiments, the first location is a first vehicle cleaning facility. The program instructions can be configured to select the first vehicle cleaning facility based at least in part on determining a distance from the vehicle to the first vehicle cleaning facility and/or based at least in part on determining that the first vehicle cleaning facility is approved by a manager of the vehicle. The memory can comprise a list of vehicle cleaning facilities that were approved by the manager of the vehicle. The program instructions can be configured to choose a cleaning facility that was previously approved by the manager and is located near the current location of the vehicle.

In some embodiments, the program instructions are configured to send a first wireless communication to a remote computing device associated with the first rider in response to detecting the item. The first wireless communication can comprise an image of the item. The program instructions can be configured to receive a second wireless communication from the remote computing device in response to sending the first wireless communication. The second wireless communication can comprise an instruction (e.g., from the first rider) to return the item. The program instructions can be configured to drive, by the vehicle management system, the vehicle to the first location in response to the instruction.

Some embodiments comprise a maintenance system configured to be used with a self-driving vehicle. A maintenance system can comprise a smoke detection system configured to detect smoke inside a cabin of the vehicle; a communication system configured to send a first wireless communication to a remote computing device associated with a manager of the vehicle in response to the smoke detection system detecting the smoke; and/or a vehicle management system configured to autonomously drive the vehicle.

In some embodiments, a maintenance system comprises a memory having an identification of a first rider of the vehicle. The communication system can comprise an antenna, a transmitter, and/or a receiver. The communication system can be configured to send the identification of the first rider to the remote computing device of the manager in response to the smoke detection system detecting the smoke inside the vehicle.

In some embodiments, a maintenance system comprises a camera system coupled to an interior of the vehicle. The camera system can be configured to take a picture of a first rider smoking. The communication system can be configured to send the picture of the first rider smoking to the remote computing device.

In some embodiments, the camera system comprises a first camera directed towards a first row of the vehicle. The first camera can be configured to take the picture in response to the smoke detection system detecting the smoke inside the vehicle.

In some embodiments, the smoke detection system comprises a camera system and an image analysis system configured to detect the smoke inside the vehicle by comparing a first baseline image taken by the camera system of an interior of the vehicle to a second image taken by the camera system (of the interior of the vehicle) after the first baseline image.

In some embodiments, the smoke detection system comprises an ionization smoke detector configured to detect cigarette smoking. The smoke detection system can also comprise an optical smoke detector configured to detect electronic cigarette aerosol by analyzing a particle size of the aerosol and determining that the particle size is indicative of electronic cigarette use.

In some embodiments, the smoke detection system comprises at least one optical smoke detector configured to analyze a particle size of the smoke. The communication system is configured to send the first wireless communication identifying the smoke as an aerosol in response to the smoke detection system determining that the particle size is greater than a predetermined threshold. The communication system can be configured to send the first wireless communication identifying the smoke as cigarette smoking in response to the smoke detection system determining that the particle size is less than the predetermined threshold.

In some embodiments, a camera system is coupled to an interior of the vehicle. The camera system can be configured to take a picture of a first rider smoking. The communication system can be configured to send the picture of the first rider smoking to the remote computing device. The first wireless communication can be configured to enable the remote computing device to display the picture of the first rider smoking and to display an indication of whether the smoke is due to the aerosol or the cigarette smoking.

In some embodiments, the vehicle management system comprises a motor configured to roll down a window of the vehicle. The vehicle management system can be configured to use the motor to automatically roll down the window in response to the smoke detection system detecting the smoke inside the vehicle.

In some embodiments, the vehicle management system comprises a ventilation system having a fan to push air in the cabin. The fan can be located inside the dash of the vehicle such that the fan pushes air in the cabin by pushing air through a vent and into the cabin. The vehicle management system can be configured to automatically increase a rate at which the ventilation system pushes outside air into the cabin of the vehicle in response to the smoke detection system detecting the smoke inside the vehicle. In several embodiments, the rate is increased by increasing a rotational speed of the fan.

In some embodiments, the vehicle management system comprises a temperature management system having a thermometer and having at least one of an air conditioner, a heater, and a ventilation system having a fan to circulate air in the cabin. The fan can be located inside a vent inside the dash of the vehicle such that the fan is configured to circulate air in the cabin by pushing air out from a vent. The vehicle management system can be configured to at least one of increase and decrease an ambient temperature inside the cabin by at least ten degrees Fahrenheit in response to the smoke detection system detecting the smoke inside the vehicle to decrease a comfort level of a first rider.

In some embodiments, the vehicle management system is configured to decrease an ambient temperature inside the cabin by at least ten degrees Fahrenheit and/or by at least twenty degrees Fahrenheit in response to the smoke detection system detecting the smoke inside the vehicle to decrease a comfort level of a first rider. The vehicle management system can be configured to increase an ambient temperature inside the cabin by at least ten degrees Fahrenheit and/or by at least twenty degrees Fahrenheit in response to the smoke detection system detecting the smoke inside the vehicle to decrease a comfort level of a first rider.

In some embodiments, the vehicle management system is configured to determine a local speed limit and is configured to automatically reduce a speed of the vehicle below the local speed limit in response to the smoke detection system detecting the smoke inside the vehicle. Some embodiments include reducing the speed so much that the vehicle stops (e.g., such that the vehicle is parked). The vehicle management system can be configured to determine a suitable parking location in response to the smoke detection system detecting the smoke inside the vehicle, and the vehicle management system can be configured to park the vehicle in the parking location in response to the smoke detection system detecting the smoke inside the vehicle.

In some embodiments, the vehicle management system comprises a speaker. The speaker can be configured to emit audio commands instructing a first rider of the vehicle to cease smoking in order to cause the vehicle management system to increase the speed and/or start moving again after being stopped in a parking location.

In some embodiments, the vehicle is configured to drive a first rider to a destination selected by the first rider. The vehicle management system can be configured to cease driving towards the destination in response to the smoke detection system detecting the smoke inside the vehicle. The vehicle management system can be configured to continue driving towards the destination in response to the smoke detection system no longer detecting the smoke inside the vehicle.

In some embodiments, the vehicle management system is configured to fine an account of a first rider of the vehicle in response to the smoke detection system detecting the smoke inside the vehicle. The smoke detection system can be configured to analyze a particle size of the smoke to determine if the particle size is larger than a predetermined threshold. The vehicle management system can be configured to fine the account a first amount if the particle size is larger than the predetermined threshold. The vehicle management system can be configured to fine the account a second amount if the particle size is smaller than the predetermined threshold. The second amount can be larger than the first amount and/or at least 20 percent larger than the first amount.

In some embodiments, the vehicle management system comprises a lighting system having at least one light coupled to an interior of the vehicle. The lighting system can be configured to illuminate at least one of a seat of the vehicle and a majority of the cabin. The vehicle management system can be configured to use the lighting system to illuminate at least one of the seat and the majority of the cabin in response to the smoke detection system detecting the smoke inside the vehicle.

In some embodiments, the vehicle management system comprises a speaker. The speaker can be configured to emit audio commands instructing a first rider of the vehicle to cease smoking. The vehicle management system can be configured to cease illuminating the majority of the cabin in response to the smoke detection system no longer detecting the smoke inside the vehicle.

In some embodiments, the vehicle management system is configured to receive a first location of a service area configured to clean the vehicle. The vehicle management system can be configured to drive the vehicle to the service area in response to the smoke detection system detecting the smoke inside the vehicle.

In some embodiments, the smoke detection system is configured to detect the smoke emitted by a first rider while the vehicle is driving to a drop off location of the first rider. The vehicle management system can comprise a first mode and a second mode. In the first mode, the vehicle management system is configured to make the vehicle available to accept a pick-up request of a second rider. In the second mode, the vehicle management system is configured to make the vehicle unavailable to accept the pick-up request. The vehicle management system can be configured to enter the second mode in response to the smoke detection system detecting the smoke inside the vehicle. The vehicle management system can be configured to exit the second mode and enter the first mode in response to at least one of receiving an indication that the vehicle has been cleaned and the vehicle leaving a vehicle cleaning station.

In some embodiments, the vehicle management system comprises a ventilation system having a fan to push air in the cabin. The fan can be embedded in a vent channel of the dash or can be located in any other suitable location. The smoke detection system can be configured to analyze a particle size of the smoke to determine if the particle size is smaller than a predetermined threshold. The vehicle management system can be configured to automatically increase a rate at which the ventilation system pushes outside air into the cabin in response to the smoke detection system detecting the smoke inside the vehicle. The vehicle management system can be configured to drive the vehicle to a service area configured to clean the vehicle in response to determining that the particle size is smaller than the predetermined threshold.

In some embodiments, the vehicle management system comprises a motor configured to roll down a window of the vehicle. The smoke detection system is configured to analyze a particle size of the smoke to determine if the particle size is smaller than a predetermined threshold. The vehicle management system can be configured to use the motor to automatically roll down the window in response to the smoke detection system detecting the smoke inside the vehicle. The vehicle management system can be configured to drive the vehicle to a service area configured to clean the vehicle in response to determining that the particle size is smaller than the predetermined threshold.

In some embodiments, the vehicle management system comprises at least one of a motor configured to roll down a window of the vehicle and a ventilation system having a fan to push air in the cabin. The smoke detection system can be configured to detect the smoke emitted by a first rider while the vehicle is driving to a drop off location of the first rider. The smoke detection system can be configured to analyze a particle size of the smoke to determine if the particle size is smaller than a predetermined threshold.

In some embodiments, in response to the smoke detection system detecting the smoke inside the vehicle, the vehicle management system is configured to at least one of use the motor to automatically roll down the window and increase a rate at which the ventilation system pushes the air into the cabin.

In some embodiments, in response to determining that the particle size is larger than the predetermined threshold and after at least one of rolling down the window and increasing the rate, the vehicle management system is configured to make the vehicle available to pick up a second rider.

In some embodiments, in response to determining that the particle size is smaller than the predetermined threshold, the vehicle management system is configured to make the vehicle unavailable to pick up the second rider until after the vehicle management system has driven the vehicle to a service area configured to clean the vehicle.

In some embodiments, the vehicle management system comprises a motor configured to roll down a window of the vehicle and a rain sensor configured to detect an indication of rain on the vehicle. The smoke detection system can be configured to analyze a particle size of the smoke to determine if the particle size is smaller than a predetermined threshold. The vehicle management system can be configured to use the motor to automatically roll down the window in response to the smoke detection system detecting the smoke inside the vehicle and/or in response to the rain sensor not detecting the indication of the rain. The vehicle management system can be configured to drive the vehicle to a service area configured to clean the vehicle in response to determining that the particle size is smaller than the predetermined threshold.

In some embodiments, the vehicle management system comprises a motor configured to roll down a window of the vehicle and a rain sensor configured to detect an indication of rain on the vehicle. The vehicle management system can be configured to use the motor to automatically roll down the window in response to the smoke detection system detecting the smoke inside the vehicle and in response to the rain sensor not detecting the indication of the rain.

In some embodiments, a maintenance system is configured to be used with a self-driving vehicle. A maintenance system can comprise a smoke detection system coupled to the vehicle and configured to detect smoke inside a cabin of the vehicle. A maintenance system can comprise a vehicle management system configured to autonomously drive the vehicle.

In some embodiments, the vehicle management system is configured to intentionally increase a travel time of the vehicle in response to the smoke detection system detecting the smoke inside the vehicle.

In some embodiments, the vehicle management system is configured to increase the travel time by changing from a first travel route to a destination (e.g., a destination chosen by a first rider) to a second travel route to the destination. The vehicle management system can be configured to change from the first travel route to the second travel route to intentionally increase the travel time in response to the smoke detection system detecting the smoke inside the vehicle.

In some embodiments, the vehicle management system comprises at least one of a speaker and a display screen. At least one of the speaker and the display screen can be configured to provide at least one of audio instructions and visual instructions to a first rider in the vehicle. At least one of the audio instructions and the visual instructions can be configured to warn the first rider to cease smoking to avoid increasing the travel time.

In some embodiments, the vehicle management system comprises at least one of a speaker and a display screen. At least one of the speaker and the display screen is configured to provide at least one of audio instructions and visual instructions to a first rider. At least one of the audio instructions and the visual instructions can be configured to instruct the first rider to cease smoking in order to decrease the travel time.

In some embodiments, the maintenance system comprises at least one processor and at least one memory having program instructions that when executed by the at least one processor are configured to cause the vehicle management system to increase the travel time of the vehicle in response to the smoke detection system detecting the smoke inside the vehicle.

In some embodiments, the vehicle management system is configured to reduce a speed of the vehicle in response to the smoke detection system detecting the smoke inside the vehicle.

In some embodiments, in response to the smoke detection system detecting the smoke inside the vehicle, the vehicle management system is configured to automatically reduce the speed while still enabling the vehicle to continue transporting a first rider toward a destination selected by the first rider.

In some embodiments, the vehicle management system is configured to determine a local speed limit. The vehicle management system can be configured to intentionally reduce the speed of the vehicle to a velocity below the local speed limit and above five miles per hour (and/or above ten miles per hour) in response to the smoke detection system detecting the smoke inside the vehicle.

In some embodiments, the maintenance system comprises at least one processor and at least one memory having program instructions that when executed by the at least one processor are configured to cause the vehicle management system to intentionally reduce the speed of the vehicle to a velocity below a local speed limit and above five miles per hour in response to the smoke detection system detecting the smoke inside the vehicle.

In some embodiments, the vehicle management system comprises at least one of a speaker and a display screen. At least one of the speaker and the display screen can be configured to provide at least one of audio instructions and visual instructions to a first rider. At least one of the audio instructions and the visual instructions can be configured to instruct the first rider to cease smoking in order to increase the speed.

In some embodiments, the smoke detection system is configured to analyze a particle size of the smoke to determine if the particle size is smaller than a predetermined threshold. The vehicle management system can be configured to reduce the speed in response to the maintenance system detecting the smoke inside the vehicle and determining that the particle size is smaller than the predetermined threshold.

In some embodiments, the maintenance system is configured to detect smoke from a rider smoking inside the vehicle and/or is configured to detect smoke from a fire inside the vehicle. A vehicle can be configured to drive a first rider to a destination chosen by the first rider. The vehicle management system can be configured to cease driving toward the destination in response to the smoke detection system detecting the smoke inside the vehicle.

In some embodiments, the maintenance system comprises at least one processor and at least one memory having program instructions that when executed by the at least one processor are configured (to cause the vehicle management system) to cause the vehicle to cease driving toward the destination in response to the smoke detection system detecting the smoke inside the vehicle.

In some embodiments, the smoke detection system is configured to analyze a particle size of the smoke to determine if the particle size is smaller than a predetermined threshold. The vehicle management system can be configured to cease driving toward the destination in response to the maintenance system detecting the smoke inside the vehicle and determining that the particle size is smaller than the predetermined threshold. The vehicle can stop moving, pull over to a parking location alongside the road, and/or stop at a cleaning facility configured to remove the smoke smell from the vehicle.

In some embodiments, the vehicle management system is configured to cease driving in response to the maintenance system detecting the smoke inside the vehicle and determining that a concentration of the smoke exceeds a predetermined threshold. The concentration threshold can be configured to be indicative of smoke from a fire rather than smoke from smoking a cigarette or vaping.

In some embodiments, the maintenance system comprises at least one processor and at least one memory having program instructions that when executed by the at least one processor are configured to cause the vehicle to stop moving via (e.g., by) a first stopping mode in response to the smoke detection system detecting the smoke inside the vehicle. The program instructions can be configured to cause the vehicle to stop moving via (e.g., by) a second stopping mode in response to the smoke detection system detecting the smoke inside the vehicle and the maintenance system detecting an indication of a person being located inside the vehicle. The second stopping mode can be configured to enable the vehicle to stop more quickly than the first stopping mode.

In some embodiments, the second stopping mode is configured to enable the vehicle to move at a greater speed than the first stopping mode.

In some embodiments, the vehicle management system is configured to determine a local speed limit, and the second stopping mode is configured to enable the vehicle to exceed the local speed limit by a greater amount than the first stopping mode.

In some embodiments, the second stopping mode is configured to enable the vehicle to accelerate faster than the first stopping mode.

In some embodiments, the second stopping mode is configured to enable the vehicle to decelerate faster than the first stopping mode.

In some embodiments, the vehicle is configured to drive on a road. The vehicle management system can comprise a vehicle guidance system having at least one of a camera, a radar, and a lidar. The vehicle guidance system can be configured to detect objects located outside the vehicle on the road. Program instructions can be configured to enable the vehicle to come closer to the objects in the second stopping mode than in the first stopping mode.

In some embodiments, the vehicle management system comprises a vehicle guidance system having at least one of a camera, a radar, and a lidar. The vehicle guidance system can be configured to detect objects located outside the vehicle on the road. The maintenance system can comprise at least one processor and at least one memory having program instructions configured to be executed by the at least one processor and comprising a first mode, a second mode, and a third mode. In the first mode, the program instructions are configured to prompt the vehicle management system to drive the vehicle toward a location (e.g., a destination, a drop-off location, a pick-up location).

In some embodiments, the program instructions are configured to exit the first mode and enter the second mode in response to the smoke detection system detecting the smoke inside the vehicle and in response to the maintenance system determining that a person is not located inside the vehicle. In the second mode, the program instructions prompt the vehicle guidance system to implement a first stopping mode.

In some embodiments, the program instructions are configured to exit the first mode and enter the third mode in response to the smoke detection system detecting the smoke inside the vehicle and the maintenance system determining that the person is located inside the vehicle. In the third mode, the program instructions prompt the vehicle guidance system to implement a second stopping mode configured to enable the vehicle to come to a stop in less time than the first stopping mode.

In some embodiments, the vehicle management system comprises a speaker configured to emit an audio command. The audio command can be configured to instruct the first rider to cease smoking in order to resume driving toward the destination.

In some embodiments, the vehicle management system comprises a display screen. The display screen can be configured to provide visual instructions to the first rider. The visual instructions can be configured to instruct the first rider to cease smoking in order to resume driving toward the destination.

In some embodiments, the vehicle management system is configured to resume driving toward the destination in response to at least one of the smoke detection system no longer detecting the smoke and the smoke detection system detecting a decrease in a concentration of the smoke.

In some embodiments, the smoke detection system is configured to analyze a particle size of the smoke inside the vehicle. The maintenance system can comprise a speaker, at least one processor, and at least one memory. The memory can comprise program instructions configured to be executed by the at least one processor such that the program instructions are configured to cause the speaker to emit a first audio command in response to the maintenance system determining that the particle size is smaller than a predetermined threshold. The program instructions can be configured to cause the speaker to emit a second audio command in response to the maintenance system determining that the particle size is larger than the predetermined threshold. The second audio command can be configured to communicate different information than the first audio command to a first rider inside the vehicle.

In some embodiments, the vehicle is configured to drive a first rider to a destination, and the maintenance system comprises at least one processor and at least one memory. The memory can comprise program instructions configured to be executed by the at least one processor.

In some embodiments, program instructions comprise a first mode and a second mode. In the first mode, the maintenance system can make the vehicle available to accept a pick-up request of a second rider. In the second mode, the maintenance system can make the vehicle unavailable to accept the pick-up request. The maintenance system can be configured to enter the second mode in response to the smoke detection system detecting the smoke inside the vehicle. The maintenance system can be configured to exit the second mode and enter the first mode in response to the smoke detection system no longer detecting the smoke inside the vehicle, the maintenance system detecting that a concentration of the smoke is less than a predetermined threshold, the maintenance system receiving a communication in response to the vehicle having been cleaned, and/or the maintenance system receiving an indication (such as GPS data) indicative of the vehicle having left a cleaning facility.

In some embodiments, a maintenance system is configured to be used with a self-driving vehicle. A maintenance system can comprise a smoke detection system coupled to the vehicle and configured to detect smoke inside a cabin of the vehicle. The smoke detection system can be coupled to the vehicle by being placed inside the vehicle, being attached to a roof of an interior of the vehicle, and/or coupled to the vehicle in any suitable way configured to enable the smoke detection system to detect smoke inside the vehicle. A maintenance system can comprise a vehicle management system configured to autonomously drive the vehicle.

In some embodiments, a vehicle management system is configured to respond in response to the smoke detection system detecting the smoke inside the vehicle. Embodiments described herein include many different ways in which the vehicle management system can respond to the smoke detection system detecting smoke inside the vehicle. Responses can protect the safety of riders inside the vehicle and/or can reduce smoke damage to the vehicle.

In some embodiments, a maintenance system comprises a communication system configured to send a first wireless communication to a remote computing device in response to the smoke detection system detecting the smoke inside the vehicle. The remote computing device can be associated with a manager of the vehicle such that the first wireless communication is configured to notify the manager regarding the smoke inside the vehicle.

In some embodiments, the vehicle management system comprises a motor configured to roll down a window of the vehicle, and the vehicle management system is configured to use the motor to automatically roll down the window in response to the smoke detection system detecting the smoke inside the vehicle.

In some embodiments, the vehicle management system comprises a motor configured to roll down a window of the vehicle. The vehicle management system can comprise a rain sensor configured to detect an indication of rain on the vehicle. The vehicle management system can be configured to use the motor to automatically roll down the window in response to the smoke detection system detecting the smoke inside the vehicle and in response to the rain sensor not detecting the indication of the rain.

In some embodiments, the vehicle management system comprises a motor configured to roll down a window of the vehicle. The smoke detection system can be configured to analyze a particle size of the smoke to determine if the particle size is smaller than a predetermined threshold. The vehicle management system can be configured to use the motor to automatically roll down the window in response to the smoke detection system detecting the smoke inside the vehicle and determining that the particle size is less than the predetermined threshold.

In some embodiments, the vehicle management system comprises a temperature management system. The temperature management system can comprise a thermometer, an air conditioner, a heater, and a ventilation system. The ventilation system can comprise a fan configured to circulate air in the cabin of the vehicle. The vehicle management system can be configured to increase and/or decrease an ambient temperature inside the cabin by at least ten degrees Fahrenheit in response to the smoke detection system detecting the smoke inside the vehicle. In response to the smoke detection system detecting the smoke inside the vehicle, the vehicle management system can increase and/or decrease the ambient temperature to decrease a comfort level of a first rider.

In some embodiments, the maintenance system comprises at least one processor and at least one memory having program instructions configured to be executed by the at least one processor. The program instructions can be configured to cause the vehicle management system to at least one of increase and decrease the ambient temperature by at least ten degrees Fahrenheit and by less than thirty degrees Fahrenheit. In response to the smoke detection system detecting smoke inside the vehicle, the program instructions can cause the vehicle management system to increase and/or decrease the ambient temperature (e.g., by at least ten degrees Fahrenheit and/or by less than thirty degrees Fahrenheit) to decrease the comfort level of a rider inside the vehicle.

In some embodiments, the vehicle management system comprises a speaker and/or a display screen. At least one of the speaker and the display screen can be configured to provide at least one of audio instructions and visual instructions to the first rider. At least one of the audio instructions and the visual instructions can be configured to instruct the first rider to cease smoking in order to enable changing the ambient temperature to increase the comfort level.

In some embodiments, the smoke detection system is configured to analyze a particle size of the smoke to determine if the particle size is smaller than a predetermined threshold. The vehicle management system can be configured to increase and/or decrease the ambient temperature inside the cabin (to decrease the comfort level of the first rider) in response to the maintenance system detecting the smoke inside the vehicle and determining that the particle size is smaller than the predetermined threshold.

In some embodiments, the vehicle management system is configured to automatically at least partially restore (e.g., increase) the comfort level in response to the smoke detection system no longer detecting the smoke inside the vehicle, detecting that a concentration of the smoke is less than a predetermined threshold, detecting that a concentration of the smoke is decreasing, and/or detecting that a concentration of the smoke has decreased by at least a predetermined amount and/or ratio.

In some embodiments, the vehicle management system comprises a lighting system configured to illuminate at least a portion of an interior of the vehicle. The lighting system can comprise at least one light coupled to an interior of the vehicle. The lighting system can be configured to illuminate at least one of a seat of the vehicle and a majority of the cabin (of the vehicle). The vehicle management system can be configured to use the lighting system to illuminate at least one of the seat and the majority of the cabin in response to the smoke detection system detecting the smoke inside the vehicle.

In some embodiments, the maintenance system comprises at least one processor and at least one memory having program instructions that when executed by the at least one processor are configured to cause the vehicle management system to illuminate at least one of the seat and the majority of the cabin in response to the smoke detection system detecting the smoke inside the vehicle.

In some embodiments, the vehicle management system is configured to cease illuminating at least one of the seat and the majority of the cabin in response to the smoke detection system in response to the smoke detection system no longer detecting smoke inside the vehicle, detecting that a concentration of the smoke is less than a predetermined threshold, detecting that a concentration of the smoke is decreasing, and/or detecting that a concentration of the smoke has decreased by at least a predetermined amount and/or ratio.

In some embodiments, the smoke detection system is configured to analyze a particle size of the smoke to determine if the particle size is smaller than a predetermined threshold. The vehicle management system can be configured to illuminate at least one of the seat of the vehicle and the majority of the cabin in response to the maintenance system detecting the smoke inside the vehicle and determining that the particle size is smaller than the predetermined threshold.

In some embodiments, the vehicle management system comprises at least one of a speaker and a display screen. At least one of the speaker and the display screen can be configured to provide at least one of audio instructions and visual instructions to a first rider inside the vehicle. At least one of the audio instructions and the visual instructions can be configured to instruct the first rider to cease smoking while at least one of the seat and the majority are illuminated by the lighting system.

In some embodiments, the smoke detection system (that is coupled to the vehicle) comprises an ionization smoke detector configured to detect cigarette smoking and comprises an optical smoke detector configured to detect electronic cigarette aerosol by analyzing a particle size of the aerosol and determining that the particle size is indicative of electronic cigarette use. In some embodiments, the maintenance system comprises a communication system configured to send a first wireless communication to a remote computing device in response to the smoke detection system detecting the smoke. The smoke detection system (coupled to the vehicle) can be configured to analyze a particle size of the smoke. The communication system can be configured to send the first wireless communication identifying the smoke as an aerosol in response to the smoke detection system determining that the particle size is greater than a predetermined threshold. The communication system can be configured to send the first wireless communication identifying the smoke as cigarette smoking in response to the smoke detection system determining that the particle size is less than the predetermined threshold. The smoke detection system can comprise an optical smoke detector configured to analyze the particle size.

The disclosure also includes a safety system comprising a self-driving vehicle, a vehicle management system configured to autonomously drive the self-driving vehicle, and a smoke detection system coupled to the self-driving vehicle and configured to detect smoke inside a cabin of the self-driving vehicle.

In many embodiments, the self-driving vehicle comprises a door and a door lock configured to impede opening the door. In some embodiments, the safety system comprises at least one processor and at least one memory having program instructions that when executed by the at least one processor are configured to cause the vehicle management system to unlock the door of the self-driving vehicle in response to the smoke detection system detecting the smoke inside the self-driving vehicle.

In some embodiments, the safety system includes a speed detection system, wherein the program instructions are configured to cause the vehicle management system to automatically unlock the door in response to the smoke detection system detecting the smoke inside the self-driving vehicle and the speed detection system determining that the self-driving vehicle is moving at a first speed that is less than a first speed threshold. In some embodiments, the first speed threshold is less than 30 miles per hour.

In some embodiments, the safety system includes a speed detection system, wherein the program instructions are configured to cause the vehicle management system to unlock the door in response to the smoke detection system detecting the smoke inside the self-driving vehicle and the speed detection system determining that the self-driving vehicle is moving at a first speed that is less than a first speed threshold, wherein the first speed threshold is less than 30 miles per hour. Furthermore, the program instructions may be configured to cause the motor to at least partially open the door in response to the smoke detection system detecting the smoke inside the self-driving vehicle and the speed detection system determining that the self-driving vehicle is moving at a second speed that is less than a second speed threshold, wherein the second speed threshold is less than 15 miles per hour.

Additionally, in some embodiments, the self-driving vehicle comprises a motor configured to at least partially open the door, wherein the program instructions are configured to cause the motor to at least partially open the door in response to the smoke detection system detecting the smoke inside the self-driving vehicle.

The self-driving vehicle comprises a window and a motor configured to at least partially open the window, wherein the program instructions are configured to cause the motor to at least partially open the window in response to the smoke detection system detecting the smoke inside the self-driving vehicle.

In some embodiments, the smoke detection system is configured to detect a concentration of the smoke, and the program instructions are configured to cause the vehicle management system to automatically unlock the door of the self-driving vehicle in response to the smoke detection system detecting the smoke inside the self-driving vehicle and the safety system determining the concentration of the smoke is greater than a predetermined threshold.

Furthermore, in some embodiments, the smoke detection system is configured to detect a particle size of the smoke, and the vehicle management system is configured to unlock the door in response to the smoke detection system detecting the smoke inside the self-driving vehicle and the safety system determining the particle size is smaller than a predetermined threshold.

In some embodiments, the self-driving vehicle comprises a window and a motor configured to at least partially open the window. Accordingly, in some embodiments, the smoke detection system is configured to detect a particle size of the smoke, the program instructions are configured to cause the vehicle management system to unlock the door in response to the safety system determining the particle size is smaller than a first predetermined threshold. In some embodiments, the program instructions are configured to cause the motor to at least partially open the window in response to the safety system determining the particle size is larger than a second predetermined threshold.

Even still, in some embodiments, the self-driving vehicle comprises an actuator configured to move the door lock to an unlocked state. Accordingly, in some embodiments, the smoke detection system comprises a camera and at least one of an ionization smoke detector and an optical smoke detector, wherein the camera is configured to take a picture showing at least a portion of the cabin. In some embodiments, the program instructions are configured to cause the motor to at least partially open the window in response to the safety system determining that the picture shows the smoke, and the program instructions are configured to cause the actuator to move the door lock to the unlocked state in response to at least one of the ionization smoke detector and the optical smoke detector detecting the smoke inside the self-driving vehicle.

In some embodiments, the program instructions are configured to automatically unlock the door lock in response to the smoke detection system detecting the smoke inside the self-driving vehicle and the safety system receiving a verification input from a rider. The verification input is configured to confirm a presence of the smoke in the self-driving vehicle.

Additionally, in some embodiments, the self-driving vehicle comprises a display screen. Accordingly, in some embodiments, the program instructions are configured to receive the verification input from the rider via at least one of the display screen and a button pressed by the rider in response to a visual request shown on the display screen. In response to the smoke detection system detecting the smoke, the program instructions may be configured to cause the display screen to emit the visual request for the rider to confirm the presence of the smoke.

Furthermore, in some embodiments, the self-driving vehicle comprises a microphone and a speaker. In some embodiments, the verification input comprises a verbal response received from the rider via the microphone in response to the program instructions causing the speaker to emit an audio request for the rider to confirm the presence of the smoke, and in response to the smoke detection system detecting the smoke, the program instructions are configured to cause the speaker to emit the audio request.

In some embodiments, the self-driving vehicle comprises a camera, and the verification input comprises a gesture made by the rider and recorded by the camera. Additionally, in some embodiments, the verification input comprises a wireless communication transmitted from a remote computing device of the rider to the safety system.

In some embodiments, the self-driving vehicle comprises a speaker, and in response to the smoke detection system detecting the smoke inside the self-driving vehicle, the program instructions are configured to cause the speaker to emit audio instructions, wherein the audio instructions are configured to alert a rider regarding at least one of the smoke and the door being unlocked.

In some embodiments, the self-driving vehicle comprises a display screen, and in response to the smoke detection system detecting the smoke inside the self-driving vehicle, the program instructions are configured to cause the display screen to show visual instructions to a rider, wherein the visual instructions are configured to alert the rider regarding at least one of the smoke and the door being unlocked.

Even still, in some embodiments, the safety system includes a temperature detection system coupled to the self-driving vehicle and configured to detect a temperature inside at least a portion of self-driving vehicle. The program instructions may thereby be configured to cause the vehicle management system to unlock the door in response to the smoke detection system detecting the smoke inside the self-driving vehicle and the temperature detection system detecting the temperature greater than a predetermined temperature threshold. In some embodiments, the temperature detection system comprises a camera system configured to identify the smoke. Furthermore, in some embodiments, the temperature is located within 24 inches of the smoke. In other words, in some embodiments, the temperature detection system is configured to detect a temperature within 24 inches of the smoke, within 12 inches of the smoke, and even within 1 inch of the smoke.

Furthermore, in some embodiments, the door comprises an unlocked state and a locked state, and the program instructions are configured to verify the door is in the unlocked state in response to the smoke detection system detecting the smoke inside the self-driving vehicle. The disclosure also includes a safety system comprising a self-driving vehicle configured to transport a rider, a vehicle management system configured to autonomously drive the self-driving vehicle, a seat coupled to the self-driving vehicle, and a seat belt configured to alternatively have a buckled state and an unbuckled state. In some embodiments, when the seat belt is in the buckled state the seat belt is configured to secure the rider in the seat and in the unbuckled state the seat belt is configured to enable the rider to exit the seat. In many embodiments, the safety system further includes a smoke detection system coupled to the self-driving vehicle and configured to detect smoke inside a cabin of the self-driving vehicle.

In some embodiments, the safety system further includes at least one processor and at least one memory having program instructions that when executed by the at least one processor are configured to cause the vehicle management system to switch the seat belt from the buckled state to the unbuckled state in response to the smoke detection system detecting the smoke inside the self-driving vehicle.

Additionally, in some embodiments, the safety system includes a first actuator configured to switch the seat belt from the buckled state to the unbuckled state, wherein the program instructions are configured to send a control signal to the first actuator in response to the smoke detection system detecting the smoke inside the self-driving vehicle, wherein the control signal is configured to cause the first actuator to switch the seat belt from the buckled state to the unbuckled state.

Even still, in some embodiments, the safety system further includes a seat belt sensor configured to detect the buckled state of the seat belt, wherein the program instructions are configured to cause the vehicle management system to switch the seat belt from the buckled state to the unbuckled state in response to the smoke detection system detecting the smoke inside the self-driving vehicle and the seat belt sensor detecting the buckled state.

The safety system may also include an occupancy sensor configured to detect the rider sitting in the seat, wherein the program instructions are configured to cause the vehicle management system to switch the seat belt from the buckled state to the unbuckled state in response to the smoke detection system detecting the smoke inside the self-driving vehicle and the occupancy sensor detecting the rider sitting in the seat.

In some embodiments, the safety system further includes a seat belt sensor configured to detect the buckled state of the seat belt, wherein the program instructions are configured to cause the vehicle management system to switch the seat belt from the buckled state to the unbuckled state in response to the smoke detection system detecting the smoke inside the self-driving vehicle, the occupancy sensor detecting the rider sitting in the seat, and the seat belt sensor detecting the buckled state.

Furthermore, in some embodiments, the safety system includes a speed detection system, wherein the program instructions are configured to cause the vehicle management system to automatically switch the seat belt from the buckled state to the unbuckled state in response to the smoke detection system detecting the smoke inside the self-driving vehicle and the speed detection system determining that the self-driving vehicle is moving at a first speed that is less than a first speed threshold. In some embodiments, the first speed threshold is less than 30 miles per hour. In some embodiments, the first speed threshold is greater than one mile per hour.

In some embodiments, the self-driving vehicle comprises a door, a door lock configured to impede opening the door, and a door lock actuator configured to arrange the door lock to an unlocked state. Accordingly, in some embodiments, the program instructions are configured to cause the door lock actuator to unlock the door in response to the smoke detection system detecting the smoke inside the self-driving vehicle.

Accordingly, in some embodiments, wherein the self-driving vehicle comprises a door actuator configured to at least partially open the door, the program instructions are configured to cause the door actuator to at least partially open the door in response to the smoke detection system detecting the smoke inside the self-driving vehicle.

Additionally, in some embodiments, wherein the self-driving vehicle comprises a door actuator configured to at least partially open the door, the program instructions are configured to cause the door actuator to at least partially open the door in response to the smoke detection system detecting the smoke inside the self-driving vehicle. In some embodiments, the safety system further comprises a speed detection system, and the program instructions are configured to cause the vehicle management system to switch the seat belt from the buckled state to the unbuckled state in response to the smoke detection system detecting the smoke inside the self-driving vehicle and the speed detection system determining that the self-driving vehicle is moving at a first speed that is less than a first speed threshold, wherein the first speed threshold is less than 30 miles per hour. In some embodiments, the program instructions are configured to cause the door actuator to at least partially open the door in response to the smoke detection system detecting the smoke inside the self-driving vehicle and the speed detection system determining that the self-driving vehicle is moving at a second speed that is less than a second speed threshold, wherein the second speed threshold is less than 15 miles per hour. In some embodiments, the first speed threshold is greater than 1 mile per hour and is greater than the second speed threshold.

In some embodiments, wherein the self-driving vehicle comprises a window and a motor configured to at least partially open the window, wherein in response to the smoke detection system detecting the smoke inside the self-driving vehicle the program instructions are configured to cause the motor to at least partially open the window prior to the seat belt switching from the buckled state to the unbuckled state.

In some embodiments, the smoke detection system is configured to detect a concentration of the smoke, and the program instructions are configured to cause the vehicle management system to automatically switch the seat belt from the buckled state to the unbuckled state in response to the smoke detection system detecting the smoke inside the self-driving vehicle and the safety system determining the concentration of the smoke is greater than a predetermined threshold. Additionally, in some embodiments, the smoke detection system is configured to detect a particle size of the smoke, and the vehicle management system is configured to switch the seat belt from the buckled state to the unbuckled state in response to the smoke detection system detecting the smoke inside the self-driving vehicle and the safety system determining the particle size is smaller than a predetermined threshold.

In some embodiments, wherein the self-driving vehicle comprises a window and a motor configured to at least partially open the window, the smoke detection system is configured to detect a particle size of the smoke, the program instructions are configured to cause the vehicle management system to switch the seat belt from the buckled state to the unbuckled state in response to the safety system determining the particle size is smaller than a first predetermined threshold, and the program instructions are configured to cause the motor to at least partially open the window in response to the safety system determining the particle size is larger than a second predetermined threshold.

Furthermore, in some embodiments, wherein the self-driving vehicle comprises a window and a motor configured to at least partially open the window, the smoke detection system comprises a camera and at least one of an ionization smoke detector and an optical smoke detector, wherein the camera is configured to take a picture showing at least a portion of the cabin. Accordingly, in some embodiments, the program instructions are configured to cause the motor to at least partially open the window in response to the safety system determining that the picture shows the smoke, and the program instructions are configured to cause the vehicle management system to switch the seat belt from the buckled state to the unbuckled state in response to at least one of the ionization smoke detector and the optical smoke detector detecting the smoke inside the self-driving vehicle.

In some embodiments, the safety system further includes a temperature detection system coupled to the self-driving vehicle and configured to detect a temperature inside at least a portion of the self-driving vehicle, wherein the program instructions are configured to cause the vehicle management system to switch the seat belt from the buckled state to the unbuckled state in response to the smoke detection system detecting the smoke inside the self-driving vehicle and the temperature detection system detecting that the temperature is greater than a predetermined temperature threshold. In some embodiments, the temperature detection system comprises a thermal imaging camera.

In some embodiments, the safety system further includes an object detection system configured to detect a second vehicle and having at least one of a camera, a radar, and a lidar, wherein at least one of the camera, the radar, and the lidar is coupled to the self-driving vehicle to enable the objection detection system to detect the second vehicle, and the program instructions are configured to cause the vehicle management system to switch the seat belt from the buckled state to the unbuckled state in response to the smoke detection system detecting the smoke inside the self-driving vehicle and in response to at least one of: the object detection system detecting that the second vehicle is at least a predetermined distance from the self-driving vehicle, the object detection system detecting that the second vehicle is not on a collision course with the self-driving vehicle, and the vehicle management system determining, based on data from the object detection system, that the second vehicle has less than a predetermined risk threshold of colliding with the self-driving vehicle.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
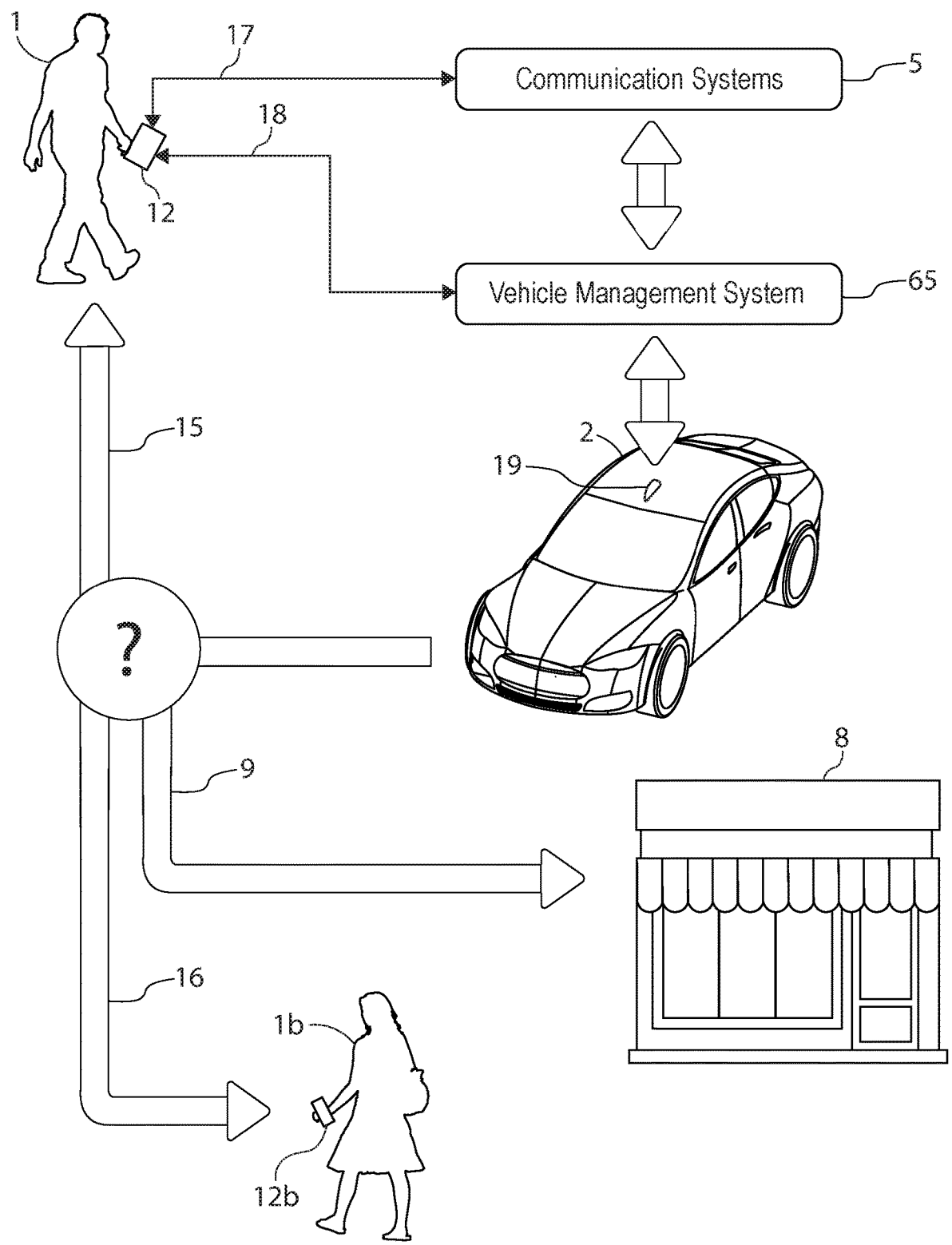
FIG. 1 illustrates a diagrammatic view that includes a self-driving vehicle configured to use a camera system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles).

Self-driving vehicles typically have unlimited attention spans and can process complex sensor data nearly instantaneously. (Alphabet Inc. and Tesla Motors Inc. have built self-driving vehicles.) The ability of self-driving vehicles to save lives is so impressive that society has a moral imperative to develop self-driving technology such that it can be widely adopted.

Although self-driving vehicles will unlock many safety benefits, there are several barriers to rapid adoption of self-driving vehicles. Some of the embodiments described herein overcome several of these barriers.

Self-driving cars are sometimes referred to as autonomous cars, autonomous vehicles, driverless cars, and driverless vehicles. Various levels of "self-driving" behaviors are available to sense surrounding environments and navigate appropriately (e.g., without hitting objects, in a time-efficient manner). Levels of self-driving vehicles comprise Level 1 (Driver Assistance), Level 2 (Partial Automation), Level 3 (Conditional Automation), Level 4 (High Automation), and Level 5 (Full Automation). Of course, other levels and distinctions are possible. The National Highway Traffic Safety Administration has outlined various levels of self-driving vehicle automation based on information from the Society of Automotive Engineers.

Referring now primarily to FIG. 1, a vehicle management system 65 can be configured to govern the destinations of a self-driving vehicle 2. A first rider 1 can have a remote computing device 12 running software configured to enable the first rider 1 to request a ride from a ride service and/or from a particular vehicle.

The first rider 1 can open an "app" on an iPhone or Android phone. The "app" can allow the first rider 1 to request a pick-up time and pick-up location.

The vehicle management system 65 can communicate with the remote computing device 12 of the first rider 1 directly (e.g., via radio communications such as Bluetooth) or indirectly via intermediary communication systems 5. Arrows 17, 18 indicate communication. (Many additional communication means and methods are compatible with the embodiments described herein.) An antenna 19 of the self-driving vehicle 2 can enable the vehicle management system 65 to communicate with remote computing devices 12, 12b.

A second rider 1b may request a ride via a second remote computing device 12b. In some cases, the vehicle management system 65 must choose between providing a ride to a first rider 1, providing a ride to a second rider 1b, and/or going to a first location 8 (e.g., to clean the vehicle prior to providing a ride to the first rider 1 and/or to the second rider 1b). Arrow 15 indicates the self-driving vehicle 2 driving to the first rider 1 to give the first rider 1 a ride. Arrow 9 indicates the self-driving vehicle 2 driving to the first location 8 instead of driving to pick up the second rider 1b right after dropping off the first rider 1. Arrow 16 indicates the self-driving vehicle 2 eventually picking up the second rider 1b (e.g., after the self-driving vehicle 2 is cleaned).

A person who owns a car is incentivized to keep the car clean because any mess the person leave in the car will be an annoyance to the person in the future. In contrast, a rider (who does not own the car) can leave a mess in the car without having to see the mess in the future. As a result, people who own self-driving vehicles 2 are motivated to keep the self-driving vehicles 2 clean while non-owning riders are more prone to leaving messes in self-driving vehicles 2. Owners of vehicles 2 will not want to make their self-driving vehicles 2 available for riders 1, 1b if the owners are concerned that their vehicles 2 will return messy (after providing the rides). Thus, there is a need for systems that help maintain self-driving vehicles 2.

An owner of a self-driving vehicle 2 will be reluctant to allow other riders to use the self-driving vehicle 2 (e.g., while the owner is at home or work) if the self-driving vehicle 2 will return messy. In addition, if a first rider 1 leaves a mess in the self-driving vehicle 2 (that is not cleaned up), subsequent riders will be unsatisfied with having to ride in a messy self-driving vehicle 2.

One option is to clean the self-driving vehicle 2 between each rider. This option, however, is often cost-prohibitive. Unlike rental cars that are often rented for a day or more at a time, self-driving vehicles 2 can be rented for just a few minutes at a time. Driving the self-driving vehicle 2 to a cleaning station after each few minutes of rental time would require far too many unnecessary cleanings and unnecessary miles driven. Some embodiments described herein enable cleaning the self-driving vehicle 2 only when necessary and otherwise permitting the self-driving vehicle 2 to be used by a series of riders without taking the time to clean the self-driving vehicle 2.

The self-driving vehicle 2 can include two modes. In the first mode, the self-driving vehicle 2 is considered clean and is available to accept a pick-up request. If the maintenance system detects that the self-driving vehicle 2 is unclean inside, then the system can enter a second mode in which the self-driving vehicle 2 is unavailable to accept a pick-up request and instead heads towards a cleaning facility. Once the self-driving vehicle 2 is clean, the system can enter the first mode again. As a result, the self-driving vehicle 2 may drop off the first rider 1, detect that the self-driving vehicle 2 has an item left behind by the first rider 1, and then instead of going to pick up the second rider 1b, can go to a cleaning facility. (Another self-driving vehicle can pick up the second rider 1b or the second rider 1b can wait for the self-driving vehicle 2 to be cleaned and then can receive a ride from the self-driving vehicle 2.)

The vehicle management system 65 can be a portion of the self-driving vehicle 2. Communication between the vehicle 2 and the vehicle management system 65 can occur via electrical wires that couple the vehicle management system 65 to other portions of the vehicle 2.

In some embodiments, the vehicle management system 65 is located remotely relative to the self-driving vehicle 2. Communication between the vehicle 2 and the vehicle management system 65 can occur via wireless communications that travel over intermediary communication systems 5.

In some embodiments, intermediary communication systems 5 are used to perform each step. Intermediary communication systems 5 can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

The communicative coupling between the remote computing device 12 and the vehicle management system 65 can be via intermediary communication systems 5. In other words, intermediary communication systems 5 can communicatively couple the remote computing device 12 and the vehicle management system 65. This communicative coupling may be via intermittent wireless communications. For example, the vehicle management system 65 may send a wireless message to the remote computing device 12 periodically (e.g., every 10 seconds, every 60 seconds, every 10 minutes). As used herein, "periodically" does not imply that every period has the same duration. In some embodiments, the communicative coupling between the self-driving vehicle 2 and the vehicle management system 65 is via intermediary communication systems 5.

Some embodiments include methods of using the vehicle management system 65 to operate the self-driving vehicle 2. The vehicle management system 65 is configured to be communicatively coupled with a remote computing device 12, which is configured to operate software, such as an iPhone application or an Android application adapted to enable a user to control behaviors of the self-driving vehicle 2. Behaviors can include actions and non-actions of the self-driving vehicle 2, such as picking up the user at a location, picking up the user at a time based on a schedule of the user or a time based on past pick-up times, remaining idle, driving to a residence of the user, pulling out of a garage, parking the vehicle, getting gas, charging the vehicle, and the like.

Figure 2:
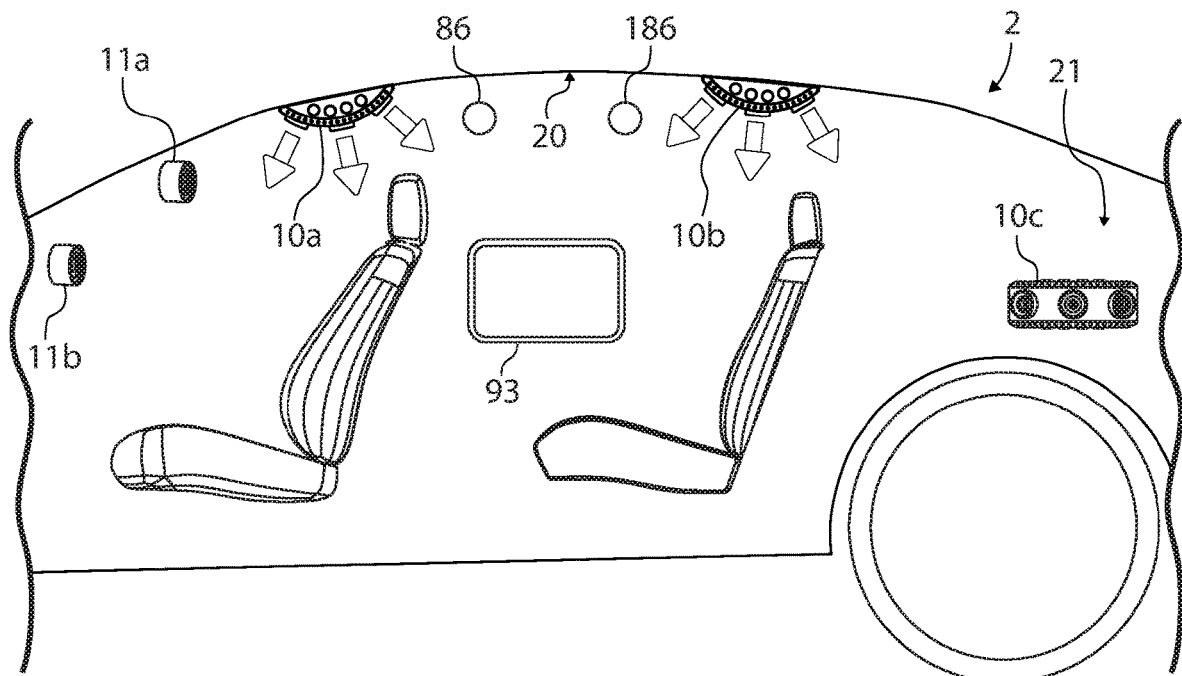
FIG. 2 illustrates a side view of an interior of the self-driving vehicle with cameras located in several areas, according to some embodiments.

Referring now primarily to FIG. 2, the maintenance system can comprise a camera system having one or more camera devices 10a, 10b, 10c, 10d, 11a, 11b. The camera devices 10a, 10b, 10c, 10d, 11a, 11b can include any of the features and capabilities described in the context of the camera device 10.

Camera devices 10a, 10b can be coupled to a ceiling 20 of the self-driving vehicle 2 such that they include cameras directed towards the first row of seats and/or towards the second row of seats. Camera devices 10c can be placed in a trunk area of the self-driving vehicle 2 (e.g., to enable taking pictures and/or videos of items left in the trunk area).

Figure 3:
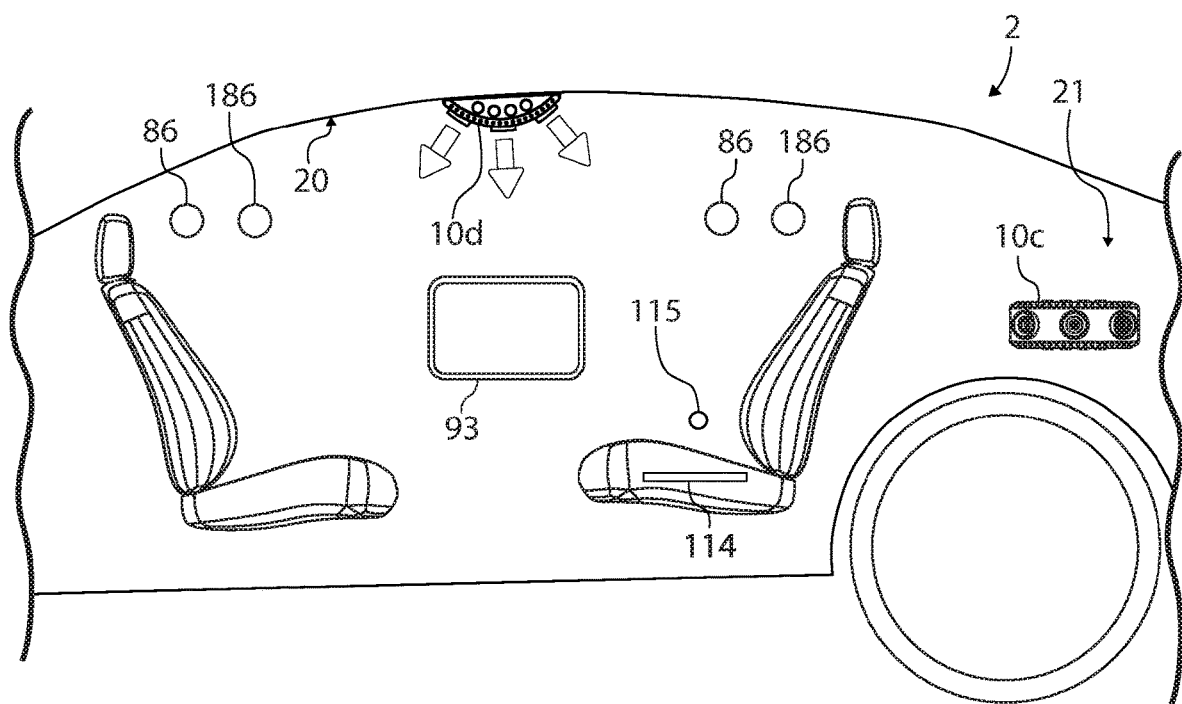
FIG. 3 illustrates a side view of an interior of the self-driving vehicle with seats facing each other, according to some embodiments.

A camera device 11a can be integrated into the rear-view mirror of the self-driving vehicle 2. A camera device 11b can be integrated into the dash of the self-driving vehicle 2. Camera devices 10a, 10b, 10c, 11a, 11b can be placed in any area of the self-driving vehicle 2. As illustrated in FIG. 3, the first and second rows of seats can face towards each other to create a more social riding experience. A camera device 10d can be coupled to an interior of the self-driving vehicle 2. As illustrated in FIG. 3, the camera device 10d is coupled to the ceiling 20 of the self-driving vehicle 2.

Figure 4:
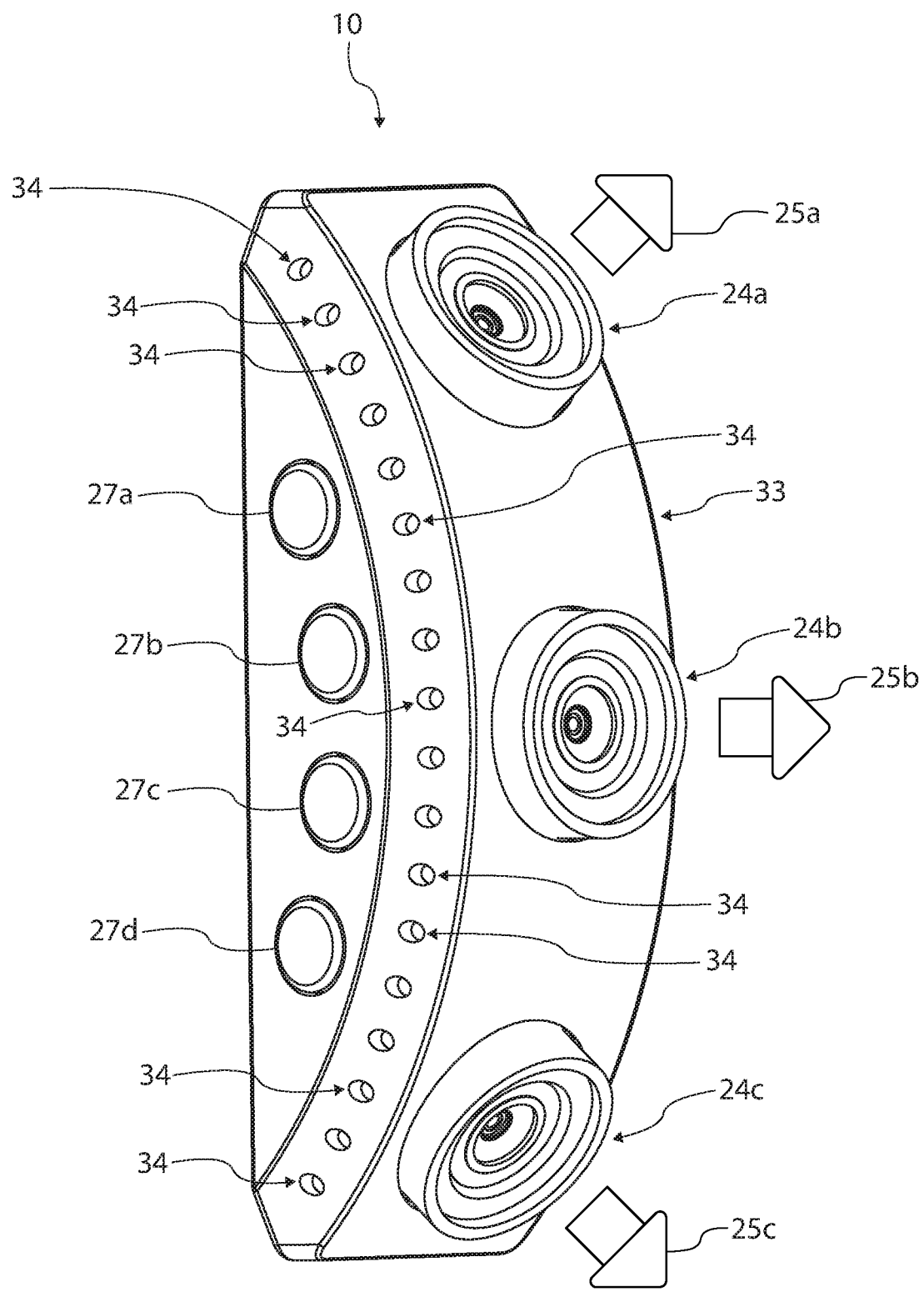
FIG. 4 illustrates a perspective view of a camera device, according to some embodiments.
Figure 5:
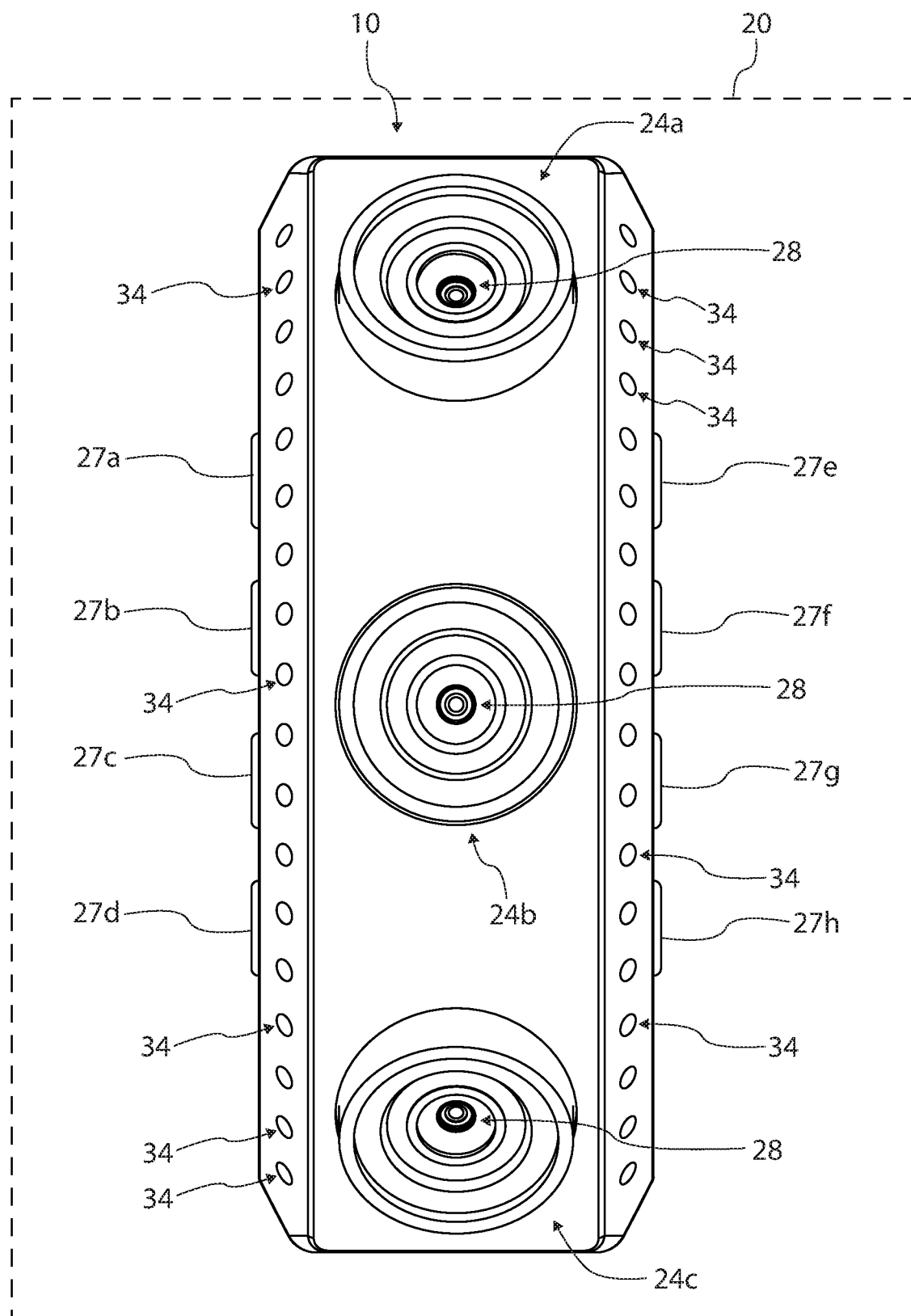
FIG. 5 illustrates a bottom view of the camera device, according to some embodiments.
Figure 6:
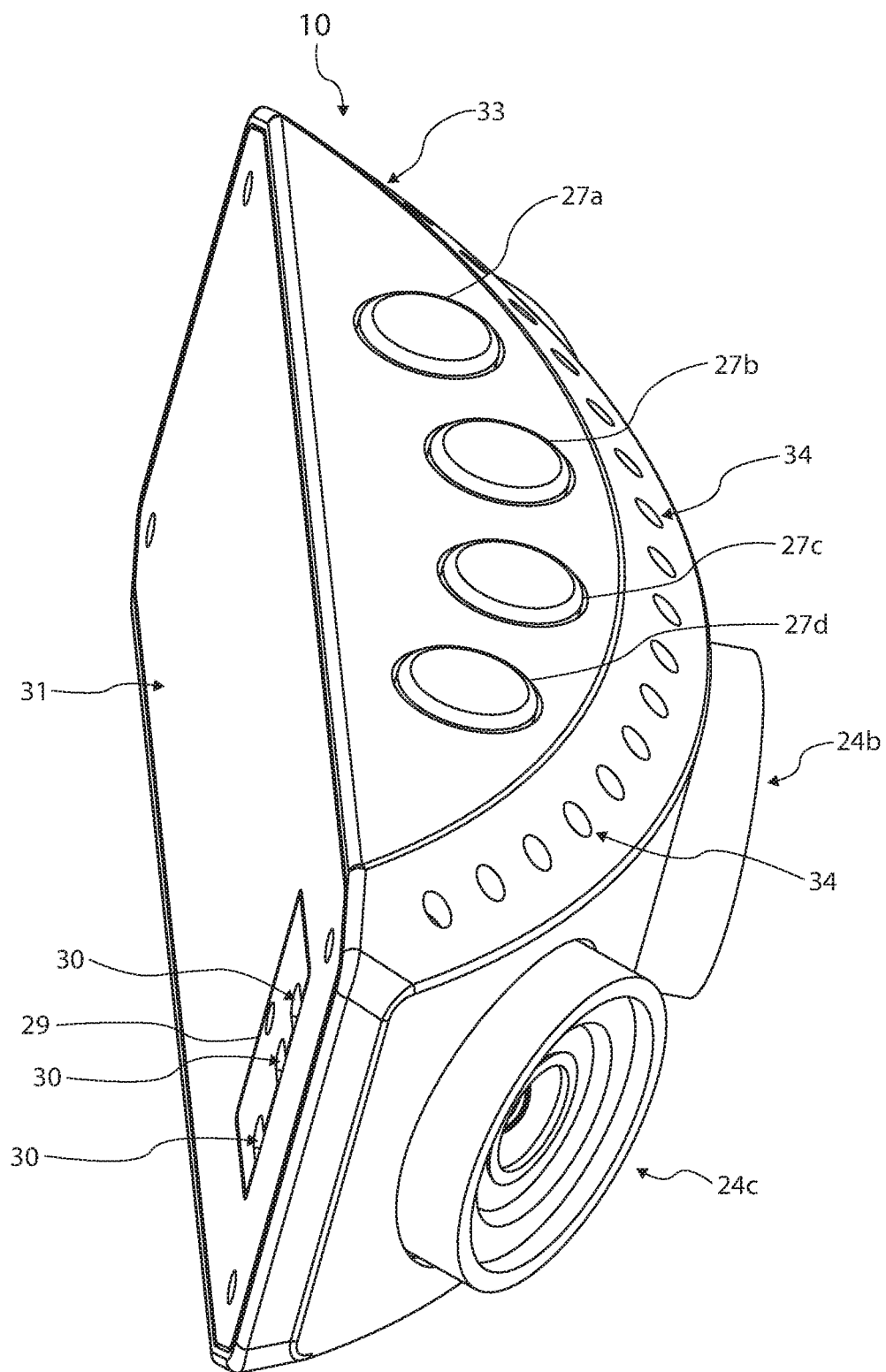
FIG. 6 illustrates a perspective view of the camera device, according to some embodiments.

FIG. 4 illustrates a perspective view of a camera device. FIG. 5 illustrates a bottom view of the camera device 10 coupled to a ceiling 20 of the self-driving vehicle 2. FIG. 6 illustrates a perspective view of the camera device 10 with the ceiling 20 hidden to show a top side of the camera device 10. (The top side is configured to face towards the ceiling 20 of the self-driving vehicle 2.)

The camera device 10 can include multiple cameras 24a, 24b, 24c. A first camera 24a can be directed in a first direction 25a (e.g., towards a front row of seats in the self-driving vehicle 2). A second camera 24b can be directed in a second direction 25b (e.g., towards a middle row of seats in the self-driving vehicle 2). A third camera 24c can be directed in a third direction 25c (e.g., towards a third row of seats in the self-driving vehicle 2).

Each camera 24a, 24b, 24c can include a wide-angle lens 28 to provide a wider field of view, which can be particularly helpful in the small confines of the self-driving vehicle 2. The cameras 24a, 24b, 24c can be high-resolution cameras with auto-focus.

The camera device 10 can comprise a rider detection system, a communication module (with can include an antenna, a transmitter, and a receiver), a printed circuit board populated with integrated circuits and other electrical components, an image analysis system, a battery, a power management system, a microphone, a speaker, a memory with software configured to carry out the features described herein, and lights configured to illuminate the interior of the self-driving vehicle 2.

The camera device 10 can comprise a smoke detector configured to detect if a rider is smoking (e.g., cigarettes, vaping) inside the self-driving vehicle 2. Holes 34 enable the smoke to enter the camera device 10 to enable the smoke detector to detect the smoke. Not all the holes 34 are labeled to increase the clarity of other features.

The camera device 10 includes buttons that can be configured to enable the rider to interact physically with the camera device. A first button 27a is configured to summon emergency responders in response to the rider pressing the button 27a. The camera device 10 can call "911" and can provide the GPS location of the self-driving vehicle 2 to the emergency responders. A second button 27b is configured to call a virtual assistant (or a live human assistant) in response to the rider pressing the button 27b. The assistant can be configured to answer the rider's questions. The virtual assistant can use Apple's "Siri" technology or Amazon's "Alexa" technology.

Pressing a third button 27c can notify the maintenance system that the interior of the self-driving vehicle 2 needs to be cleaned. Pressing a fourth button 27d can notify the maintenance system that the exterior of the self-driving vehicle 2 needs to be cleaned.

The camera device 10 can include an outer housing 33 (e.g., molded from plastic) that snaps onto a molded plastic base plate 31 that is coupled to the ceiling 20 by screws. A hatch 29 can be removed to enable plugging cables into the camera device 10. The cables can provide electrical power from the self-driving vehicle 2 to the camera device 10. The cables can also communicatively couple the camera device 10 to other portions of the self-driving vehicle 2 that communicatively couple the self-driving vehicle 2 to the vehicle management system 65. The cables can exit through holes 30 in the hatch 29. The camera device 10 can be coupled by wires or wirelessly communicatively coupled to the other elements described herein and/or incorporated by reference.

The vehicle management system 65 can be wirelessly communicatively coupled to the self-driving vehicle 2 via intermediary communication systems 5. The remote computing device 12 can be wirelessly communicatively coupled to the vehicle management system 65 via intermediary communication systems 5. Intermediary communication systems 5 can comprise wireless networks, cellular networks, telephone networks, Internet systems, servers, cloud computing, remotely located computers, radio communication systems, satellite systems, communication systems, and any other suitable means of enabling wired and/or wireless communication between the remote computing device 12, the vehicle management system 65, and/or the self-driving vehicle 2.

In embodiments that include elements such as sending information or otherwise communicating, the remote computing device 12, the vehicle management system 65, and the self-driving vehicle 2 can do these elements by using intermediary communication systems 5. For example, the remote computing device 12, the vehicle management system 65, and the self-driving vehicle 2 may send wireless communications and/or receive wireless communications via intermediary communication systems 5, which can serve as a communication bridge between the remote computing device 12, the vehicle management system 65, and the self-driving vehicle 2.

Figure 7:
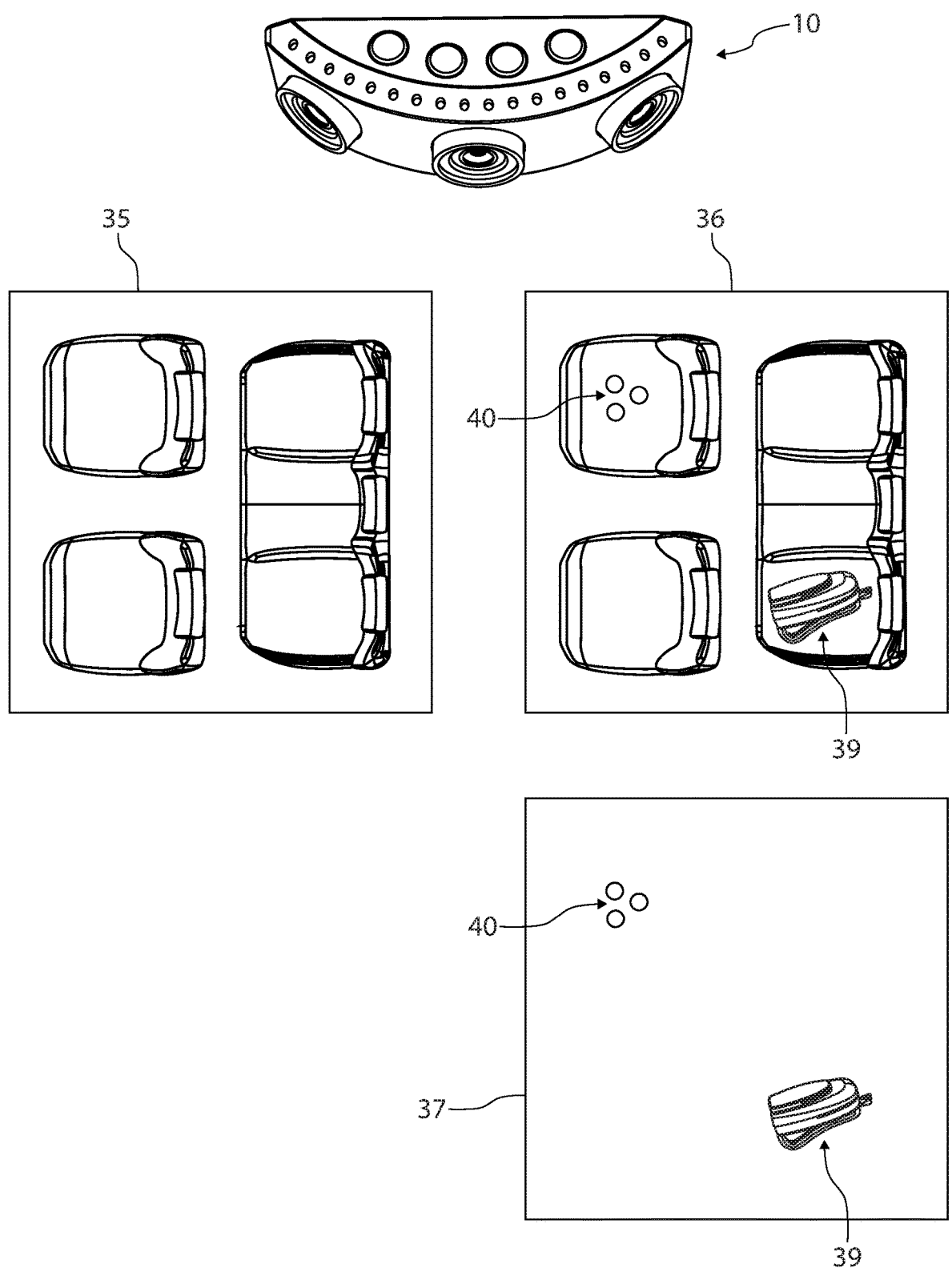
FIGS. 7 and 8 illustrate diagrammatic views regarding a camera system of a self-driving vehicle, according to some embodiments.

FIG. 7 illustrates a diagrammatic view of the camera device 10 and various images. The camera device 10 can take a first baseline image 35 (e.g., prior to the first rider 1 entering the self-driving vehicle 2). The camera device 10 can take a second image 36 in response to the first rider 1 exiting the self-driving vehicle 2. An image analysis system 70 can subtract the first baseline image 35 from the second image 36 to determine what features are in the second 36 but not in the first baseline image 35.

As shown in the subtraction result image 37, the first rider 1 left a valuable item 39 behind in the self-driving vehicle 2 and also left trash 40 behind in the self-driving vehicle 2. The system can send a picture of the valuable item 39 (e.g., a backpack or purse) to the first rider 1 to determine if the first rider 1 wants the system to return the valuable item 39 to the first rider 1. The system can remove the valuable item 39 prior to picking up a second rider 1b (to prevent the second rider from stealing the valuable item 39). In some embodiments, the system places the valuable item 39 in the trunk (and locks the trunk) prior to picking up the second rider 1b.

The system can determine the self-driving vehicle 2 needs to be cleaned prior to picking up the second rider 1b in response to detecting the trash 40.

Some embodiments use machine vision to detect the items 39, 40 left behind by analyzing the second image 36 without analyzing or needing the first baseline image 35. For example, software can be configured to detect that a backpack has been left in the self-driving vehicle 2 even if no baseline image 35 is available. In some cases, the first baseline image 35 can increase the accuracy and reliability of the system (e.g., by reducing false positives and false negatives).

Machine vision can recognize that shapes or even colors are indicative of an item not being part of the vehicle 2 (and thus the item is likely something left behind by a rider). Machine vision can recognize common shapes (e.g., a backpack, a purse, a laptop, a coffee mug, a fast-food bag, a person, a dog).

Figure 8:
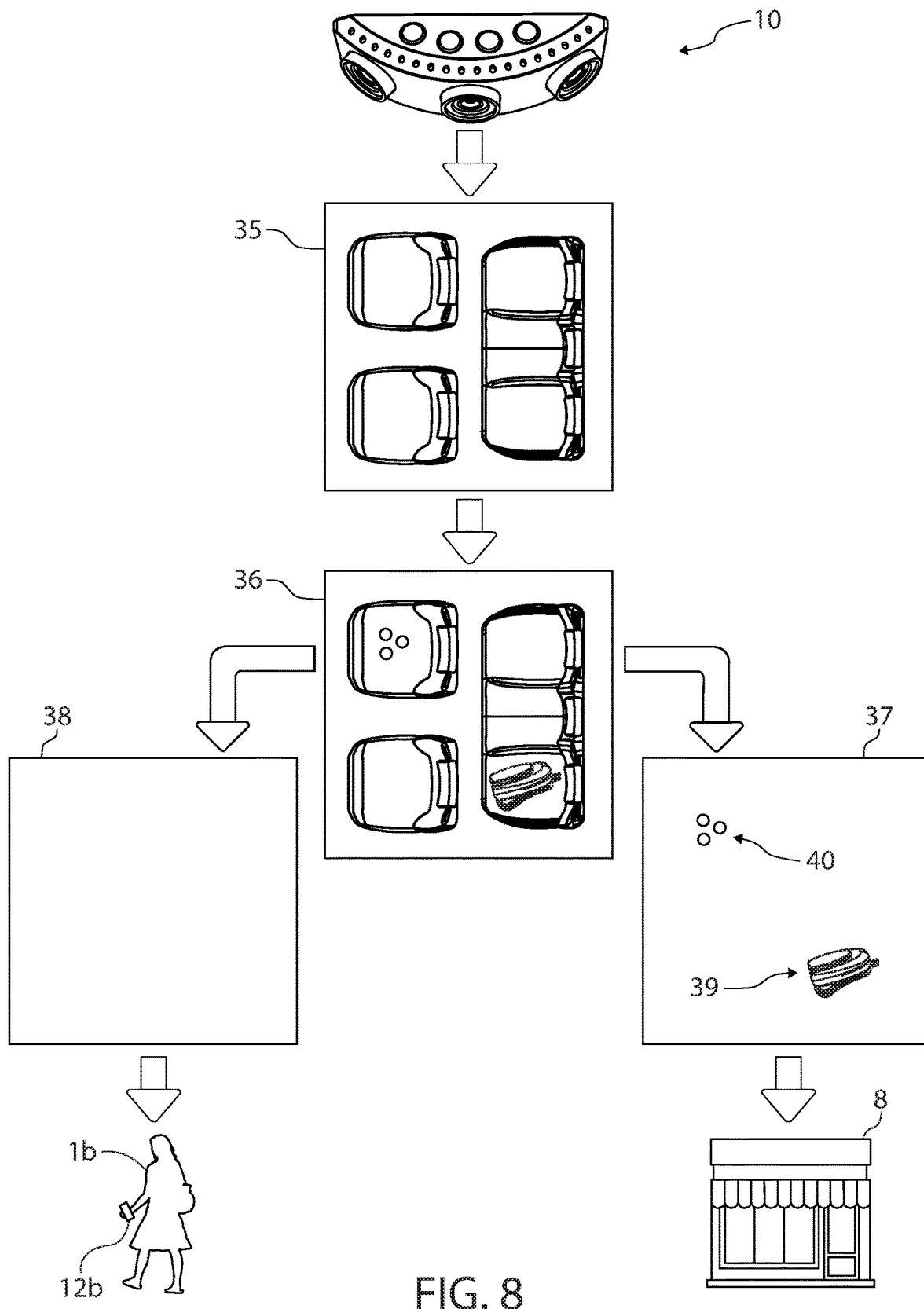

FIG. 8 illustrates a diagrammatic view of the system deciding to pick up a second rider 1b or deciding to go to a first location 8 (e.g., to remove an item left behind by a first rider 1). The system can detect items 39, 40 left behind by analyzing the second image 36 to detect things that should not be in the self-driving vehicle 2 after a rider 1 has left the self-driving vehicle 2. The system can detect items 39, 40 left behind by comparing the second image 36 to a baseline image 35 (of items that should be located in the vehicle 2). If the system detects items 39, 40 (e.g., as illustrated in image 37), then the system can send the self-driving vehicle 2 to the first location 8. If the system does not detect any items left behind (e.g., as illustrated in image 38), then the system can pick up the second rider 1b.

Figure 9:
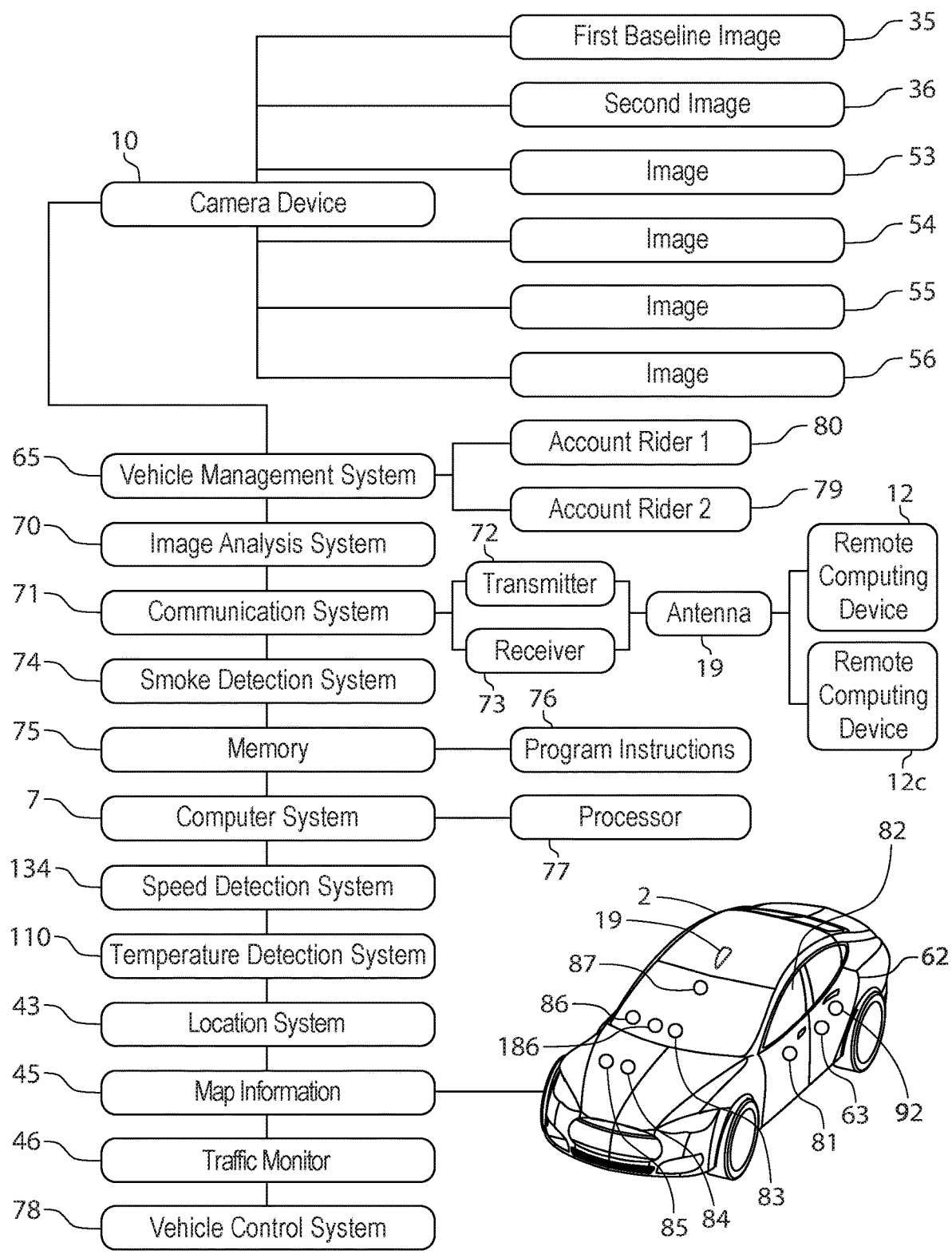
FIG. 9 illustrates a diagrammatic view that includes a self-driving vehicle, a camera system, and a smoke detection system, according to some embodiments.

FIG. 9 illustrates some of the elements of the maintenance system. Each of the elements illustrated in FIG. 9 is optional and is not necessarily present in each embodiment.

The maintenance system can include a camera device 10, which can include memory 75 having many images 35, 36, 53, 54, 55, 56 taken by the camera device 10. The camera device 10 can be communicatively coupled to a vehicle management system 65.

The vehicle management system 65 can be communicatively coupled to an image analysis system 70, a communication system 71, a smoke detection system 74, a memory 75 having program instructions 76, computer systems 7 having processors 77, a location system 43, map information 45 configured to help the vehicle 2 navigate to destinations, a traffic monitoring system 46 configured to receive up-to-date traffic information to enable the vehicle management system 65 to choose optimal routes to destinations, and a vehicle control system 78.

The vehicle control system 78 is configured to steer, brake, and accelerate the vehicle 2. The vehicle control system 78 is also configured to detect roads and obstacles on the roads.

The location system 43 is configured to receive a location of the remote computing device 12 associated with the first rider 1 and is configured to receive a location of the remote computing device 12b associated with the second rider 1b. The remote computing devices 12, 12b can send GPS, indoor location information, and/or other location information to the location system 43 to help the vehicle management system 65 determine where to pick up the rider 1, 1b and/or determine where to drop off an item left behind by a rider 1, 1b.

A user of a remote computing device can complete a number of steps to associate the remote computing device with herself. For example, Apple Inc. makes iPhones, Apple Watches, iPads, laptop computers, and other remote computing devices. A user can associate the iPhone, Apple Watch, iPad, laptop computer, or other remote computing device made by Apple Inc. by (1) turning on the device, (2) using the "Quick Start" option if the user has another device running iOS or selecting the "Set Up Manually" option, (3) activating the device and choosing a Wi-Fi network, (4) setting up "Face ID" and creating a password, and (5) signing in with an "Apple ID." Of course, other remote computing devices use other methods to associate a remote computing device with a particular user.

In some cases, a remote computing device is associated with a user simply because the remote computing device is in the user's possession and/or is being used by the user.

The communication system 71 can include a transmitter 72, a receiver 73, and an antenna 19. The antenna 19 can communicatively couple the vehicle management system 65 to remote computing devices 12, 12b of riders 1, 1b. The antenna 19 can communicatively couple the vehicle management system 65 to remote computing devices 12c of a manager of the vehicle 2.

The vehicle management system 65 can be communicatively coupled to an account 80 of a rider 1 to enable the system to fine the rider 1 for leaving items 39, 40 in the vehicle 2. The fine can be a dollar amount (e.g., $20) such as a trash 40 removal fee or a fee to return a valuable item 39 to a rider 1.

Some embodiments comprise a maintenance system configured to be used with a self-driving vehicle 2. In some embodiments, maintenance systems comprise a camera system coupled to an interior of the vehicle 2. The camera system can be configured to take a picture of an item left behind by a first rider. A maintenance system can comprise a vehicle management system configured to autonomously drive the vehicle 2 to a first location 8 to remove the item.

As used herein, a self-driving vehicle 2 can "autonomously drive" if the vehicle 2 is steering itself even if a person is providing input regarding navigation of the vehicle 2. The vehicle 2 can be configured to transport one or more passengers.

As used herein, a still image and a video can both be types of pictures. As used herein, a still image and a video can both be types of images.

In some embodiments, the camera system comprises a first camera coupled to a ceiling of the vehicle 2 and directed towards a first row of the vehicle 2, and the camera system comprises a second camera coupled to the ceiling of the vehicle 2 and directed towards a second row of the vehicle 2. (The first camera can be directed towards a first row if an image taken by the camera shows the first row. The second camera can be directed towards a second row if an image taken by the camera shows the second row.)

In some embodiments, the camera system comprises a first camera coupled to a rear-view mirror of the vehicle 2 and directed towards a first row of the vehicle 2, and the camera system comprises a second camera coupled to a ceiling of the vehicle 2 and directed towards a second row of the vehicle 2.

In some embodiments, the camera system comprises a first camera located in a trunk area of the vehicle 2 such that the first camera is configured to enable an image analysis system 70 to determine if the item is left in the trunk area.

In some embodiments, the maintenance system comprises an image analysis system 70 configured to detect the item left behind by comparing a first baseline image 35 taken by the camera system of the interior of the vehicle 2 to a second image 36 taken by the camera system after the first baseline image 35. Some embodiments comprise determining that the item is present in the second image 36 but not present in the first baseline image 35.

In some embodiments, the vehicle management system is configured to automatically drive the vehicle 2 to the first location 8 to remove the item in response to the image analysis system 70 detecting the item left by the first rider.

Some embodiments comprise a communication system 71 configured to send a first wireless communication to a remote computing device 12 associated with the first rider in response to the image analysis system 70 detecting the item left behind by the first rider. The first wireless communication can be configured to notify the first rider that the item was left behind.

The communication system 71 can be configured to send the first wireless communication to a remote computing device 12 directly (e.g., via radio communications) or indirectly (e.g., via intermediary communication systems 5).

In some embodiments, the communication system 71 is configured to send a second wireless communication comprising a third image 53 of the item to the remote computing device 12 in response to the image analysis system 70 detecting the item left behind by the first rider. The third image 53 can enable the rider to see the item on a display of her remote computing device 12.

In some embodiments, the vehicle management system is configured to receive an address of the first location 8 from the remote computing device 12 in response to the communication system 71 sending the first wireless communication. The vehicle management system can be configured to receive the address from the remote computing device directly or indirectly.

As used herein, "address" is used broadly and is not limited to a street address. An address can be a Global Positioning System ("GPS") location and can be any other location indicator. An address can be an indoor location (e.g., a location inside a large shopping center or apartment complex).

In some embodiments, the first location 8 is an address at which the first rider has requested to pick up the item. The address can be the rider's current address. The address can also be a location at which the rider is not currently located by at which the rider (or the rider's representative) plans to meet the vehicle 2 (or another vehicle 2 carrying the item) to retrieve the item.

In some embodiments, the communication system 71 is configured to receive a third wireless communication from the remote computing device 12 associated with the first rider in response to the communication system 71 sending the first wireless communication. The third wireless communication can comprise instructions for shipping the item. The instructions can comprise an address to which the system should ship the item. The instructions can comprise a manner in which the item should be shipped.

In some embodiments, the first location 8 is a shipping location (such as a FedEx, UPS, or USPS facility) configured to remove the item from the vehicle 2 and configured to ship the item according to the shipping instructions. The vehicle management system can be configured to enable removing the item from the vehicle 2 once the vehicle 2 is located at the shipping location. The vehicle 2 can unlock a door to enable removing the item. The vehicle 2 can send a smaller, short-range delivery robot to deliver the item to the shipping location.

In some embodiments, the vehicle management system is configured to receive the first location 8 of a service area configured to clean the vehicle 2. The vehicle management system can be configured to drive the vehicle 2 to the service area to remove the item in response to the image analysis system 70 detecting the item left by the first rider.

Some embodiments comprise a third image 54 taken by the camera system in response to the vehicle 2 leaving the service area. Some embodiments comprise a communication system 71 configured to send a first wireless communication comprising the third image 54 to a remote computing device 12c associated with a manager of the vehicle 2. The first wireless communication can be configured to enable the manager to verify that the item was removed from the vehicle 2.

Some embodiments comprise a third image 56 taken by the camera system. The image analysis system 70 can be configured to compare the third image 56 to the second image 36 to detect that the item was removed from the vehicle 2.

In some embodiments, the vehicle management system is configured to fine an account of the first rider in response to the image analysis system 70 detecting the item left behind by the first rider. The fine can be a sum imposed as a punishment for leaving the item.

In some embodiments, a communication system 71 is configured to send a first wireless communication to a remote computing device 12 associated with the first rider in response to the image analysis system 70 detecting the item left behind by the first rider. The communication system 71 can be configured to send the first wireless communication to a remote computing device 12 directly (e.g., via radio communications) or indirectly (e.g., via intermediary communication systems 5).

The first wireless communication can comprise a third image 53 taken by the camera system. The third image 53 can be configured to show the item. The first wireless communication can be configured to ask the first rider if the item belongs to the first rider. The communication system 71 can be configured to receive a second wireless communication from the remote computing device 12 in response to the first wireless communication. The second wireless communication can be configured to inform the maintenance system that the first rider is an owner of the item. The maintenance system can comprise a memory configured to record that the first rider is the owner of the item.

In some embodiments, the system is configured to automatically drive the vehicle 2 to the rider's current location (e.g., a GPS location).

In some embodiments, the maintenance system comprises a location detection system 43 configured to receive the first location 8 of a remote computing device 12 associated with the first rider to enable the vehicle management system to autonomously drive the vehicle 2 to the first location 8 in response to an image analysis system 70 detecting the item left by the first rider. The image analysis system 70 can be a part of the camera system. The image analysis system 70 can be located remotely from the vehicle 2.

Some embodiments notify a manager of the vehicle 2 that an item was left behind.

In some embodiments, the maintenance system comprises an image analysis system 70 configured to detect the item left behind by comparing a first baseline image 35 taken by the camera system of the interior of the vehicle 2 to a second image 36 (of the interior) taken by the camera system after the first baseline image 35.

In some embodiments, the maintenance system comprises a communication system 71 having an antenna 19, a transmitter 72, and a receiver 73. The communication system 71 can be configured to send a first wireless communication to a remote computing device 12c associated with a manager of the vehicle 2 in response to the image analysis system 70 detecting the item left behind by the first rider.

As used herein, the "manager" can be a person (other than a rider who is just renting the vehicle 2) or entity who is responsible for the vehicle 2. The manager can be an owner of the vehicle 2. The manager can be a person or entity to whom the owner has entrusted management of the vehicle 2 and/or maintenance of the vehicle 2.

The communication system 71 can be configured to send the first wireless communication to a remote computing device 12 directly (e.g., via radio communications) or indirectly (e.g., via intermediary communication systems 5).

In some embodiments, the first wireless communication is configured to notify the manager that the item was left behind. The communication system 71 can be configured to send a second wireless communication comprising a third image of the item to the remote computing device 12c in response to the image analysis system 70 detecting the item left behind by the first rider. In some embodiments, the vehicle management system is configured to receive a third wireless communication from the remote computing device in response to the communication system 71 sending the first wireless communication. The third second wireless communication can be configured to instruct the vehicle management system to autonomously drive the vehicle 2 to the first location 8 to remove the item.

In some embodiments, the vehicle management system is configured to determine that the first rider has exited the vehicle 2. The vehicle management system can be configured to cause the camera system to take a first interior image of the interior of the vehicle 2 in response to determining that the first rider has exited the vehicle 2.

In some embodiments, the maintenance system further comprises an image analysis system 70 having at least one processor 77 and a memory 75 comprising program instructions (e.g., code modules configured to be executed by one or more computers) that when executed by the at least one processor are configured to cause the image analysis system 70 to detect the item left behind by analyzing the first interior image taken by the camera system after the first rider has exited the vehicle 2. The first location 8 can be a vehicle cleaning facility. The vehicle management system can be configured to drive the vehicle 2 to the vehicle cleaning facility to remove the item in response to the image analysis system 70 detecting the item.

In some embodiments, the vehicle management system comprises a first mode and a second mode. In the first mode, the vehicle management system can be configured to make the vehicle 2 available to accept a pick-up request of a second rider. In the second mode, the vehicle management system can be configured to make the vehicle 2 unavailable to accept the pick-up request at that time (although the vehicle management system 65 can record the pick-up request such that the vehicle 2 can pick-up the person at a future time, such as after the vehicle 2 has been cleaned). As used herein, "available to accept a pick-up request" means that the vehicle 2 is ready to go pick up the person. As used herein, "unavailable to accept the pick-up request" means that the vehicle 2 is not ready to go pick up the person, but the pick-up can still be scheduled for a future time (e.g., after the vehicle 2 has been cleaned at a cleaning facility).

The vehicle management system can be configured to be in the second mode from a first time at which the image analysis system 70 detects the item left behind. The vehicle management system can be configured to exit the second mode and enter the first mode in response to at least one of the item being removed, receiving an indication that the vehicle 2 has been cleaned, and the vehicle 2 leaving a vehicle cleaning station. In some embodiments, the indication that the vehicle 2 has been cleaned comprises a wireless communication (e.g., from the cleaning facility) that communicates that the vehicle 2 has been cleaned.

In some embodiments, the vehicle management system is configured to determine that the first rider has exited the vehicle 2 in response to (1) receiving a location of a remote computing device 12 associated with the first rider and determining that the location is not inside the vehicle 2, (2) failing to detect a direct wireless communication from the remote computing device 12 to an antenna of the vehicle 2, (3) determining, by the image analysis system 70, that a second interior image does not show the first rider, and/or (4) determining, by the image analysis system 70, that an infrared image of the interior of the vehicle 2 does not show the first rider.

As used herein, a "direct wireless communication" is a wireless communication that does not use intermediary communication systems 5 for communicative coupling between the remote computing device 12 and an antenna 19 that is mechanically coupled to the vehicle 2. For example, the vehicle 2 can communicate directly with a remote computing device 12 located inside the vehicle 2 via Bluetooth. This Bluetooth communication is one example of a direct wireless communication. Other communication protocols other can Bluetooth can also enable direct wireless communication. Other radio communication systems can enable direct wireless communication.

In some embodiments, the maintenance system comprises at least one processor 77 and a memory 75 comprising program instructions that when executed by the at least one processor cause the maintenance system to (1) compare a first baseline image 35 taken by the camera system of the interior of the vehicle 2 to a second image 36 taken by the camera system after the first baseline image 35 to detect the item left behind by the first rider, and/or (2) drive, by the vehicle management system, the vehicle 2 to the first location 8 to remove the item in response to the detecting the item. The program instructions can comprise code modules configured to be executed by one or more computers located in the vehicle 2 and/or located away from the vehicle 2.

In some embodiments, the first location 8 is a first vehicle cleaning facility. The program instructions can be configured to select the first vehicle cleaning facility based at least in part on determining a distance from the vehicle 2 to the first vehicle cleaning facility and/or based at least in part on determining that the first vehicle cleaning facility is approved by a manager of the vehicle 2.

A manager can receive a list of vehicle cleaning facilities. The list can include prices, services offered, user reviews, and locations. The manager can then select which of the vehicle cleaning facilities she approves. Once approved, the system can select which of the approved facilities to use to clean the vehicle 2 based on many factors including which facility is open, which facility is closest to the current location of the vehicle 2, and which facility will be closest to an anticipated future location of the vehicle 2.

The memory 75 can comprise a list of vehicle cleaning facilities that were approved by the manager of the vehicle 2. The list can include a location of each cleaning facility. The program instructions can be configured to choose a cleaning facility that was previously approved by the manager and is located near the current location of the vehicle 2.

In some embodiments, the program instructions are configured to send a first wireless communication to a remote computing device 12 associated with the first rider in response to detecting the item. The first wireless communication can comprise an image of the item. The program instructions can be configured to receive a second wireless communication from the remote computing device 12 in response to sending the first wireless communication. The second wireless communication can comprise an instruction (e.g., from the first rider) to return the item. The program instructions can be configured to drive, by the vehicle management system, the vehicle 2 to the first location 8 in response to the instruction.

One barrier to owners of self-driving vehicles being willing to allow other people to ride in their vehicles (e.g., when the owner is not present) is that owners are concerned riders will smoke in their vehicles. Smoking can leave a lasting smell that is bothersome to vehicle owners and bothersome to subsequent riders.

When a self-driving vehicle gives rides to riders, there may be times when an owner, manager, or driver is not in the vehicle. As a result, the rider might feel free to smoke in the vehicle. Smoking in the vehicle, however, could substantially damage the value of the vehicle and undermine the experience of future riders. Thus, there is a need for systems and methods are detect smoke inside self-driving vehicles.

Many types of smoke detection systems can be used inside vehicles. Some embodiments use optical smoke detectors, ionization smoke detectors, and camera-based smoke detectors (that use machine vision, image recognition, and/or artificial intelligence to recognize smoke). Smoke detectors can be coupled to a ceiling inside the vehicle (because smoke can float upward) and can be coupled to any location inside the vehicle. In some embodiments, smoke detectors are integrated into a camera system and/or into the dash of the vehicle.

There are many types of optical smoke detectors. In some types, an infrared light beam from a light-emitting diode ("LED") is projected into a chamber. Holes in an outer covering of the smoke detector can allow smoke to move into the chamber. The chamber can include an electronic light detector (e.g., a photocell) that generates electricity in response to light hitting the electronic light detector. The LED can be oriented in such a way that it is not pointed at the light detector. When smoke enters the chamber, however, the smoke can cause the light beam from the LED to be scattered. Some of the scattered light can hit the light detector. An electronic circuit can monitor the light detector and can determine whether infrared light is hitting the detector. The smoke detector can interpret infrared light hitting the detector as an indication of smoke. The smoke detector can be configured to emit an audio alarm and/or send a wireless communication in response to infrared light hitting the detector.

Some embodiments use photoelectric smoke detectors. Photoelectric smoke detectors can be well suited to detecting certain types of smoke.

Some smoke detection system embodiments comprise ionization smoke detectors. There are many types of ionization smoke detectors. In some embodiments, ionization smoke detectors have a chamber. Holes in an outer housing of the smoke detector can allow smoke to enter the chamber. The chamber can be filled with ions. The ions can come from a chemical element called americium.

Americium can release tiny radioactive particles (called alpha particles), which leak into the detection chamber. As the radioactive particles from the americium enter the chamber, the radioactive particles can collide with air molecules and turn them into positively charged ions and negatively charged electrons. The ions and electrons can move in opposite directions between two electrodes. As long as the ions and electrons are moving, a current flows between the electrodes, which a circuit in the smoke detector can interpret as being an indication that smoke is not present in the vehicle.

If smoke is present, however, smoke particles get into the detector and start to clog up the ionization chamber. The smoke particles attach themselves to the ions and effectively shut off the electric current. The circuit in the detector can detect that change and can interpret the lack of the electrical current as an indication that smoke is present in the vehicle.

When smoke is no longer present in the chamber, the current between the electrodes can resume, which the smoke detector can determine is an indication of the smoke no longer being present in the vehicle.

Some embodiments have a smoke detection system that uses a camera system to "see" the smoke (and thereby detect the smoke). The camera system can see the smoke by recognizing the distinct shape of smoke moving through the air. For example, a cloud of smoke inside a vehicle has a particular shape that a camera system can recognize as an indication of smoke being present in the vehicle.

The cloud of smoke created by electronic cigarette use has a different appearance (e.g., a different shape, different movement patterns, and different optical properties) than the appearance (e.g., shape, movement patterns, and optical properties) of smoke created by non-electric cigarette smoking. The camera system can thus "see" the difference between a cloud of smoke created by electronic cigarette use and the cloud of smoke created by non-electronic cigarette use.

The maintenance system can include at least one processor and a memory comprising program instructions that when executed by the at least one processor cause the smoke detection system to determine whether the smoke is from electronic cigarette use or is from non-electronic cigarette use by analyzing the appearance (e.g., shape, movement patterns, and optical properties) of the smoke.

In some embodiments, the smoke detection system comprises a camera system and an image analysis system configured to detect the smoke inside the vehicle by comparing a first baseline image taken by the camera system of an interior of the vehicle to a second image taken by the camera system (of the interior of the vehicle) after the first baseline image.

The image analysis system can include at least one processor and a memory comprising program instructions that when executed by the at least one processor cause the image analysis system to compare a first baseline image taken by the camera system of the interior of the vehicle to a second image taken by the camera system after the first baseline image to detect the smoke. The smoke can appear in the second image (e.g., taken by the camera while the rider is smoking) but not appear in the first image (e.g., taken by the camera before the rider started smoking). A visible difference between the two images can be a cloud of smoke.

Many different types of smoke detectors can analyze a size of a particle of the smoke. A small particle of smoke can be indicative of the smoke being from non-electronic cigarette use. A large particle of smoke can be indicative of the smoke being from electronic cigarette use.

As used herein, "smoke" is used broadly to include smoke generated by burning cigarettes and to include aerosol (sometimes called "vapor") created by electronic cigarette use (sometimes called "vaping").

As used herein, "cigarettes" are used to burn materials such that the user can inhale the smoke. Cigarettes can burn many substances including, but not limited to tobacco, marijuana, other psychoactive materials, and other materials that people burn to inhale. As used herein, "cigarette" is used broadly and can include a roll of material enclosed in paper and meant to be smoked, but also includes many other smoking devices such as cigars, pipes, bongs, and bubblers.

As used herein, "electronic cigarettes" are used to heat a liquid or other substance to generate an aerosol (which is sometimes called a "vapor"). Some liquids include nicotine, propylene glycol, glycerin, flavorings, and drugs. As used herein, "electronic cigarette" is used broadly and includes all the diverse shapes and types of electronic cigarettes. Some electronic cigarettes include a mouthpiece, a cartridge (tank), a heating element (atomizer), a microprocessor, and a battery. As used herein, "electronic cigarettes" include vaping devices of all shapes, styles, and sizes and is not limited to vaping devices that have a slim, cylindrical appearance.

Nittan Europe Limited is registered in England and makes a dual optical smoke detector called the EV-DP. Using the scattered light principle inherent in optical detectors, the dual optical smoke detector uses both infrared LEDs and blue LEDs to provide an accurate measurement of particles within the chamber of the smoke detector. By calculating the ratio of these light sources, which operate at different wavelengths, the dual optical smoke detector can determine the particle size and thus distinguish between smoke due to combustion (of cigarettes) and smoke due to aerosol generated by non-combustion products (e.g., vaping devices).

The entire contents of the following patent are incorporated by reference herein: U.S. Pat. No. 6,011,478; issued Jan. 4, 2000; and entitled Smoke Sensor and Monitor control System.

U.S. Pat. No. 6,011,478 describes smoke detection systems that analyze the sizes of particles of smoke. The components described in U.S. Pat. No. 6,011,478 that analyze the sizes of particles of smoke are included in the camera device 10 described herein.

The smoke detection system can also comprise an optical smoke detector (e.g., the EV-DP) configured to analyzing a particle size of the aerosol. The smoke detection system can detect electronic cigarette aerosol by analyzing a particle size of the aerosol and determining that the particle size is indicative of electronic cigarette use (e.g., the particle size is larger than is typical for combustion-generated smoke).

The smoke detection system can determine if the particle size is smaller than a predetermined threshold by directly determining that the particle size is smaller than the threshold. The smoke detection system can also determine if the particle size is smaller than a predetermined threshold by determining that the particle size is larger than the threshold (because by knowing that the particle size is larger than the threshold, the system also effectively knows that the particle size is not smaller than the threshold).

The smoke detection system can determine if the particle size is larger than a predetermined threshold by directly determining that the particle size is larger than the threshold. The smoke detection system can also determine if the particle size is larger than a predetermined threshold by determining that the particle size is smaller than the threshold (because by knowing that the particle size is smaller than the threshold, the system also effectively knows that the particle size is not larger than the threshold).

In some embodiments, rather than use the process of elimination, the smoke detection system actually measures the particles and then determines if the size of each particle is smaller or larger than the threshold. The threshold can be chosen such that being smaller than the threshold is indicative of the particle being cigarette smoke and being larger than the threshold can be indicative of the particle being electronic cigarette aerosol. The maintenance system's reaction to detecting cigarette smoke can be different (e.g., more extreme) than the maintenance system's reaction to electronic cigarette aerosol (which is typically less damaging to vehicles).

Figure 10:
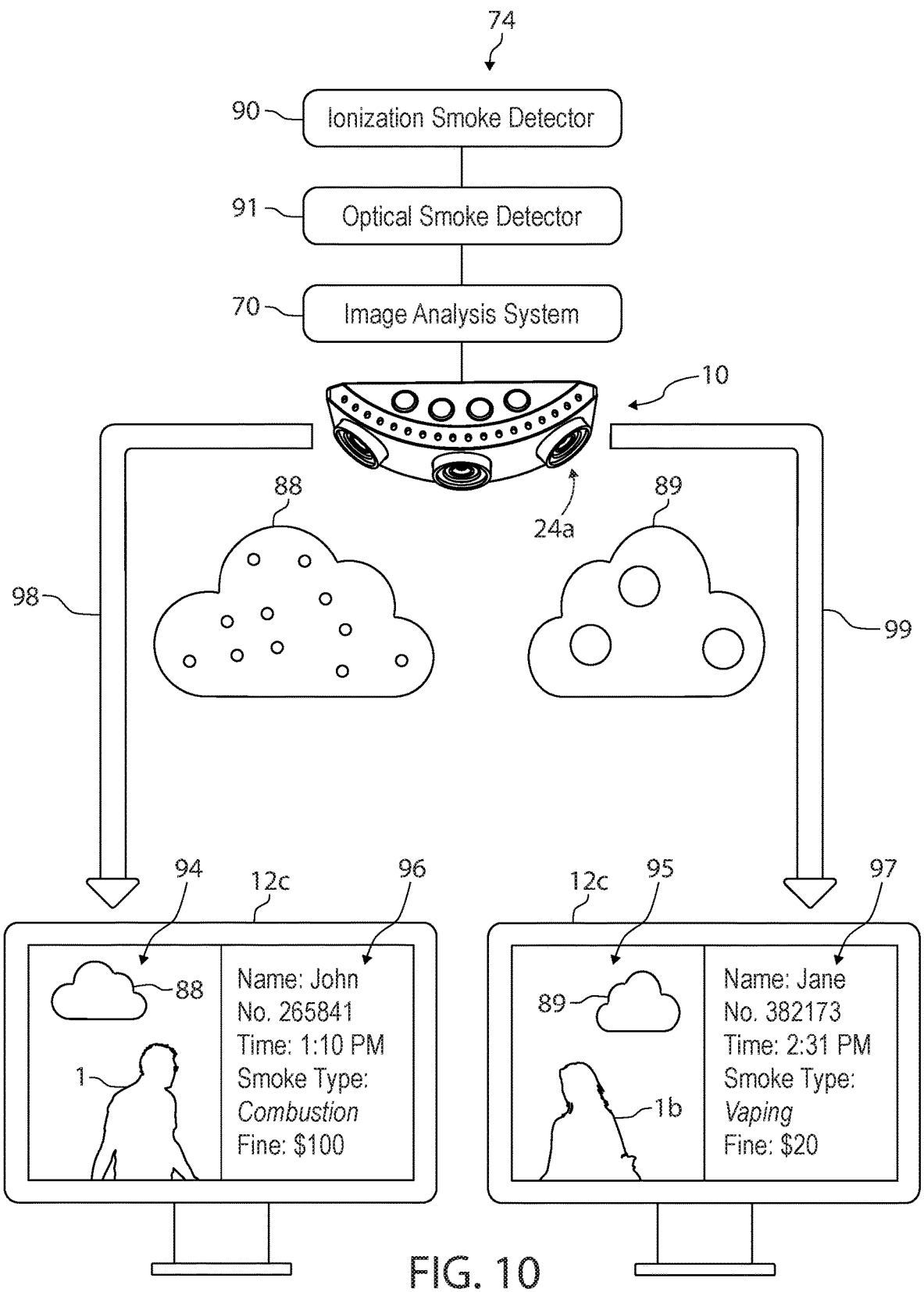
FIGS. 10 and 11 illustrate diagrammatic views of a smoke detection system, according to some embodiments.

FIG. 10 illustrates a diagrammatic view of a smoke detection system 74. When the camera device 10 includes at least one smoke detector, the camera device 10 can be a smoke detection system 74. Many types of smoke detectors can be used including ionization smoke detectors 90, optical smoke detectors 91, camera-based smoke detectors (which can include an image analysis system 70 and cameras 24a, 24b, 24c), and any other type of smoke detector.

The ionization smoke detector 90, the optical smoke detector 91, and the image analysis system 70 can be part of the camera device 10 (e.g., such that they are located inside the device 10). In some embodiments, the ionization smoke detector 90, the optical smoke detector 91, and/or the image analysis system 70 are located outside of the camera device 10, but are still located inside the vehicle 2.

In some embodiments, the image analysis system 70 is located remotely relative to the vehicle 2 such that a camera 24a takes images (which can be videos or still images) of the inside of the vehicle 2 and a communication system 71 sends the images to the image analysis system 70 (which can include a server located far from the vehicle 2). The communication system 71 can send the images to the image analysis system 70 via intermediary communication systems 5. The image analysis system 70 can analyze the images to determine if the images show smoke.

The smoke detection system 74 can be coupled to the vehicle 2 (e.g., to a ceiling of the vehicle 2). The smoke detection system 74 can detect smoke inside the vehicle 2. FIG. 10 illustrates two clouds of smoke 88, 89. A first cloud of smoke 88 includes small particles (which are illustrated as small circles). A second cloud of smoke 89 includes large particles (which are illustrated as large circles). The smoke detection system 74 can analyze the size of the particles in many different ways.

The smoke detection system 74 can use both infrared LEDs and blue LEDs to provide an accurate measurement of particles within the chamber of the smoke detector. By calculating the ratio of these light sources, which operate at different wavelengths, the smoke detection system 74 can determine the particle size and thus distinguish between smoke due to combustion (of cigarettes) and smoke due to aerosol generated by non-combustion products (e.g., vaping devices).

The entire contents of the following patent are incorporated by reference herein: U.S. Pat. No. 6,011,478; issued Jan. 4, 2000; and entitled Smoke Sensor and Monitor Control System. The smoke detection system 74 can use any of the embodiments described in U.S. Pat. No. 6,011,478 to analyze the size of the particles in smoke to determine if the particles are larger or smaller than a predetermined threshold. The threshold can be chosen such that detecting particles larger than the threshold is indicative of the smoke being from non-combustion (e.g., electronic cigarette aerosol) and detecting particles smaller than the threshold is indicative of the smoke being from combustion (e.g., cigarette smoking).

Detecting particles smaller than the threshold (e.g., as indicated by the first cloud of smoke 88) can cause the system to label the event as a combustion (e.g., cigarette smoking) event. The system can send a wireless communication 98 (which may be via intermediary communication systems 5) to a remote computing device 12c of a manager of the vehicle 2. The manager can be an entity responsible for the maintenance of the vehicle 2. The manager can be an owner of the vehicle 2.

FIG. 10 illustrates the remote computing device 12c as a desktop computer, but the remote computing device 12c can be a server, the Cloud, any type of remote computing device described herein or incorporated by reference, or any other suitable computer.

The first wireless communication 98 (which can comprise many wireless communication sessions) can be configured to enable the remote computing device 12c to show an image 94 of the rider 1 who was smoking in the vehicle 2. The image 94 can show the rider 1 in the act of smoking in the vehicle 2 (e.g., to serve as proof that the rider 1 was smoking in the vehicle 2).

The wireless communication 98 (which can comprise many wireless communication sessions) can comprise data regarding the smoking event. The data can include the name of the rider 1, an account number of the rider 1, a ride number, and/or any other data that serves to identify the rider 1. The wireless communication 98 can also comprise data regarding whether the smoke detected by the smoke detection system 74 was due to non-combustion (e.g., electronic cigarette aerosol) or combustion (e.g., cigarette smoking). The fine due to detecting combustion can be higher than the fine due to non-combustion due to the greater harm caused by combustion smoke (rather than non-combustion smoke) inside the vehicle 2. The system's reaction to combustion smoke can be more extreme than the system's reaction to non-combustion smoke.

The remote computing device 12c can be configured to show data 96 regarding the rider 1 and the smoking event of the rider 1.

Detecting particles larger than the threshold (e.g., as indicated by the second cloud of smoke 89) can cause the system to label the event as a non-combustion (e.g., vaping)

event. The system can send a second wireless communication 99 (which may be via intermediary communication systems 5) to a remote computing device 12c of a manager of the vehicle 2. The remote computing device 12c shown in the lower right of FIG. 10 illustrates information displayed by the remote computing device 12c in response to the second wireless communication 99 regarding the non-combustion smoking event.

The second wireless communication 99 (which can comprise many wireless communication sessions) can be configured to enable the remote computing device 12c to show an image 95 of the rider 1b who was smoking in the vehicle 2. The image 95 can show the rider 1b in the act of smoking in the vehicle 2 (e.g., to serve as proof that the rider 1b was smoking in the vehicle 2).

The second wireless communication 99 (which can comprise many wireless communication sessions) can comprise data regarding the smoking event. The data can include the name of the rider 1b, an account number of the rider 1b, a ride number, and/or any other data that serves to identify the rider 1b.

The second wireless communication 99 can also comprise data regarding whether the smoke detected by the smoke detection system 74 was due to non-combustion (e.g., electronic cigarette aerosol) or combustion (e.g., cigarette smoking).

The remote computing device 12c can be configured to show data 97 regarding the rider 1b and the smoking event of the rider 1b.

Figure 11:
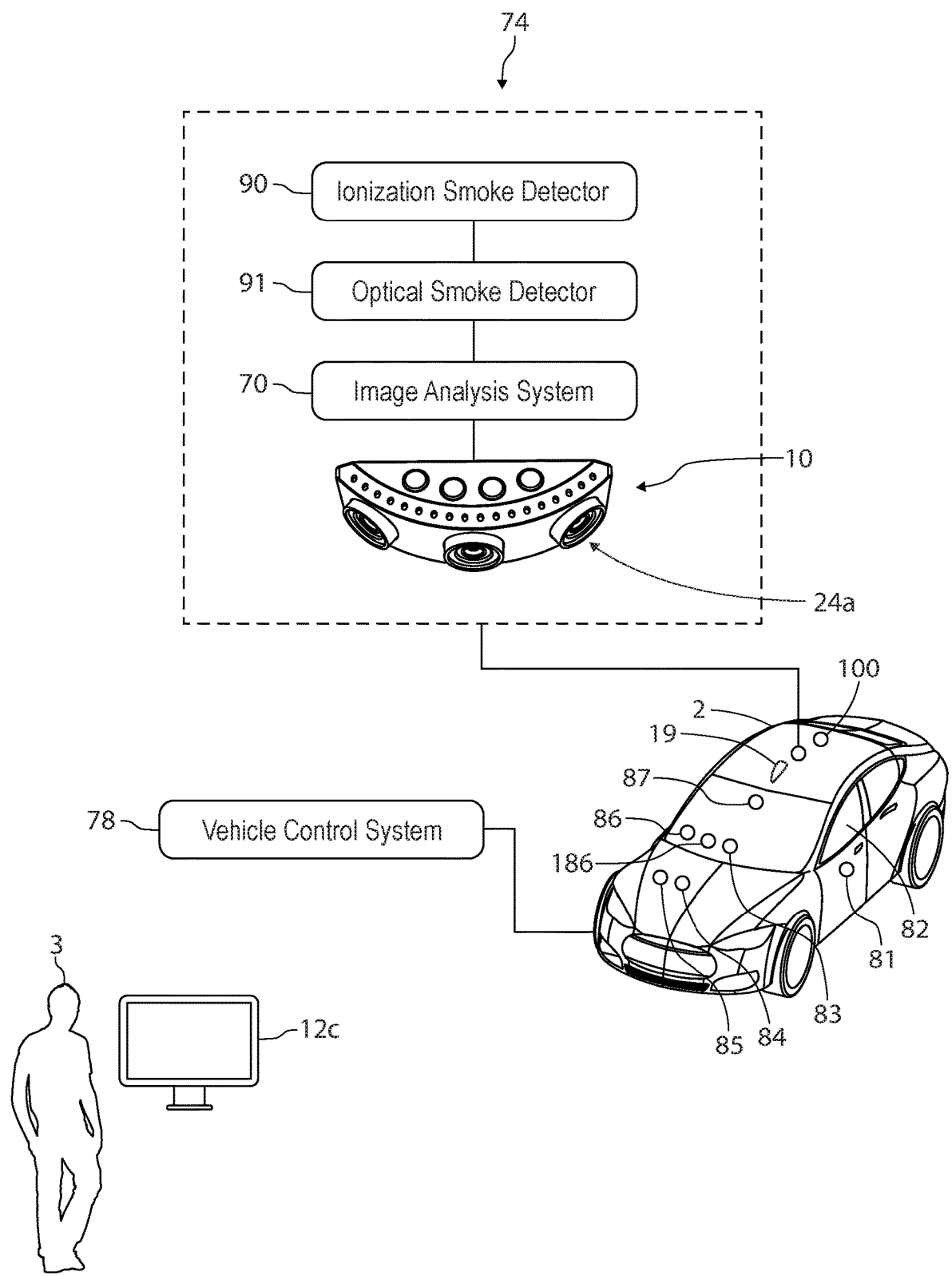

FIG. 11 illustrates a diagrammatic view of a smoke detection system 74. FIG. 11 includes a small circle in the ceiling of the vehicle 2. This small circle illustrates one location (out of many) in which the smoke detection system 74 can be placed inside the vehicle 2. The smoke detection system 74 can be located inside the cabin of the vehicle 2.

A remote computing device 12c of a manager 3 of the vehicle 2 can receive wireless communications from the vehicle 2 (in some cases via intermediary communication system 5) in response to the vehicle 2 detecting smoke.

The vehicle 2 can include a window 82 and a motor 81 configured to move the window 82 (of the vehicle 2) up and down. The motor 81 can be embedded in a door of the vehicle 2.

The vehicle 2 can include a fan 83 configured to circulate air inside the cabin of the vehicle 2. In some vehicles 2, the fan 83 is embedded inside a vent inside the dash.

The vehicle 2 can include a temperature management system 85 having a thermometer, an air conditioner, a heater, and a ventilation system 84. The temperature management system 85 can be configured to control an ambient temperature inside the cabin of the vehicle 2 by heating or cooling air inside the cabin. In some embodiments, the temperature management system 85 is configured to heat the air inside the cabin to approximately 74 degrees Fahrenheit (e.g., on cold days) and is configured to cool the air inside the cabin to approximately 74 degrees Fahrenheit (e.g., on hot days). In other embodiments, however, the temperature management system 85 is configured to deliberately make the ambient temperature inside the cabin uncomfortably hot or cold in response to the smoke detection system 74 detecting smoke inside the cabin.

On a hot day (with an outside temperature greater than 74 degrees Fahrenheit), the temperature management system 85 can heat the cabin air to a temperature that is greater than 84 degrees Fahrenheit and/or greater than 90 degrees Fahrenheit.

On a cold day (with an outside temperature less than 74 degrees Fahrenheit), the temperature management system 85 can cool the cabin air to a temperature that is less than 64 degrees Fahrenheit, less than 50 degrees Fahrenheit, and/or less than 40 degrees Fahrenheit.

The vehicle 2 can include a speaker 86 configured to emit sounds (e.g., music, audio commands) inside the cabin of the vehicle 2. In some vehicles 2, the speaker 86 is embedded inside the dash of the vehicle 2. In some vehicles 2, the speaker 86 is located along the top, bottom, or side of the cabin of the vehicle 2 and arranged and configured to emit sounds towards the seats. The vehicle 2 can also include a microphone 186 configured to record sounds, such as a verbal response, inside the cabin of vehicle 2. In some vehicles 2, the microphone 186 is embedded inside the dash of the vehicle 2. In some vehicles 2, the microphone 186 is located along the top, bottom, or side of the cabin of the vehicle 2 and arranged and configured to record sounds from rider(s) in the seat(s).

The vehicle 2 can include a rain sensor 87. The rain sensor 87 can be based on the principle of total internal reflection. An infrared light is beamed at a 45-degree angle into the windshield from the interior of the vehicle 2 (e.g., just behind the windshield of the vehicle 2). If the windshield glass is wet, less light makes it back to a light sensor than if the windshield glass is dry. Measuring the light that makes it back to the light sensor provides an indication of whether it is raining (because the windshield is wet when it is raining).

The following U.S. patents, the entire contents of which are incorporated herein by reference, describe additional types of rain sensors 87 that can be used with the embodiments described herein: U.S. Pat. Nos. 4,578,995; 4,584,508; 4,987,296; 6,392,218; and 6,341,523. Some embodiments use other types of rain sensors.

Some rain sensor embodiments use a camera (e.g., looking out of a window of the vehicle) to "see" if it is raining outside the vehicle. For example, in 2017 Tesla introduced an update that enabled their cars to utilize onboard cameras to passively detect rain without the use of a dedicated sensor.

Some embodiments comprise a maintenance system configured to be used with a self-driving vehicle 2. The maintenance system can use a smoke detector to detect smoke inside the vehicle 2 and then can take actions in response to detecting the smoke.

A maintenance system can comprise a smoke detection system 74 configured to detect smoke inside a cabin of the vehicle 2; a communication system 71 configured to send a first wireless communication to a remote computing device 12c associated with a manager of the vehicle 2 in response to the smoke detection system 74 detecting the smoke; and/or a vehicle management system 65 configured to autonomously drive the vehicle 2.

The vehicle management system 65 can be mechanically coupled to the vehicle 2. In some embodiments, the vehicle management system 65 is located remotely relative to the vehicle 2. In some embodiments, a portion of the vehicle management system 65 is mechanically coupled to the vehicle 2 and another portion of the vehicle management system 65 is not mechanically coupled to the vehicle 2 but is communicatively coupled to the vehicle 2.

A vehicle management system 65 can be configured to autonomously drive the vehicle 2 even if a rider provides some input such as a destination and even if the rider is told to intervene to drive the vehicle 2 in certain circumstances.

In some embodiments, the smoke detection system 74 comprises a camera system and an image analysis system 70 configured to detect the smoke inside the vehicle 2 by comparing a first baseline image taken by the camera system of an interior of the vehicle 2 to a second image taken by the camera system (of the interior of the vehicle 2) after the first baseline image.

In some embodiments, a maintenance system comprises a memory 75 having an identification of a first rider of the vehicle 2. The communication system 71 can comprise an antenna 19, a transmitter 72, and/or a receiver 73. The communication system 71 can be configured to send the identification of the first rider to the remote computing device 12*c* of the manager in response to the smoke detection system 74 detecting the smoke inside the vehicle 2.

Many different types of identifying information can be used as identification of the rider. In some embodiments, the identification is a name of the rider, a picture of the rider, a number or code that represents the rider's account, a credit card number, a social security number, a driver's license number, a number or code that represents the ride that the rider took, and/or any information configured to help identify the rider.

In some embodiments, a maintenance system comprises a camera system coupled to an interior of the vehicle 2. The camera system can be configured to take a picture of a first rider smoking. The communication system 71 can be configured to send the picture of the first rider smoking to the remote computing device 12*c*.

In some embodiments, the camera system comprises a first camera directed towards a first row of the vehicle 2. The first camera can be configured to take the picture in response to the smoke detection system 74 detecting the smoke inside the vehicle 2.

In some embodiments, the smoke detection system 74 comprises an ionization smoke detector 90 configured to detect cigarette smoking. The smoke detection system 74 can also comprise an optical smoke detector 91 configured to detect electronic cigarette aerosol by analyzing a particle size of the aerosol and determining that the particle size is indicative of electronic cigarette use.

As used herein, smoke can include aerosol generated by "vaping" and also smoke generated by burning cigarettes.

Electronic cigarettes can include all types of devices used to heat a liquid to generate an aerosol, commonly called a "vapor," that the user inhales.

Cigarettes can be used to burn many psychoactive materials including tobacco and marijuana.

In some embodiments, the smoke detection system 74 comprises at least one optical smoke detector 90 configured to analyze a particle size of the smoke. The communication system 71 is configured to send the first wireless communication identifying the smoke as an aerosol in response to the smoke detection system 74 determining that the particle size is greater than a predetermined threshold. The communication system 71 can be configured to send the first wireless communication identifying the smoke as cigarette smoking in response to the smoke detection system 74 determining that the particle size is less than the predetermined threshold.

The first wireless communication can comprise multiple wireless communications and is not limited to a single communication instance. The first wireless communication can comprise many wireless communication sessions.

In some embodiments, a camera system is coupled to an interior of the vehicle 2. The camera system can be configured to take a picture of a first rider smoking. The communication system 71 can be configured to send the picture of the first rider smoking to the remote computing device 12*c*.

The first wireless communication 98 can be configured to enable the remote computing device 12*c* to display the picture of the first rider smoking and to display an indication 96 of whether the smoke is due to the aerosol or the cigarette smoking.

The vehicle management system 65 can automatically take many actions in response to the smoke detector detecting smoke.

In some embodiments, the vehicle management system 65 comprises a motor 81 configured to open a window 82 of the vehicle 2. The vehicle management system 65 can be configured to use the motor 81 to automatically roll down the window 82 in response to the smoke detection system 74 detecting the smoke inside the vehicle 2.

In some embodiments, the vehicle management system 65 comprises a ventilation system 84 having a fan 83 to push air in the cabin. The fan 83 can be located inside the dash of the vehicle 2 such that the fan 83 pushes air in the cabin by pushing air through a vent and into the cabin. The vehicle management system 65 can be configured to automatically increase a rate at which the ventilation system 84 pushes outside air into the cabin of the vehicle 2 in response to the smoke detection system 74 detecting the smoke inside the vehicle 2. In several embodiments, the rate is increased by increasing a rotational speed of the fan 83.

In some embodiments, the vehicle management system 65 comprises a ventilation system 84, and the vehicle management system 65 is configured to use the ventilation system 84 to automatically inject outside air into the cabin of the vehicle 2 in response to the smoke detection system 74 detecting the smoke inside the vehicle 2.

In some embodiments, the vehicle management system 65 comprises a temperature management system 85 having a thermometer and having at least one of an air conditioner, a heater, and a ventilation system 84 having a fan 83 to circulate air in the cabin. The fan 83 can be located inside a vent inside the dash of the vehicle 2 such that the fan 83 is configured to circulate air in the cabin by pushing air out from a vent. The vehicle management system 65 can be configured to at least one of increase and decrease an ambient temperature inside the cabin by at least ten degrees Fahrenheit in response to the smoke detection system 74 detecting the smoke inside the vehicle 2 to decrease a comfort level of a first rider.

In some embodiments, the vehicle management system 65 is configured to decrease an ambient temperature inside the cabin by at least ten degrees Fahrenheit and/or by at least twenty degrees Fahrenheit in response to the smoke detection system 74 detecting the smoke inside the vehicle 2 to decrease a comfort level of a first rider. The vehicle management system 65 can be configured to increase an ambient temperature inside the cabin by at least ten degrees Fahrenheit and/or by at least twenty degrees Fahrenheit in response to the smoke detection system 74 detecting the smoke inside the vehicle 2 to decrease a comfort level of a first rider.

In some embodiments, a maintenance system is configured to be used with a self-driving vehicle 2. A maintenance system can comprise a smoke detection system 74 coupled to the vehicle 2 and configured to detect smoke inside a cabin of the vehicle 2. The smoke detection system 74 can be coupled to the vehicle 2 by being placed inside the vehicle 2, being attached to a roof of an interior of the vehicle 2, and/or coupled to the vehicle 2 in any suitable way configured to enable the smoke detection system 74 to detect smoke inside the vehicle 2. A maintenance system can comprise a vehicle management system configured to autonomously drive the vehicle 2.

In some embodiments, a vehicle management system is configured to respond in response to the smoke detection system 74 detecting the smoke inside the vehicle 2. Embodiments described herein include many different ways in which the vehicle management system can respond to the smoke detection system 74 detecting smoke inside the vehicle 2. Responses can protect the safety of riders inside the vehicle 2 and/or can reduce smoke damage to the vehicle 2.

In some embodiments, a maintenance system comprises a communication system 71 configured to send a first wireless communication to a remote computing device in response to the smoke detection system 74 detecting the smoke inside the vehicle 2. The remote computing device can be associated with a manager of the vehicle 2 such that the first wireless communication is configured to notify the manager regarding the smoke inside the vehicle 2.

In some embodiments, the vehicle management system comprises a temperature management system 85. The temperature management system 85 can comprise a thermometer, an air conditioner, a heater, and a ventilation system 84. The ventilation system 84 can comprise a fan 83 configured to circulate air in the cabin of the vehicle 2. The vehicle management system can be configured to increase and/or decrease an ambient temperature inside the cabin by at least ten degrees Fahrenheit in response to the smoke detection system 74 detecting the smoke inside the vehicle 2. In response to the smoke detection system 74 detecting the smoke inside the vehicle 2, the vehicle management system can increase and/or decrease the ambient temperature to decrease a comfort level of a first rider. Making the rider hot or cold can decrease the comfort level of the first rider, which can discourage the rider from continuing to smoke in the vehicle 2.

In some embodiments, the maintenance system comprises at least one processor 77 and at least one memory 75 having program instructions 76 configured to be executed by the at least one processor 77. The program instructions 76 can be configured to cause the vehicle management system to at least one of increase and decrease the ambient temperature by at least ten degrees Fahrenheit and by less than thirty degrees Fahrenheit. In response to the smoke detection system 74 detecting smoke inside the vehicle 2, the program instructions 76 can cause the vehicle management system to increase and/or decrease the ambient temperature (e.g., by at least ten degrees Fahrenheit and/or by less than thirty degrees Fahrenheit) to decrease the comfort level of a rider inside the vehicle 2.

In some embodiments, the vehicle management system comprises a speaker 86 and/or a display screen 93. At least one of the speaker 86 and the display screen 93 can be configured to provide at least one of audio instructions and visual instructions to the first rider. At least one of the audio instructions and the visual instructions can be configured to instruct the first rider to cease smoking in order to enable changing the ambient temperature to increase the comfort level. For example, the instructions can tell the rider that the cabin of the vehicle will remain uncomfortably hot or uncomfortably cold until the rider stops smoking in the vehicle 2.

In some embodiments, the smoke detection system 74 is configured to analyze a particle size of the smoke to determine if the particle size is smaller than a predetermined threshold. The vehicle management system can be configured to increase and/or decrease the ambient temperature inside the cabin (to decrease the comfort level of the first rider) in response to the maintenance system detecting the smoke inside the vehicle 2 and determining that the particle size is smaller than the predetermined threshold.

In some embodiments, the vehicle management system is configured to automatically at least partially restore (increase) the comfort level in response to the smoke detection system 74 no longer detecting the smoke inside the vehicle 2, detecting that a concentration of the smoke is less than a predetermined threshold, detecting that a concentration of the smoke is decreasing, and/or detecting that a concentration of the smoke has decreased by at least a predetermined amount and/or ratio.

For example, if the program instructions caused the cabin temperature to fall from 73 degrees Fahrenheit to 50 degrees Fahrenheit (in response to detecting smoke in the cabin), then the program instructions can cause the cabin temperature to increase to 70 degrees Fahrenheit (to at least partially restore the comfort level) in response to the smoke detection system 74 no longer detecting the smoke inside the vehicle 2. If the program instructions caused the cabin temperature to rise from 73 degrees Fahrenheit to 90 degrees Fahrenheit (in response to detecting smoke in the cabin), then the program instructions can cause the cabin temperature to decrease to 73 degrees Fahrenheit (to restore the comfort level) in response to the smoke detection system 74 no longer detecting the smoke inside the vehicle 2.

In some embodiments, the vehicle management system 65 is configured to determine a local speed limit and is configured to automatically reduce a speed of the vehicle 2 below the local speed limit in response to the smoke detection system 74 detecting the smoke inside the vehicle 2.

In some embodiments, the vehicle management system 65 determines the local speed limit by receiving the local speed limit from a remote system (e.g., via a wireless communication to the vehicle management system 65).

In some embodiments, the vehicle management system 65 comprises data regarding speed limits of each area (e.g., street section) of a map. The vehicle management system 65 can determine the local speed limit by determining a location of the vehicle 2 and then using that location to determine which speed limit applies to the area of the location.

Some embodiments include reducing the speed so much that the vehicle 2 stops (e.g., such that the vehicle 2 is parked). The vehicle management system 65 can be configured to determine a suitable parking location in response to the smoke detection system 74 detecting the smoke inside the vehicle 2, and the vehicle management system 65 can be configured to park the vehicle 2 in the parking location in response to the smoke detection system 74 detecting the smoke inside the vehicle 2.

In some embodiments, the vehicle management system 65 comprises a speaker 86. The speaker 86 can be configured to emit audio commands instructing a first rider of the vehicle 2 to cease smoking in order to cause the vehicle management system 65 to increase the speed and/or start moving again after being stopped in a parking location. The audio commands can be words such as, "John, the car has stopped because it has detected that you are smoking. The car will not start moving again until you stop smoking. You have been fined $50 and will be fined an even larger amount if you do not stop smoking within 60 seconds."

Getting the rider to stop smoking right away is advantageous because additional time smoking will result in additional damage to the vehicle 2. A vehicle 2 that has been smoked in for 10 seconds typically will not smell as bad as a vehicle 2 that has been smoked in for 10 minutes.

Some embodiments comprise a first financial penalty for smoking and additional financial penalties for continuing to smoke inside the vehicle. The vehicle 2 can be configured to provide a ride to a first rider. The vehicle management system 65 can be configured to fine an account 80 of the first rider a first amount in response to the smoke detection system detecting the smoke inside the vehicle 2. The vehicle management system 65 can be configured to notify the first rider that the account 80 will be fined a second amount if the smoke detection system detects the smoke at a later time during the ride. The vehicle management system 65 can be configured to fine the account 80 the second amount in response to the smoke detection system detecting the smoke at the later time during the ride. The second amount can be greater than the first amount. The second amount can be at least forty percent greater than the first amount such that the large second amount is a strong deterrent to the rider deciding to continue smoking in the vehicle 2.

In some embodiments, the vehicle management system 65 can be configured to fine an account 79 of a second rider a certain amount of money (e.g., a financial fine) in esponse to the smoke detection system 74 detecting the smoke inside the vehicle 2.

In some embodiments, the vehicle 2 is configured to drive a first rider to a destination selected by the first rider. The vehicle management system 65 can be configured to cease driving towards the destination in response to the smoke detection system 74 detecting the smoke inside the vehicle 2. The vehicle 2 can pull over to the side of the road. The vehicle 2 can determine a suitable parking location and then can cease driving towards the destination by going to the parking location. The vehicle 2 can cease driving towards the destination by driving away from the destination. The vehicle management system 65 can be configured to continue driving towards the destination once the smoke detection system 74 no longer detects the smoke inside the vehicle 2.

In some embodiments, the vehicle management system 65 is configured to fine an account 80 of a first rider of the vehicle 2 in response to the smoke detection system 74 detecting the smoke inside the vehicle 2. The smoke detection system 74 can be configured to analyze a particle size of the smoke to determine if the particle size is larger than a predetermined threshold. The vehicle management system 65 can be configured to fine the account 80 a first amount if the particle size is larger than the predetermined threshold. The vehicle management system 65 can be configured to fine the account 80 a second amount if the particle size is smaller than the predetermined threshold. The second amount can be larger than the first amount and/or at least 20 percent larger than the first amount.

In some embodiments, the vehicle management system 65 comprises a lighting system 100 having at least one light coupled to an interior of the vehicle 2. The lighting system 100 can be configured to illuminate at least one of a seat of the vehicle 2 and a majority of the cabin. The vehicle management system 65 can be configured to use the lighting system 100 to illuminate at least one of the seat and the majority of the cabin in response to the smoke detection system 74 detecting the smoke inside the vehicle 2.

The light can be a spotlight to illuminate a seat in which the rider that is smoking is sitting. The light can be an LED. The light can be multiple LEDs.

In some embodiments, the vehicle management system 65 comprises a speaker 86. The speaker 86 can be configured to emit audio commands instructing a first rider of the vehicle 2 to cease smoking. The vehicle management system 65 can be configured to cease illuminating the majority of the cabin and/or cease illuminating the seat in response to the smoke detection system 74 no longer detecting the smoke inside the vehicle 2.

In some embodiments, the vehicle management system comprises a lighting system 100 configured to illuminate at least a portion of an interior of the vehicle 2. The lighting system 100 can comprise at least one light coupled to an interior of the vehicle 2. The lighting system 100 can be configured to illuminate at least one of a seat of the vehicle 2 and a majority of the cabin (of the vehicle 2). The vehicle management system can be configured to use the lighting system 100 to illuminate at least one of the seat and the majority of the cabin in response to the smoke detection system 74 detecting the smoke inside the vehicle 2.

In some embodiments, the maintenance system comprises at least one processor 77 and at least one memory 75 having program instructions 76 that when executed by the at least one processor 77 are configured to cause the vehicle management system to illuminate at least one of the seat and the majority of the cabin in response to the smoke detection system 74 detecting the smoke inside the vehicle 2.

In some embodiments, the vehicle management system is configured to cease illuminating at least one of the seat and the majority of the cabin in response to the smoke detection system 74 in response to the smoke detection system 74 no longer detecting smoke inside the vehicle 2, detecting that a concentration of the smoke is less than a predetermined threshold, detecting that a concentration of the smoke is decreasing, and/or detecting that a concentration of the smoke has decreased by at least a predetermined amount and/or ratio.

In some embodiments, the smoke detection system 74 is configured to analyze a particle size of the smoke to determine if the particle size is smaller than a predetermined threshold. The vehicle management system can be configured to illuminate at least one of the seat of the vehicle 2 and the majority of the cabin in response to the maintenance system detecting the smoke inside the vehicle 2 and determining that the particle size is smaller than the predetermined threshold.

In some embodiments, the vehicle management system comprises at least one of a speaker 86 and a display screen 93. At least one of the speaker 86 and the display screen 93 can be configured to provide at least one of audio instructions and visual instructions to a first rider inside the vehicle 2. At least one of the audio instructions and the visual instructions can be configured to instruct the first rider to cease smoking while at least one of the seat and the majority are illuminated by the lighting system 100.

The vehicle management system 65 can cause the vehicle 2 to go to a service area 8 to clean the vehicle 2. Cleaning the vehicle 2 can help remove the smoke smell.

In some embodiments, the vehicle management system 65 is configured to receive a first location of a service area 8 configured to clean the vehicle 2. The vehicle management system 65 can be configured to drive the vehicle 2 to the service area 8 in response to the smoke detection system 74 detecting the smoke inside the vehicle 2.

In some embodiments, the smoke detection system 74 is configured to detect the smoke emitted by a first rider while the vehicle 2 is driving to a drop off location of the first rider. The vehicle management system 65 can comprise a first mode and a second mode. In the first mode, the vehicle management system 65 is configured to make the vehicle 2 available to accept a pick-up request of a second rider. In the second mode, the vehicle management system 65 is configured to make the vehicle 2 unavailable to accept the pick-up request. The vehicle management system 65 can be configured to enter the second mode in response to the smoke detection system 74 detecting the smoke inside the vehicle 2. The vehicle management system 65 can be configured to exit the second mode and enter the first mode in response to at least one of receiving an indication that the vehicle 2 has been cleaned and the vehicle 2 leaving a vehicle cleaning station.

In some embodiments, the vehicle management system 65 comprises a ventilation system 84 having a fan 83 to push air in the cabin. The fan 83 can be embedded in a vent channel of the dash or can be located in any other suitable location. The smoke detection system 74 can be configured to analyze a particle size of the smoke to determine if the particle size is smaller than a predetermined threshold. The vehicle management system 65 can be configured to automatically increase a rate at which the ventilation system 84 pushes outside air into the cabin in response to the smoke detection system 74 detecting the smoke inside the vehicle 2. The vehicle management system 65 can be configured to drive the vehicle 2 to a service area 8 configured to clean the vehicle 2 in response to determining that the particle size is smaller than the predetermined threshold.

In some embodiments, the vehicle management system 65 comprises a motor 81 configured to roll down a window 82 of the vehicle 2. The smoke detection system 74 is configured to analyze a particle size of the smoke to determine if the particle size is smaller than a predetermined threshold. The vehicle management system 65 can be configured to use the motor 81 to automatically roll down the window 82 in response to the smoke detection system 74 detecting the smoke inside the vehicle 2. The vehicle management system 65 can be configured to drive the vehicle 2 to a service area 8 configured to clean the vehicle 2 in response to determining that the particle size is smaller than the predetermined threshold.

In some embodiments, the vehicle management system 65 comprises at least one of a motor 81 configured to roll down a window 82 of the vehicle 2 and a ventilation system 84 having a fan 83 to push air in the cabin. The smoke detection system 74 can be configured to detect the smoke emitted by a first rider while the vehicle 2 is driving to a drop off location of the first rider. The smoke detection system 74 can be configured to analyze a particle size of the smoke to determine if the particle size is smaller than a predetermined threshold.

In some embodiments, in response to the smoke detection system 74 detecting the smoke inside the vehicle 2, the vehicle management system 65 is configured to at least one of use the motor 81 to automatically roll down the window 82 and increase a rate at which the ventilation system 84 pushes the air into the cabin.

In some embodiments, in response to determining that the particle size is larger than the predetermined threshold and after at least one of rolling down the window 82 and increasing the rate (at which the ventilation system 84 pushes the air into the cabin), the vehicle management system 65 is configured to make the vehicle 2 available to pick up a second rider.

In some embodiments, in response to determining that the particle size is smaller than the predetermined threshold, the vehicle management system 65 is configured to make the vehicle 2 unavailable to pick up the second rider until after the vehicle management system 65 has driven the vehicle 2 to a service area 8 configured to clean the vehicle 2.

In some embodiments, the vehicle management system 65 comprises a motor 81 configured to roll down a window 82 of the vehicle 2 and a rain sensor 87 configured to detect an indication of rain on the vehicle 2. The smoke detection system 74 can be configured to analyze a particle size of the smoke to determine if the particle size is smaller than a predetermined threshold. The vehicle management system 65 can be configured to use the motor 81 to automatically roll down the window 82 in response to the smoke detection system 74 detecting the smoke inside the vehicle 2 and/or in response to the rain sensor 87 not detecting the indication of the rain. The vehicle management system 65 can be configured to drive the vehicle 2 to a service area 8 configured to clean the vehicle 2 in response to determining that the particle size is smaller than the predetermined threshold.

In some embodiments, the vehicle management system 65 comprises a motor 81 configured to roll down a window 82 of the vehicle 2 and a rain sensor 87 configured to detect an indication of rain on the vehicle 2. The vehicle management system 65 can be configured to use the motor 81 to automatically roll down the window 82 in response to the smoke detection system 74 detecting the smoke inside the vehicle 2 and in response to the rain sensor 87 not detecting the indication of the rain.

A seat belt (also known as a seatbelt or safety belt) is a vehicle safety device designed to secure an occupant of a vehicle against harmful movement that may result during a collision or a sudden stop.

Seat belts can dramatically reduce the risk of injury during a crash. Seat belts save many lives every year. In some embodiments, the vehicle management system is configured to take certain actions to encourage a first rider to wear a seat belt.

The vehicle can comprise a sensor configured to detect if the rider is "wearing" a seat belt (i.e., if the seat belt is secured around the first rider by a strap and/or a buckle). In some embodiments, the sensor is located in the buckle and includes a contact sensor configured such that the sensor detects if the seat belt is buckled (or if the seat belt is not buckled).

In some embodiments, the vehicle management system is configured to reduce a speed of the vehicle in response to the vehicle management system determining (e.g., based on data from the seat belt sensor) that the seat belt is not buckled. Reducing the speed can encourage the rider to buckle her seat belt.

In some embodiments, the vehicle management system is configured to intentionally increase a travel time of the vehicle in response to the vehicle management system determining (e.g., based on data from the seat belt sensor) that the seat belt is not buckled.

In some embodiments, the vehicle management system is configured to increase the travel time by changing from a first travel route to a destination (chosen by a first rider) to a second travel route to the destination. The vehicle management system can be configured to change from the first travel route to the second travel route to intentionally increase the travel time in response to the vehicle management system determining (e.g., based on data from the seat belt sensor) that the seat belt is not buckled. Increasing the travel time can encourage the rider to buckle her seat belt.

In some embodiments, the vehicle is configured to drive a first rider to a destination (that was previously chosen by the first rider). The vehicle management system can be configured to cease driving toward the destination in response to the vehicle management system determining (e.g., based on data from the seat belt sensor) that the seat belt is not buckled.

In some embodiments, the vehicle management system comprises a lighting system having at least one light coupled to an interior of the vehicle. The lighting system can be configured to illuminate at least a portion of the interior of the vehicle (e.g., at least one of a seat of the vehicle and a majority of the cabin). The vehicle management system can be configured to use the lighting system to illuminate at least the portion (e.g., the seat and/or the majority of the cabin) in response to the vehicle management system determining (e.g., based on data from the seat belt sensor) that the seat belt is not buckled.

In some embodiments, the vehicle management system comprises at least one of a speaker and a display screen. At least one of the speaker and the display screen can be configured to provide at least one of audio instructions and visual instructions to a first rider inside the vehicle. In response to the vehicle management system determining that the seat belt is not buckled (e.g., based on data from the seat belt sensor), at least one of the audio instructions and the visual instructions can be configured to instruct the first rider to buckle her seat belt.

In some embodiments, a maintenance system is configured to be used with a self-driving vehicle 2. A maintenance system can comprise a smoke detection system 74 coupled to the vehicle 2 and configured to detect smoke inside a cabin of the vehicle 2. A maintenance system can comprise a vehicle management system configured to autonomously drive the vehicle 2.

In some embodiments, the vehicle management system is configured to intentionally increase a travel time of the vehicle 2 in response to the smoke detection system 74 detecting the smoke inside the vehicle 2. Intentionally increasing the travel time can motivate the rider to stop smoking in the vehicle 2.

In some embodiments, the vehicle management system is configured to increase the travel time by changing from a first travel route to a destination (e.g., a destination chosen by a first rider) to a second travel route to the destination. The vehicle management system can be configured to change from the first travel route to the second travel route to intentionally increase the travel time in response to the smoke detection system 74 detecting the smoke inside the vehicle 2.

The first travel route can be an optimal travel route determined by Google Maps. Google Maps can estimate that the second travel route would take longer (to arrive at a drop-off location of the rider) than the first travel route. Switching to a travel route that takes longer can encourage the rider to stop smoking (in order to prompt the vehicle 2 to choose an optimal travel route). In some cases, the second travel route includes a stop at a cleaning facility, a police station, and/or a facility that manages the vehicle 2.

In some embodiments, the vehicle management system comprises at least one of a speaker 86 and a display screen 93. At least one of the speaker 86 and the display screen 93 can be configured to provide at least one of audio instructions and visual instructions to a first rider in the vehicle 2. At least one of the audio instructions and the visual instructions can be configured to warn the first rider to cease smoking to avoid increasing the travel time.

For example, audio instructions can say, "Stop smoking immediately or your travel time will be increased." Visual instructions can include the following words on the display screen 93: "You must stop smoking to avoid delaying your travel."

In some embodiments, the vehicle management system comprises at least one of a speaker 86 and a display screen 93. At least one of the speaker 86 and the display screen 93 is configured to provide at least one of audio instructions and visual instructions to a first rider. At least one of the audio instructions and the visual instructions can be configured to instruct the first rider to cease smoking in order to decrease the travel time.

For example, audio instructions can say, "We have delayed your travel due to detecting smoke. Stop the smoke immediately to save time." Visual instructions can include the following words on the display screen 93: "Due to detecting smoke in the vehicle, your travel route has been changed. To save time and get back on an optimal travel route to your destination, stop smoking."

In some embodiments, the maintenance system comprises at least one processor 77 and at least one memory 75 having program instructions 76 that when executed by the at least one processor 77 are configured to cause the vehicle management system to increase the travel time of the vehicle 2 in response to the smoke detection system 74 detecting the smoke inside the vehicle 2.

In some embodiments, the vehicle management system is configured to reduce a speed of the vehicle 2 in response to the smoke detection system 74 detecting the smoke inside the vehicle 2.

In some embodiments, in response to the smoke detection system 74 detecting the smoke inside the vehicle 2, the vehicle management system is configured to automatically reduce the speed while still enabling the vehicle 2 to continue transporting a first rider toward a destination selected by the first rider.

A longer travel time reduces the convenience of travel for the rider, which can be a means to encourage the first rider not to smoke in the vehicle 2.

In some embodiments, the vehicle management system is configured to determine a local speed limit. A camera 111 of the vehicle 2 can take a picture of a speed limit sign. Software can be used to "read" the sign to determine the local speed limit.

The local speed limit applies to the road on which the vehicle 2 is located. In some embodiments, the vehicle management system determines the local speed limit by sending a GPS location of the vehicle 2 to a system having a database comprising locations and corresponding speed limits and then receiving the local speed limit from the system.

The vehicle management system can be configured to intentionally reduce the speed of the vehicle 2 to a velocity below the local speed limit and above five miles per hour (and/or above ten miles per hour) in response to the smoke detection system 74 detecting the smoke inside the vehicle 2. As a result, the vehicle 2 can continue moving while still encouraging the rider to stop smoking in the vehicle 2.

In some embodiments, the maintenance system comprises at least one processor 77 and at least one memory 75 having program instructions 76 that when executed by the at least one processor 77 are configured to cause the vehicle management system to intentionally reduce the speed of the vehicle 2 to a velocity below a local speed limit and above five miles per hour (and/or above ten miles per hour) in response to the smoke detection system 74 detecting the smoke inside the vehicle 2.

In some embodiments, the vehicle management system comprises at least one of a speaker 86 and a display screen 93. At least one of the speaker 86 and the display screen 93 can be configured to provide at least one of audio instructions and visual instructions to a first rider. At least one of the audio instructions and the visual instructions can be configured to instruct the first rider to cease smoking in order to increase the speed.

For example, the audio instructions can say, "We cannot increase the speed until the smoke is gone from inside the vehicle." The visual instructions can display the following words on the display screen 93: "We will not increase the speed until the smoke is gone from inside the vehicle."

In some embodiments, the smoke detection system 74 is configured to analyze a particle size of the smoke to determine if the particle size is smaller than a predetermined threshold. The vehicle management system can be configured to reduce the speed in response to the maintenance system detecting the smoke inside the vehicle 2 and determining that the particle size is smaller than the predetermined threshold.

In some embodiments, the maintenance system is configured to detect smoke from a rider smoking inside the vehicle 2 and/or is configured to detect smoke from a fire inside the vehicle 2. If the smoke is from a fire inside the vehicle 2, the maintenance system can take steps to protect the rider and the vehicle 2. If the smoke is from a smoking a cigarette or vaping inside the vehicle 2, the maintenance system can take steps to protect the vehicle 2 (and in some cases to protect riders from the smoke).

The maintenance system can, in some cases, differentiate between smoke from fire, smoke from smoking a cigarette, and smoke from vaping based on the particle size of the smoke, based on the concentration of the smoke, based on temperature data (e.g., from infrared sensors and/or thermometers configured to detect temperatures inside the cabin of the vehicle 2). A high concentration of smoke can indicate that the smoke is more likely from a fire than from smoking a cigarette. A larger particle size can indicate that the smoke is more likely from vaping than from a cigarette and/or a fire.

A vehicle 2 can be configured to drive a first rider to a destination chosen by the first rider. (The destination can be a drop-off location.) The vehicle management system can be configured to cease driving toward the destination in response to the smoke detection system 74 detecting the smoke inside the vehicle 2.

In some embodiments, the maintenance system comprises at least one processor 77 and at least one memory 75 having program instructions 76 that when executed by the at least one processor 77 are configured (to cause the vehicle management system) to cause the vehicle 2 to cease driving toward the destination in response to the smoke detection system 74 detecting the smoke inside the vehicle 2.

FIG. 9 illustrates a lock 92 configured to impede the door 62 from being opened by a rider of the vehicle 2. In some embodiments, the vehicle management system uses the lock 92 to unlock the doors 62 to enable the rider to open a door 62 of the vehicle 2.

The vehicle management system can use the lock 92 to unlock the doors 62 to enable the rider to open a door 62 of the vehicle 2 in response to the smoke detection system 74 detecting smoke in the vehicle 2. The vehicle management system can use the lock 92 to unlock the doors 62 to enable the rider to open a door 62 of the vehicle 2 in response to the maintenance system determining that a concentration of the smoke is greater than a first predetermined threshold. The vehicle management system can use the lock 92 to unlock the doors 62 to enable the rider to open a door 62 of the vehicle 2 in response to the maintenance system determining that an average particle size of the smoke is smaller than a second predetermined threshold.

The vehicle management system can cause the vehicle 2 to pull over and then automatically unlock the door 62 (e.g., once the vehicle 2 has stopped moving and/or once the vehicle is moving at less than 5 miles per hour). Program instructions 76 can be configured to cause the vehicle 2 to pull over and then unlock a lock 92 of a door 62 of the vehicle 2.

In some embodiments, in response to the smoke detection system 74 detecting smoke in the vehicle 2 (and/or in response to the maintenance system determining that a concentration of the smoke is greater than a first predetermined threshold and/or in response to the maintenance system determining that an average particle size of the smoke is smaller than a second predetermined threshold), the vehicle management system can cause the vehicle 2 to pull over and then use a motor 63 (illustrated in FIG. 9) to open a door 62 automatically without the rider having to open the door 62. Program instructions 76 can be configured to cause the vehicle 2 to pull over and then use a motor 63 of the lock 92 to open a door 62 of the vehicle 2.

In some embodiments, the maintenance system comprises at least one processor 77 and at least one memory 75 having program instructions 76 that when executed by the at least one processor 77 are configured to cause the vehicle management system to unlock doors 62 of the vehicle 2 in response to the smoke detection system 74 detecting the smoke inside the vehicle 2. Unlocking the doors 62 can enable riders to exit the vehicle 2 (e.g., after the vehicle 2 has come to a stop).

The vehicles 2 comprises at least one door 62 and a door lock 92 configured to impede opening the door 62. The program instructions 76 can be configured to automatically unlock the door lock in response to the smoke detection system 74 detecting the smoke inside the vehicle 2. The program instructions 76 can be configured to automatically unlock the door lock 62 in response to the smoke detection system 74 detecting the smoke inside the vehicle 2 and also in response to the maintenance system detecting that the vehicle 2 is at least one of stopped and moving at a velocity of less than fifteen miles per hour.

Enabling the rider to open the door 62 while the vehicle 2 is moving quickly can be dangerous. Waiting to unlock the door 62 until the vehicle 2 is either stopped or at least only moving slowly can reduce the risk of the rider exiting the vehicle 2 while the vehicle 2 is moving quickly.

The program instructions 76 can be configured to automatically unlock the door lock 92 in response to the smoke detection system 74 detecting the smoke inside the vehicle 2 and also in response to at least one of (a) the maintenance system determining that a concentration of the smoke is greater than a first predetermined threshold and (b) the maintenance system determining that a particle size of the smoke is smaller than a second predetermined threshold.

Determining, by a portion of the maintenance system, that the concentration of the smoke is greater than the first predetermined threshold can help the maintenance system differentiate between emergencies (e.g., with large amounts of smoke in the cabin of the vehicle 2) and non-emergencies (e.g., due to cigarette smoking and/or vaping). Detecting large amounts of smoke can trigger the program instructions 76 to unlock the doors 62. In some embodiments, detecting small amounts of smoke can trigger the program instructions 76 to unlock the doors 62. In some embodiments, detecting small amounts of smoke does not trigger the program instructions 76 to unlock the doors 62.

Determining, by a portion of the maintenance system, that a particle size of the smoke is smaller than the second predetermined threshold can help the maintenance system differentiate between emergencies (e.g., with smoke due to a fire in the vehicle 2) and non-emergencies (e.g., with smoke that is not due to a fire in the vehicle). A small particle size can be indicative of smoke due to a fire in the vehicle 2. A large particle size can be indicative of smoke that is not due to a fire in the vehicle 2. A large particle size can be indicative of vaping in the vehicle 2.

The vehicle 2 can comprise a door 62 and a motor 63 configured to open the door 62. The program instructions 76 can be configured to cause the motor 63 to open the door 62 in response to the smoke detection system 74 detecting the smoke inside the vehicle 2 and the maintenance system detecting that the vehicle 2 is at least one of stopped and moving at a velocity of less than ten miles per hour.

The Tesla Model X (made by Tesla, Inc.) includes a motor configured to open the rear doors. Tesla refers to these doors as "Falcon Wing Doors." Embodiments can use a Tesla Model X motor and door.

Sienna minivans (made by Toyota) include motors configured to open the rear sliding doors. The following patents include door motor information. The entire contents of the following patent are incorporated by reference herein: U.S. Pat. No. 6,081,088; issued Jun. 27, 2000; and entitled Automatic Opening/Closing Apparatus. The entire contents of the following patent are incorporated by reference herein: U.S. Pat. No. 5,986,420; issued Nov. 16, 1999; and entitled Apparatus for Automatically Opening and Closing Pop-Up Door of a Vehicle.

The following patent includes door lock information. The entire contents of the following patent are incorporated by reference herein: U.S. Pat. No. 5,769,471; issued Jun. 23, 1998; and entitled Apparatus for Unlocking a Door Lock for a Vehicle.

In some embodiments, the smoke detection system 74 is configured to analyze a particle size of the smoke to determine if the particle size is smaller than a predetermined threshold. The vehicle management system can be configured to cease driving toward the destination in response to the maintenance system detecting the smoke inside the vehicle 2 and determining that the particle size is smaller than the predetermined threshold. The vehicle 2 can stop moving, pull over to a parking location alongside the road, and/or stop at a cleaning facility configured to remove the smoke smell from the vehicle 2.

In some embodiments, the vehicle management system is configured to cease driving (stop moving) in response to the maintenance system detecting the smoke inside the vehicle 2 and determining that a concentration of the smoke exceeds a predetermined threshold. The concentration threshold can be configured to be indicative of smoke from a fire rather than smoke from smoking a cigarette or vaping.

If a person is located inside the vehicle 2, then the maintenance system can pull over faster than if a person is not located in the vehicle when the smoke detection system 74 detects the smoke. Pulling over to the side of the road faster can enable the rider to exit the vehicle 2 more quickly but may increase the risk of hitting other vehicles in the process of pulling over. As a result, pulling over slower can be advantageous (to reduce the risk to other vehicles on the road) if a person is not present in the vehicle 2.

In some embodiments, the maintenance system comprises at least one processor 77 and at least one memory 75 having program instructions 76 that when executed by the at least one processor 77 are configured to cause the vehicle 2 to stop moving via (e.g., by) a first stopping mode in response to the smoke detection system 74 detecting the smoke inside the vehicle 2. The program instructions 76 can be configured to cause the vehicle 2 to stop moving via (e.g., by) a second stopping mode in response to the smoke detection system 74 detecting the smoke inside the vehicle 2 and the maintenance system detecting an indication of a person being located inside the vehicle 2. The second stopping mode can be configured to enable the vehicle 2 to stop more quickly than the first stopping mode.

The vehicle guidance system 117 can enable the vehicle 2 to avoid hitting other objects on the road while the vehicle 2 pulls over to stop on the side of the road.

A seat of the vehicle 2 can comprise a weight sensor 114 (shown in FIG. 3) configured to sense the weight of a rider sitting on the seat (to enable the maintenance system to detect the rider). A weight greater than a predetermined threshold (e.g., 20 pounds) can be an indication of a person being located in the vehicle 2.

An infrared sensor 115 (shown in FIG. 3) can be used to detect a temperature indicative of a person sitting in a seat of the vehicle 2 (so the maintenance system can determine, based on infrared data) if a person is located in the vehicle 2.

A camera 24a, 24b, 24c can take a picture inside the cabin of the vehicle 2. Image recognition software can be used to analyze the picture to enable the maintenance system to determine if a person is located inside the vehicle 2.

In some embodiments, the second stopping mode is configured to enable the vehicle 2 to move at a greater speed than the first stopping mode (e.g., to enable the vehicle 2 to arrive at a stopping location more quickly).

In some embodiments, the vehicle management system is configured to determine a local speed limit, and the second stopping mode is configured to enable the vehicle 2 to exceed the local speed limit by a greater amount than the first stopping mode.

In some embodiments, the second stopping mode is configured to enable the vehicle 2 to accelerate faster than the first stopping mode.

In some embodiments, the second stopping mode is configured to enable the vehicle 2 to decelerate faster than the first stopping mode.

In some embodiments, the vehicle 2 is configured to drive on a road. The vehicle management system can comprise a vehicle guidance system 117 having at least one of a camera 111, a radar 118, and a lidar 119.

The vehicle guidance system 117 can be configured to detect objects located outside the vehicle 2 on the road. Program instructions 76 can be configured to enable the vehicle 2 to come closer to the objects in the second stopping mode than in the first stopping mode.

For example, in the second stopping mode, the program instructions 76 can specify a minimum distance to other cars of 10 feet in the second stopping mode and 20 feet in the first stopping mode. As a result, the second stopping mode can enable changing lanes into smaller spaces between cars to enable the vehicle 2 to pull over faster than would be the case in the first stopping mode.

In some embodiments, the vehicle management system comprises a vehicle guidance system 117 having at least one of a camera 111, a radar 118, and a lidar 119. The vehicle guidance system 117 can be configured to detect objects located outside the vehicle 2 on the road. The maintenance system can comprise at least one processor 77 and at least one memory 75 having program instructions 76 configured to be executed by the at least one processor 77 and comprising a first mode, a second mode, and a third mode. In the first mode, the program instructions 76 are configured to prompt the vehicle management system to drive the vehicle 2 toward a location (e.g., a destination, a drop-off location, a pick-up location).

In some embodiments, the program instructions 76 are configured to exit the first mode and enter the second mode in response to the smoke detection system 74 detecting the smoke inside the vehicle 2 and in response to the maintenance system determining that a person is not located inside the vehicle 2. In the second mode, the program instructions 76 prompt the vehicle guidance system 117 to implement a first stopping mode.

In some embodiments, the program instructions 76 are configured to exit the first mode and enter the third mode in response to the smoke detection system 74 detecting the smoke inside the vehicle 2 and the maintenance system determining that the person is located inside the vehicle 2. In the third mode, the program instructions 76 prompt the vehicle guidance system 117 to implement a second stopping mode configured to enable the vehicle 2 to come to a stop in less time than the first stopping mode.

For example, the second stopping mode may cause the vehicle 2 to come to a stop in fewer seconds than the first stopping mode would cause the vehicle 2 to come to a stop. Fewer seconds can reduce the severity of injury to the rider caused by a fire inside the vehicle 2.

Some embodiments discourage riders from smoking. In some embodiments, the vehicle management system comprises a speaker 86 configured to emit an audio command. The audio command can be configured to instruct the first rider to cease smoking in order to resume driving toward the destination. For example, the audio command can say, "We aren't driving anywhere until you stop smoking."

In some embodiments, the vehicle management system comprises a display screen 93. The display screen 93 can be configured to provide visual instructions to the first rider. The visual instructions can be configured to instruct the first rider to cease smoking in order to resume driving toward the destination. For example, the visual instructions can include the following words: "We aren't driving anywhere until you stop smoking."

In some embodiments, the vehicle management system is configured to resume driving toward the destination in response to at least one of the smoke detection system 74 no longer detecting the smoke and the smoke detection system 74 detecting a decrease in a concentration of the smoke.

In some embodiments, the smoke detection system 74 is configured to analyze a particle size of the smoke inside the vehicle 2. The maintenance system can comprise a speaker 86, at least one processor 77, and at least one memory 75. The memory 75 can comprise program instructions 76 configured to be executed by the at least one processor 77 such that the program instructions 76 are configured to cause the speaker 86 to emit a first audio command in response to the maintenance system determining that the particle size is smaller than a predetermined threshold. For example, the first audio command can say, "Smoke has been detected. We are going to pull over as soon as possible. Please unbuckle and exit the vehicle when safe to do so."

The program instructions 76 can be configured to cause the speaker 86 to emit a second audio command in response to the maintenance system determining that the particle size is larger than the predetermined threshold. The second audio command can be configured to communicate different information than the first audio command to a first rider inside the vehicle 2. For example, the second audio command can say, "Vaping has been detected. Your account has been fined twenty dollars. Please stop vaping immediately to avoid additional fines."

In some embodiments, the vehicle 2 is configured to drive a first rider to a destination, and the maintenance system comprises at least one processor 77 and at least one memory 75. The memory 75 can comprise program instructions 76 configured to be executed by the at least one processor 77.

In some embodiments, program instructions 76 comprise a first mode and a second mode. In the first mode, the maintenance system can make the vehicle 2 available to accept a pick-up request of a second rider. In the second mode, the maintenance system can make the vehicle 2 unavailable to accept the pick-up request. The maintenance system can be configured to enter the second mode in response to the smoke detection system 74 detecting the smoke inside the vehicle 2. The maintenance system can be configured to exit the second mode and enter the first mode in response to the smoke detection system 74 no longer detecting the smoke inside the vehicle 2, the maintenance system detecting that a concentration of the smoke is less than a predetermined threshold, the maintenance system receiving a communication in response to the vehicle 2 having been cleaned, and/or the maintenance system receiving an indication (such as GPS data) indicative of the vehicle 2 having left a cleaning facility.

Self-driving vehicles can include cars, vans, trucks, buses, scooters, motorcycles, helicopters, quadcopters, flying machines, air taxis, planes, and any motorized vehicle configured to transport a person.

In some embodiments, the vehicle 2 is configured to drive on a road. The vehicle management system can comprise a vehicle guidance system 117. The vehicle guidance system 117 can comprise radar 118, lidar 119, ultrasonic sensors, cameras 111, and any other sensing devices configured to enable the vehicle 2 to detect objects.

The entire contents of the following application are incorporated by reference herein: U.S. patent application Ser. No. 16/205,013; filed Nov. 29, 2018; and entitled SELF-DRIVING VEHICLE SYSTEMS AND METHODS.

The vehicles 2 described herein can include any of the features of the vehicles described in U.S. patent application Ser. No. 16/205,013.

The entire contents of the following application are incorporated by reference herein: U.S. patent application Ser. No. 16/134,190; filed Sep. 18, 2018; and entitled SELF-DRIVING VEHICLE SYSTEMS AND METHODS.

The vehicles 2 described herein can include any of the features of the vehicles described in U.S. patent application Ser. No. 16/134,190.

Some embodiments can be used with self-driving vehicles. Embodiments, however, are not limited to self-driving vehicles and can be used with non-self-driving vehicles.

As used herein, "location" is used broadly and is not limited to a street address. A location can be a Global Positioning System ("GPS") location and can be any other location indicator. A location can be an outdoor location. A location can be an indoor location (e.g., a location inside a large shopping center, an apartment complex or other building).

Some embodiments use iBeacon hardware to enable tracking remote computing devices indoors. iBeacon is a protocol developed by Apple Inc. Several embodiments use radio transceivers (such as Bluetooth transceivers) to enable tracking remote computing devices indoors. Some embodiments use Global Positioning System ("GPS") hardware to determine an outdoor location of a remote computing device and/or of a vehicle. GPS can include the system of satellites put into orbit and maintained by the U.S. Department of Defense, Russia's GLONASS satellite system, assisted GPS systems, and/or any satellite system used to provide location data.

In some embodiments, each system comprises at least one processor and a memory comprising program instructions that when executed by the at least one processor cause the system to perform any of the steps described herein and/or incorporated by reference.

A self-driving vehicle 2 can include a vehicle guidance system 117 configured to detect objects (e.g., cars, pedestrians, other vehicles, buildings, fire hydrants, trees, lane markers, guard rails, roadway barriers, sidewalks, roadway signs, traffic lights) located around the self-driving vehicle 2. Various sensors of the vehicle guidance system 117 can sense objects even closer than an inch away (e.g., by using ultrasonic sensors) and even farther away than 100 yards (e.g., using long-range radar).

Figure 12:
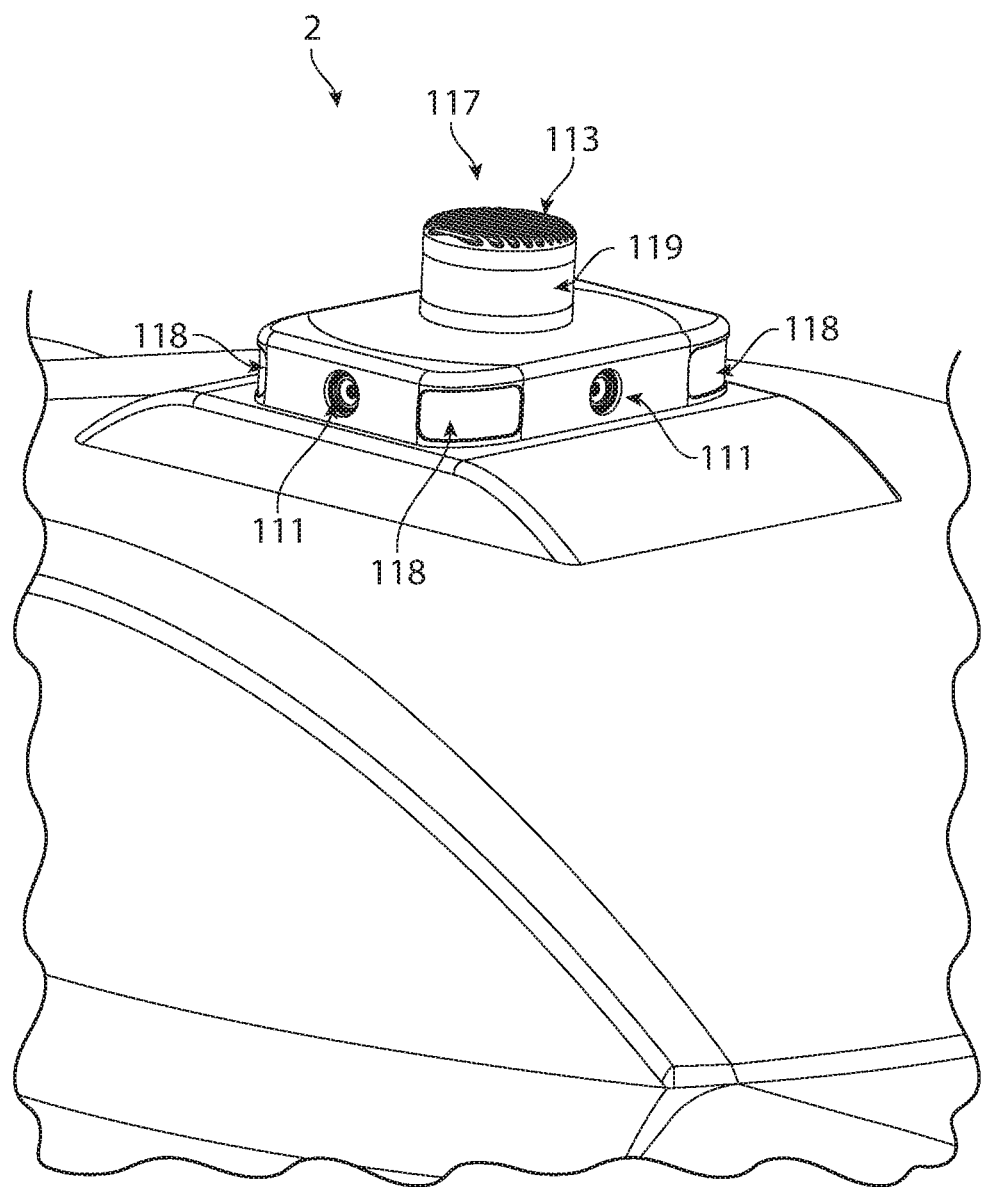
FIGS. 12 and 13 illustrate perspective views of portions of a vehicle, according to some embodiments.
Figure 13:
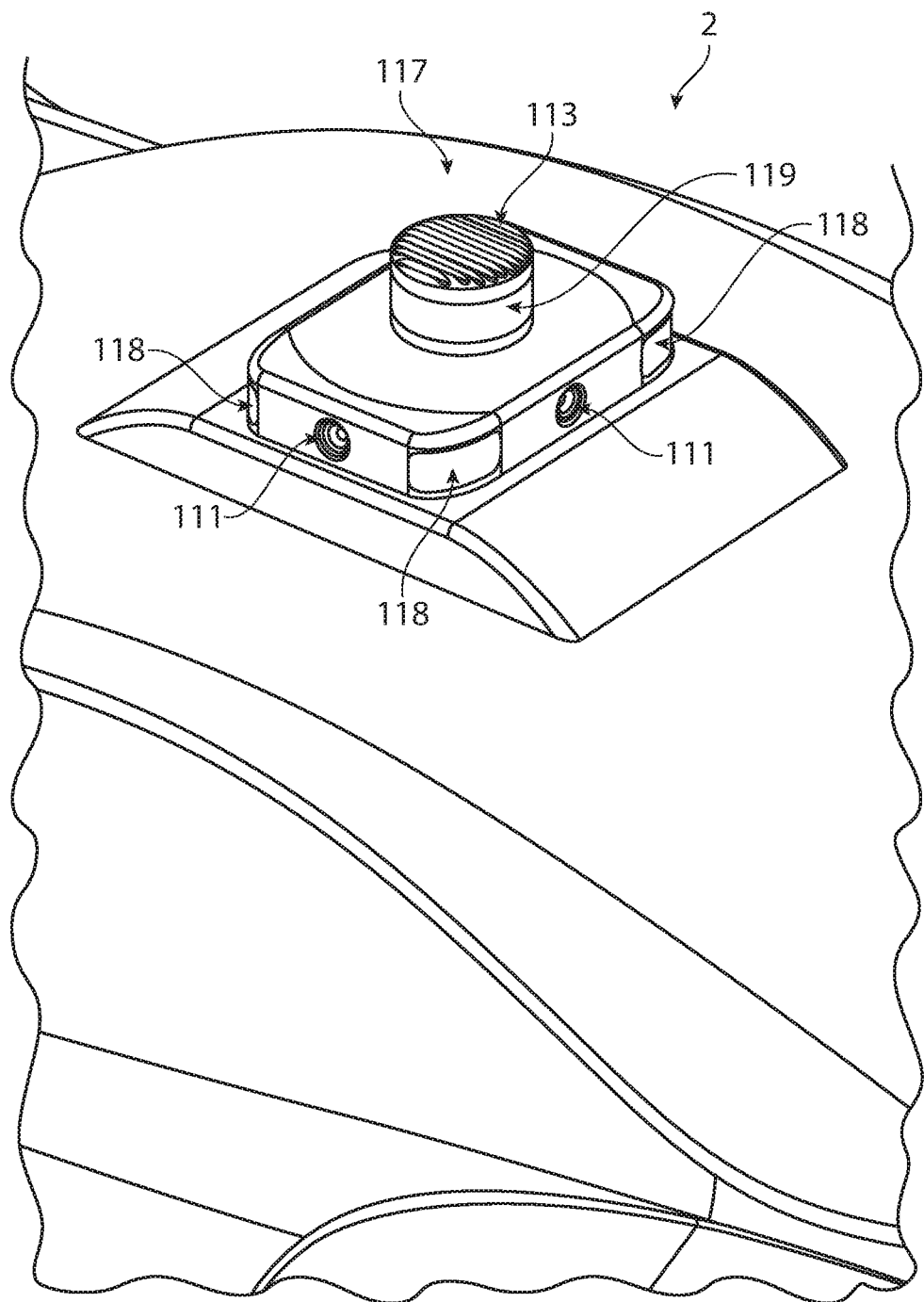

FIG. 12 illustrates a perspective view of the top side, the front side and the passenger side of the vehicle guidance system 117 coupled to the vehicle 2. FIG. 13 illustrates a perspective view of the top side, the backside side and the driver side of the vehicle guidance system 117 coupled to the vehicle 2.

The vehicle guidance system 117 can comprise radar 118, lidar 119, ultrasonic sensors, cameras 111, and any other sensing devices configured to enable the vehicle 2 to detect objects.

The self-driving vehicle 2 can comprise a vehicle guidance system 117 mounted to the roof of the self-driving vehicle 2. In some embodiments, however, the components of the vehicle guidance system 117 are mounted on different areas of the self-driving vehicle 2. For example, the ultrasonic sensors can be mounted on the bumpers of the self-driving vehicle 2. The short range of the ultrasonic sensors can make bumper mounting helpful (because the bumper is often closer to the objects being sensed). The cameras 111 can be mounted just behind the windshield (e.g., in the rearview mirror) and just behind other windows. The radars 118 can be mounted near each of the four corners of the self-driving vehicle 2. In the illustrated embodiment, however, the vehicle guidance system 117 can be contained in one assembly to simplify the integration of the vehicle guidance system 117 into a vehicle.

The vehicle guidance system 117 can use cameras 111 mounted around a perimeter (e.g., around a perimeter of the vehicle 2 or around a perimeter of a housing of the vehicle guidance system 117). As illustrated in FIGS. 12 and 13, cameras 111 face forward, backward, left, and right to provide (collectively) a 360 degree view around the vehicle 2. The cameras 111 can be high-resolution cameras covered by a glass window to protect each cameras 111 from water and dirt.

Cameras 111 can be configured to see lane markers on a road. Using cameras 111 to see painted lane markers can be helpful (because painted lane markers sometimes lack enough three-dimensional nature to be detected by some other sensors). In addition, cameras 111 can see color differences (e.g., the difference between the color of the asphalt and the color of yellow or white paint of a lane marker). Cameras 111 can see the color of traffic lights (e.g., red, yellow, green). Cameras 111 sometimes have trouble seeing in situations where the human eye would have trouble seeing (e.g., in fog or rain).

Radars 118 can be very helpful in fog and rain. An object that is not detected by cameras 111 (e.g., due to fog or rain) can be detected by radar 118. Radars 118 can detect the speed of other vehicles and the distance to other vehicles. Radars 118 can also detect objects that are far away.

Radar is an object-detection system that uses radio waves to determine the range, angle, or velocity of objects. A radar can comprise a transmitter producing electromagnetic waves in the radio or microwave domain, a transmitting antenna, a receiving antenna (which can be the same antenna as the transmitting antenna), a receiver, and/or a processor to determine properties of the objects detected by the radar.

Lidar uses light to detect objects. A lidar 119 can be located on the top portion of the vehicle guidance system 117 to provide a 360 degree view of the area around the self-driving vehicle 2. The lidar 119 can tell the difference between an actual person and a billboard that includes a picture of a person (due to the three-dimensional nature of the actual person and the two dimensional nature of the picture of a person).

The lidar 119 can accurately sense the three-dimensional nature of the world around the self-driving vehicle 2. The lidar 119 can also measure the distance to objects. Measuring distance can enable the self-driving vehicle 2 to know, for example, if an approaching car is 5 meters away (so there is not enough time to turn in front of the car) or 25 meters away (so there may be enough time to turn in front of the car).

In some embodiments, the lidar 119 is a Velodyne VLS-128 made by Velodyne LiDAR, Inc. having an office in San Jose, Calif. The Velodyne VLS-128 can provide real-time, three-dimensional data with up to 0.1 degree vertical and horizontal resolution, a range of up to 300 meters, and a 360-degree surround view. The VLS-128 can provide the range, resolution and accuracy required by some of the most advanced autonomous vehicle programs in the world.

Many types of lidars can be used. Some embodiments use "incoherent" or direct energy detection (which principally measures amplitude changes of the reflected light). Some embodiments use coherent detection (which in some cases can be well suited for measuring Doppler shifts, or changes in phase of the reflected light). Coherent systems can use optical heterodyne detection.

Lidar can use pulse models. Some lidar embodiments use micropulse or high energy. Micropulse systems can use intermittent bursts of energy. Some lidar embodiments use high-power systems.

Lidar can comprise lasers. Some embodiments include solid-state lasers. Some embodiments include flash lidar. Some embodiments include electromechanical lidar. Some embodiments include phased arrays to illuminate any direction by using a microscopic array of individual antennas. Some embodiments include mirrors (e.g., micro electromechanical mirrors). Some embodiments include dual oscillating plane mirrors, a polygon mirror and/or a scanner (e.g., a dual-axis scanner).

Lidar embodiments can include photodetector and receiver electronics. Any suitable type of photodetector can be used. Some embodiments include solid-state photodetectors (e.g., silicon avalanche photodiodes) and/or photomultipliers.

The motion of the vehicle 2 can be compensated for to accurately determine the location, speed, and direction of objects (such as other vehicles) located outside the vehicle 2. For example, if a first vehicle 2 is heading west at 35 miles per hour and a second vehicle is heading east at an unknown speed, a vehicle guidance system 117a of the first vehicle 2 can remove the contribution of the 35 miles per hour when determining the speed of the second vehicle.

In some embodiments, motion of the vehicle 2 is compensated for by using position and navigation systems to determine the absolute position, speed, and orientation of the lidar, camera, radar, or other object sensing system. A Global Positioning System ("GPS") receiver and/or an Inertial Measurement Unit ("IMU") can be used to determine the absolute position and orientation of the object sensing system.

Lidar can use active sensors that supply their own illumination source. The energy can hit objects. The reflected energy can be detected and measured by sensors. Distance to the object can be determined by recording the time between transmitted and backscattered pulses and by using the speed of light to calculate the distance traveled. Scanning can be used to create a three-dimensional image or map of the area around the vehicle 2.

Embodiments can use a short-range lidar to give the self-driving vehicle 2 a surround view near the self-driving vehicle 2 (to see objects close to the self-driving vehicle 2) and can use a long-range lidar configured to not only detect objects located far from the self-driving vehicle 2, but also to enable zooming into objects that are over 200 meters away. The long-range lidar can be very helpful at high-speed highway situations.

Lidar uses light to detect a distance to an object, a direction to the object, and/or a location of an object. Lidar can use pulsed laser light emitted by a laser.

The light can reflect off objects around the vehicle 2. These reflections can be detected by a sensor of the lidar. Measuring how long the light takes to return to the sensor and measuring the wavelengths of the reflected light can enable making a three-dimensional model of the object being sensed and of the entire area around the vehicle 2.

The self-driving vehicle 2 can include a vehicle navigation system, a communication system that has a transmitter and a receiver, a computer system that has a processor, a memory that has program instructions and map information, a traffic monitor, and a drive-by-wire system. In some embodiments, at least some of these items are part of the vehicle guidance system 117.

A vehicle navigation system can be configured to enable the vehicle 2 to follow a driving route. The vehicle navigation system can direct the vehicle toward a pick-up location, a drop-off location, and/or another location.

A communication system can be configured to communicate with a vehicle management system. The communication system can be configured to communicate with a remote computing device of a rider. The communication system can use an antenna to communicate with other vehicles and other devices via intermediary communication systems.

Intermediary communication systems can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

The vehicle 2 can comprise a drive-by-wire system. The drive-by-wire system can be a computer-regulated system for controlling the engine, accelerating, braking, steering, signaling, handling, suspension, and/or other functions related to autonomously driving the vehicle 2.

Receiving radio communications (with position data) from three or more GPS satellites can provide data to enable each vehicle and each remote computing device to calculate its own position.

Each device can receive radio signals broadcasted from GPS satellites. Then, the device can calculate how far it is away from the broadcasting satellite by determining how long the radio signal (traveling at lightspeed) took to arrive at the device. Trilateration (based on data from at least three GPS satellites) enables the device to know where it is located. The device can then send its location to the vehicle management system. A location tracking system can receive the location data from the vehicle management system, from the device, and/or from any other system.

Communicative coupling may be via continuous communications or intermittent communications. Intermittent communications can be via periodic communications (e.g., every 1 second, every 60 seconds, every 10 minutes). As used herein, "periodically" does not imply that every period has the same duration. In some embodiments, the communicative coupling is via intermediary communication systems 15.

A remote computing device can be a smartphone, a tablet computer, a laptop computer, a desktop computer, a server, augmented reality glasses, an implanted computer, and/or any type of computer. A rider can bring her remote computing device into the self-driving vehicle, use her remote computing device in the self-driving vehicle, and leave the self-driving vehicle with her remote computing device. In some embodiments, the rider requests a ride at her home with a remote computing device, but then leaves the remote computing device at home when she goes to get a ride from the self-driving vehicle.

In some embodiments, a remote computing device comprises an accelerometer, a barometer (which can include an altimeter), a gyroscope, a WiFi tracker, a compass, a location tracking system, a memory, a computer system having a processor, a database and/or a communication system. The communication system can include a transmitter, a receiver, and/or an antenna. The remote computing device can comprise a display screen configured to display images to a rider. The remote computing device can comprise a speaker configured to emit sounds to the rider. The remote computing device can comprise a microphone configured to record sounds from the rider.

A maintenance system can be configured to be used with one or more self-driving vehicles. A maintenance system can comprise a smoke detection system 74 coupled to the vehicle 2 and configured to detect smoke inside a cabin of the vehicle 2; and a vehicle management system 65 configured to autonomously drive the vehicle 2.

The vehicle management system 65 can comprise a motor 81 configured to open a window 82 of the vehicle 2. The vehicle management system 65 can also comprise a ventilation system 84 having a fan 83 to configured circulate air in the cabin. Many different types of fans can be used. For example, Porsche vehicles, Acura vehicles, Ford vehicles, Toyota vehicles, and many other vehicles use fans to circulate air inside vehicles.

Fans can include revolving blades or fins configured to push air. Some embodiments use axial fans. Some embodiments use centrifugal fans. Some embodiments use cross flow fans. Tubular fans, tangential fans, and squirrel cage fans can be used with the embodiments described herein and/or incorporated by reference.

A maintenance system can comprise a computer system 7 comprising at least one processor 77 and a memory 75 having program instructions 76 that when executed by the at least one processor 77 are configured to cause the motor 81 to automatically open the window 82 in response to the smoke detection system 74 detecting the smoke inside the vehicle 2. The program instructions 76 can be configured to increase a rotational speed of the fan 83 in response to the smoke detection system 74 detecting the smoke inside the vehicle 2.

In some embodiments, a vehicle management system 65 comprises a motor 81 configured to open a window 82 of the vehicle 2. The vehicle management system 65 can comprise program instructions 76 configured to cause the motor 81 to automatically open the window 82 in response to the smoke detection system 74 detecting the smoke inside the vehicle 2.

Many different types of motors can be used to open and close windows 82. AutoZone sells a wide selection of window 82 lift motors. Dorman Products has an office in Colmar, Pa. has a range of window 82 lift motors. These motors can be configured to "roll up" and "roll down" a window 82 (e.g., a door window) of a car.

Air, especially in urban areas, generally has low levels of smoke even when a person is not smoking in the area. Thus, it is advantageous for some of the embodiments described herein to only react if the concentration of smoke is above a predetermined threshold.

Program instructions 76 can be configured to cause the motor 81 to automatically open the window 82 in response to the smoke detection system 74 detecting a concentration of the smoke greater than a predetermined threshold.

In response to the smoke detection system 74 detecting the smoke inside the vehicle 2, the program instructions 76 can prevent a first rider from closing the window 82 by at least one of disabling the motor 81, disabling a switch configured to move the window 82, disabling a system configured to close the window 82, and locking the window 82 in an open position.

The system configured to close the window 82 can include a window 82 lock, a switch (that when touched or activated opens or closes the window 82), a motor 81 configured to open or close the window 82, other electrical components used to operate the window 82, a power supply configured to operate the motor 81 or the other electrical components used to operate the window 82, guides that direct the window 82 as the window 82 "rolls" or moves down (or up), electrical connections configured to control the flow of electricity to components related to operating the window 82.

The system configured to close the window 82 can include any of the components, parts, and systems used to open and close windows in vehicles made by Tesla, Toyota, Ford, Honda, GMC, BMW, and Nissan.

After causing the motor 81 to open the window 82, the program instructions 76 can cause the motor 81 to automatically close the window 82 in response to at least one of the smoke detection system 74 no longer detecting the smoke inside the vehicle 2 and the smoke detection system 74 detecting a concentration of the smoke less than a predetermined threshold.

Accurately detecting if a rider is smoking in the vehicle 2 can be difficult if the windows are open. Open windows can bring in so much outside air that detecting the smoke can be difficult. If the system suspects that the rider may be smoking (e.g., due to detecting very low levels of smoke), the system can roll up the windows to enable the system to more accurately determine if the rider is smoking in the vehicle 2. Then, if the system determines that the rider is smoking, the system can roll down the windows to reduce smoke damage to the vehicle 2.

In some embodiments, the vehicle management system 65 comprises a motor 81 configured to close a window 82 of the vehicle 2. The vehicle management system 65 can comprise program instructions 76 configured to cause the motor 81 to automatically close the window 82 in response to the smoke detection system 74 detecting a first concentration of the smoke greater than a first predetermined threshold to enable the smoke detection system 74 to detect a second concentration of the smoke above a second predetermined threshold with the window 82 closed. The second predetermined threshold can be greater than the first predetermined threshold.

The maintenance system can comprise a communication system. In response to detecting the second concentration of the smoke above the second predetermined threshold, the program instructions 76 can cause the communication system to send a first wireless communication to a remote computing device. The first wireless communication can be configured to notify the remote computing device regarding the smoke.

After the program instructions 76 cause the motor 81 to automatically close the window 82 in response to the smoke detection system 74 detecting the first concentration of the smoke above the first predetermined threshold, the program instructions 76 can cause the motor 81 to automatically open the window 82 in response to detecting the second concentration of the smoke above the second predetermined threshold.

Accurately detecting if a rider is smoking in the vehicle 2 can be difficult if the ventilation system 84 is quickly blowing a high volume of air into the cabin of the vehicle 2. The ventilation system 84 can bring in so much outside air and/or filtered air that detecting the smoke can be difficult. If the system suspects that the rider may be smoking (e.g., due to detecting very low levels of smoke), the system can reduce a rate at which the ventilation system 84 blows air into the cabin to enable the system to more accurately determine if the rider is smoking in the vehicle 2. (In some embodiments, the system stops the fan.) Then, if the system determines that the rider is smoking, the system can increase the rate at which the ventilation system 84 blows air into the cabin to reduce smoke damage to the vehicle 2.

The vehicle management system 65 can comprise a ventilation system 84 having a fan 83 to configured circulate air in the cabin. The vehicle management system 65 can comprise program instructions 76 configured to reduce a rotational speed of the fan 83 in response to the smoke detection system 74 detecting a first concentration of the smoke above a first predetermined threshold to enable the smoke detection system 74 to detect a second concentration of the smoke above a second predetermined threshold after the rotational speed is reduced. The second predetermined threshold can be greater than the first predetermined threshold.

The maintenance system can comprise a communication system. In response to detecting the second concentration of the smoke above the second predetermined threshold, the program instructions 76 can cause the communication system to send a first wireless communication to a remote computing device. The first wireless communication can be configured to notify the remote computing device regarding the smoke in the vehicle 2.

After the program instructions 76 reduce the rotational speed of the fan 83 in response to the smoke detection system 74 detecting the first concentration of the smoke above the first predetermined threshold, the program instructions 76 can increase the rotational speed of the fan 83 in response to detecting the second concentration of the smoke above the second predetermined threshold.

The vehicle management system 65 can comprise a ventilation system 84 having a fan 83 configured to circulate air in the cabin. The vehicle management system 65 comprises program instructions 76 configured to increase a rotational speed of the fan 83 in response to the smoke detection system 74 detecting the smoke inside the vehicle 2.

The program instructions 76 can be configured to increase the rotational speed of the fan 83 in response to the smoke detection system 74 detecting a concentration of the smoke greater than a predetermined threshold.

After increasing the rotational speed of the fan 83, the program instructions 76 can decrease the rotational speed of the fan 83 in response to at least one of the smoke detection system 74 no longer detecting the smoke inside the vehicle 2 and the smoke detection system 74 detecting a concentration of the smoke less than a predetermined threshold.

The vehicle management system 65 can comprise a ventilation system 84 having a fan 83 to configured circulate air in the cabin. The smoke detection system 74 can be configured to analyze a particle size of the smoke to determine if the particle size is smaller than a predetermined threshold. The vehicle management system 65 can comprise program instructions 76 configured to increase a rotational speed of the fan 83 in response to the smoke detection system 74 detecting the smoke inside the vehicle 2 and determining that the particle size is less than the predetermined threshold. The smoke detection system 74 can comprise at least one optical smoke detector configured to analyze the particle size of the smoke.

Carbon monoxide can be deadly. Unfortunately, carbon monoxide is typically impossible for humans to detect on their own. Sometimes, vehicle exhaust systems have leaks that allow carbon monoxide (e.g., from the combustion of the engine) to enter the cabin of the vehicle 2. Carbon monoxide in the cabin can make riders sick and can even be fatal. In some embodiments, the camera device 10 comprises a carbon monoxide detector having a sensor configured to detect carbon monoxide. Holes 34 enable the carbon monoxide to enter the camera device 10 to enable the carbon monoxide detector to detect the carbon monoxide.

The maintenance system can comprise a motor 81 configured to open a window 82 of the vehicle 2; a carbon monoxide detector; and/or program instructions 76 configured to cause the motor 81 to automatically open the window 82 of the vehicle 2 in response to the carbon monoxide detector detecting a first concentration of carbon monoxide greater than a first predetermined threshold. Opening the window 82 can allow fresh air into the cabin to reduce the concentration of carbon monoxide.

The maintenance system can comprise a ventilation system 84 having a fan 83 to configured circulate air in the cabin. The program instructions 76 can be configured to increase a rotational speed of the fan 83 in response to the carbon monoxide detector detecting a second concentration of the carbon monoxide greater than a second predetermined threshold. Increasing the rotational speed can bring fresh air into the cabin of the vehicle 2 to reduce the concentration of carbon monoxide.

Figure 14:
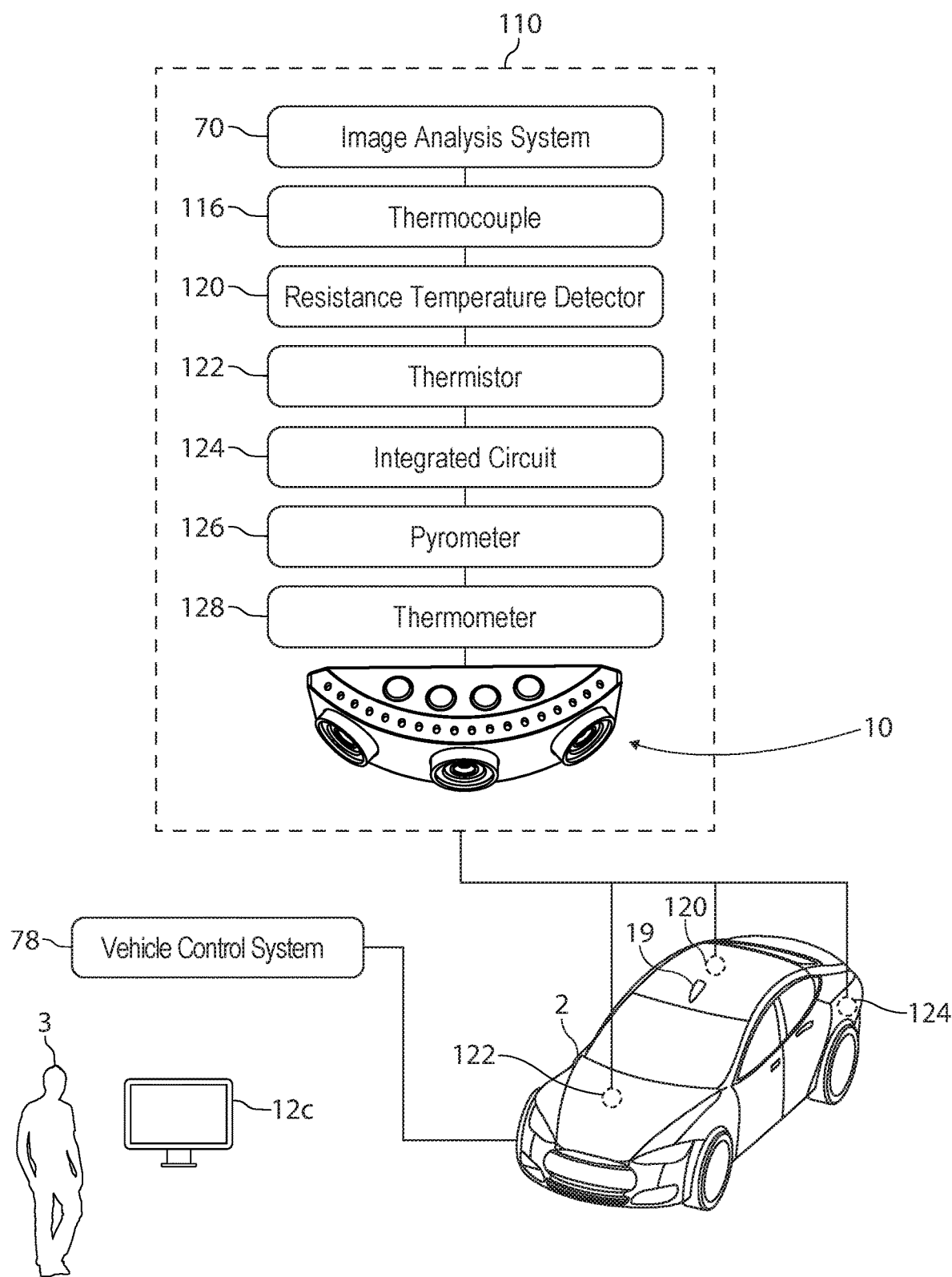
FIG. 14 illustrates a diagrammatic view of a temperature detection system, according to some embodiments.

In addition to detecting smoke within the cabin of the vehicle 2 and the other features disclosed heretofore, the system may also be arranged and configured to detect whether a temperature inside the cabin of the vehicle 2 has reached a predetermined temperature threshold thereby indicating the presence of a dangerous situation. Accordingly, FIG. 14 illustrates a diagrammatic view of a temperature detection system 110. It should be appreciated that the temperature detection system 110 may be a component within a safety detection system configured to be used with a self-driving vehicle 2.

FIG. 14 includes various broken line circles 120, 122, 124 intended to show different locations that the temperature detection system may be located on the vehicle 2. Location 120 includes any location within the cabin of the vehicle 2. Location 122 includes any location within the engine compartment of the vehicle 2, such as under the hood near the engine. Furthermore, location 124 includes a cargo compartment of the vehicle 2, such as inside the trunk. Generally, the temperature detection system 110 is intended to monitor the temperature of any location of the vehicle 2.

In this regard, the safety detection system may include the temperature detection system 110 coupled to the vehicle 2 and configured to detect whether a temperature inside at least one of a cabin 120 of the vehicle 2, an engine compartment 122 of the vehicle 2, and a cargo compartment 124 of the vehicle 2 exceeds a predetermined threshold. The system may also include a vehicle management system configured to autonomously drive the vehicle 2.

In many embodiments, the vehicle management system is configured to reduce a speed of the vehicle in response to the temperature detection system detecting that the temperature exceeds the predetermined threshold. In some embodiments, the predetermined threshold is 100° F. It should be appreciated that the predetermined threshold may be any temperature, such as 150° F., 200° F., 250° F., 300° F., 350° F.

The vehicle management system may include at least one of a speaker 86 and a display screen 93. The at least one of the speaker 86 and the display screen 93 may be configured to provide at least one of audio instructions and visual instructions to a rider. Furthermore, the at least one of the audio instructions and visual instructions comprise information related to the temperature. At least one of the audio instructions and visual instructions may be configured to alert the rider regarding at least one of the smoke, the door 130 being unlocked, the reduced speed of the vehicle 2, the window 137 being at least partially open, the seat belt 153 being unbuckled, emergency personnel being notified, the fire extinguisher 180 being activated, and the like.

In some embodiments, the system comprises at least one processor 77 and at least one memory 75 having program instructions 76 that when executed by the at least one processor 77 are configured to cause the vehicle 2 to reduce a speed of the vehicle 2 in response to the temperature detection system 110 detecting that the temperature exceeds the predetermined threshold.

In many embodiments, the vehicle 2 comprises a door 62 and a door lock 92 configured to impede opening the door 62, and the program instructions 76 are configured to automatically unlock the door lock 92 in response to the temperature detection system detecting that the temperature exceeds the predetermined threshold. Furthermore, the program instructions 76 may be configured to automatically unlock the door lock 92 in response to the temperature detection system 110 detecting the temperature exceeds the predetermined threshold and the safety detection system detecting that the vehicle 2 is at least one of stopped and moving at a velocity of less than a predetermined velocity, such as fifteen miles per hour. In some embodiments, the vehicle 2 comprises a door 62 and a motor 63 configured to open the door 62. In such embodiments, the program instructions 76 may be configured to cause the motor 63 to open the door 62 in response to the temperature detection system 110 detecting that the temperature exceeds the predetermined threshold and the safety detection system detecting that the vehicle 2 is at least one of stopped and moving at a predetermined velocity, such as less than ten miles per hour.

In some embodiments, the program instructions 76 are configured to automatically unlock the door lock 92 in response to the temperature detection system 110 detecting the temperature exceeds the predetermined threshold and in response to at least one of the safety detection system determining that the temperature exceeds a second predetermined threshold that is greater than the predetermined threshold.

In some embodiments, the program instructions are configured to cause the vehicle to stop moving via a first stopping mode in response to the temperature detection system detecting the temperature exceeds the predetermined threshold. Additionally, in some embodiments, the program instructions are configured to cause the vehicle to stop moving via a second stopping mode in response to the temperature detection system detecting the temperature exceeds the predetermined threshold and the safety detection system detecting an indication of a person being located inside the vehicle, and the second stopping mode is configured to enable the vehicle to stop more quickly than the first stopping mode.

In some embodiments, the second stopping mode is configured to enable the vehicle 2 to move at a greater speed than the first stopping mode. Furthermore, in some embodiments, the vehicle management system is configured to determine a local speed limit, and the second stopping mode is configured to enable the vehicle 2 to exceed the local speed limit by a greater amount than the first stopping mode. In some embodiments, the second stopping mode is configured to enable the vehicle 2 to accelerate faster than the first stopping mode. In some embodiments, the second stopping mode is configured to enable the vehicle 2 to decelerate faster than the first stopping mode.

In many embodiments, the vehicle management system comprises a vehicle guidance system having at least one of a camera, a radar, and a lidar. In many embodiments, the vehicle guidance system is configured to detect objects located outside the vehicle on the road, and the program instructions 76 are configured to enable the vehicle to come closer to the objects in the second stopping mode than in the first stopping mode.

With continued reference to FIG. 14, a remote computing device 12c of a manager 3 of the vehicle 2 can receive wireless communications from the vehicle 2 (in some cases via intermediary communication system 5) in response to the vehicle 2 detecting a temperature that exceeds a predetermined threshold.

The temperature detection system 110 can include a variety of devices to detect temperature. In some embodiments, the temperature detection system 110 comprises at least one of an image analysis system 70, an infrared camera 10, thermocouple 116, resistance temperature detector (RTD) 120, thermistor 122, integrated circuit 124, pyrometer 126, and thermometer 128. Devices such as the thermocouple 116, resistance temperature detector (RTD) 120, thermistor 122, integrated circuit 124, pyrometer 126, and thermometer 128 may be configured to detect air and/or a surface temperature in the various locations 120, 122, 124 of the vehicle 2. The infrared camera 10 may be configured to detect temperatures within the vehicle 2 by inferring temperature from a portion of the thermal radiation sometimes cal led black-body radiation emitted by the object being measured. In this regard, the infrared camera 10 may be arranged and configured to monitor specific objects or targets within the vehicle 2. Additionally, the infrared camera 10 may be arranged and configured to monitor general locations within locations 120, 122, 124.

In some situations, the temperature may be less than the predetermined threshold but the temperature of an area of the vehicle 2 or a specific object located within the vehicle 2 may be increasing at a rapid rate. As such, to detect these dangerous situations, the temperature detection system 110 (via an infrared camera) may be configured to determine that the temperature is increasing at a rate that exceeds a predetermined rate. For example, the temperature of the cargo area 124 of the vehicle 2 may be well below the predetermined threshold, but a laptop located in the cargo area 124 may be increasing at a rapid rate, such as 20° F. per minute. Accordingly, the temperature detection system 110 may be configured to determine increasing temperature rates of an entire area, such as the cargo area 124 of the vehicle 2, and/or an individual object, such as the laptop in the cargo area 124. Various preventative measures can be taken, such as reducing the speed of the vehicle 2 so that the riders can exit safely.

A vehicle fire is an emergency in which seconds count. Each second saved until the rider exits the vehicle can significantly reduce the severity of injuries due to the fire. In fact, mere seconds can mean the difference between life and death.

Vehicle fires cause some riders to panic. In this panicked state of mind, some riders forget to unbuckle their seat belt, cannot see how to unbuckle their seat belt due to smoke, fail to look for the door unlocking button, fail to find the door unlocking button due to smoke or lack of clear mental processing, fail to look for the door opening handle, and/or even fail to find the door opening handle. Some embodiments reduce fire-related injuries and save lives by enabling riders to exit vehicles more quickly.

Figure 15:
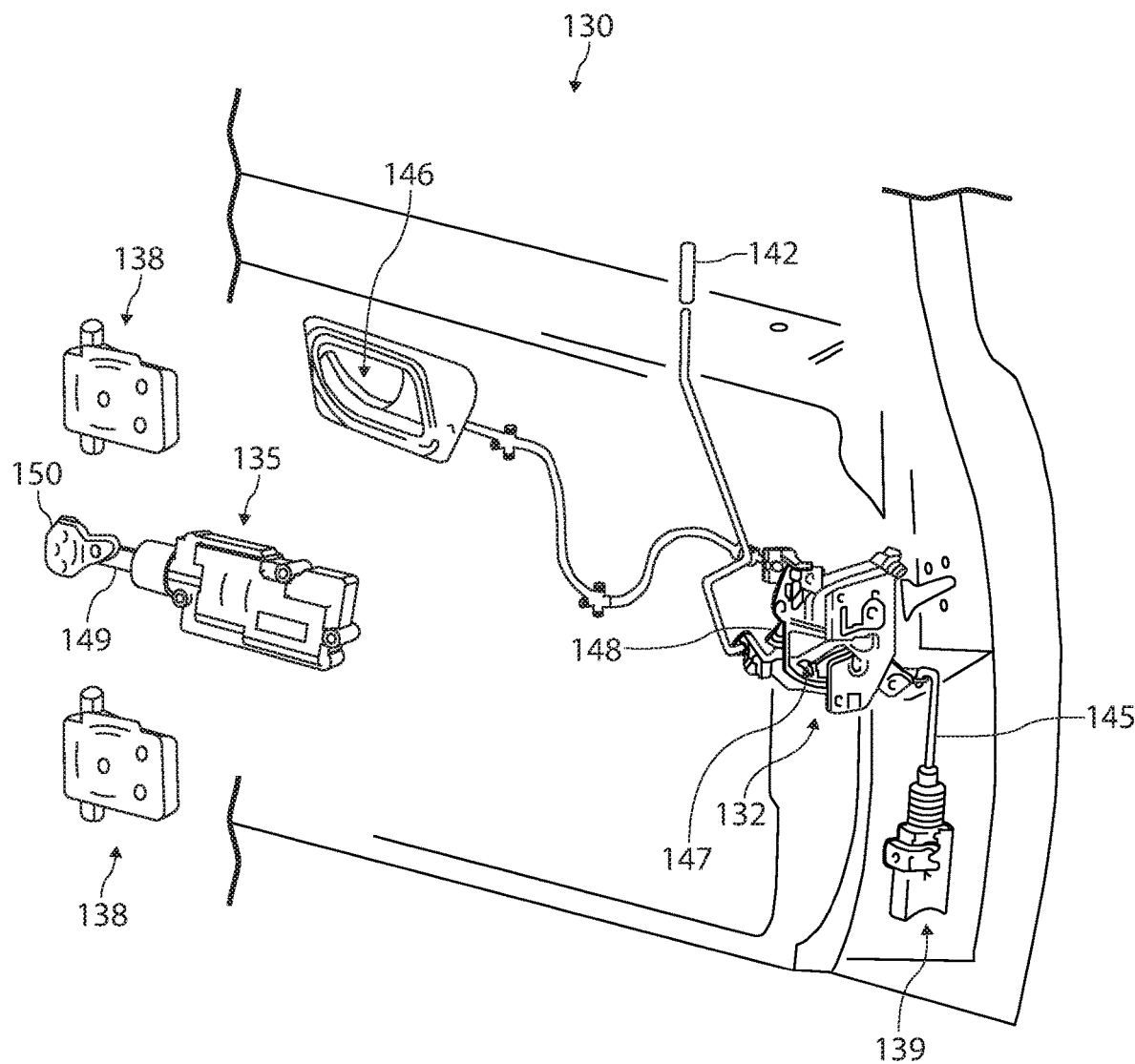
FIGS. 15, 16, and 17 each illustrate perspective views of a door of a vehicle, according to some embodiments.

FIG. 15 illustrates a perspective view of a door 130 of the vehicle 2. Some portions of the door 130 are hidden to focus attention on the features shown in FIG. 15. As indicated by the closed state of the hinges 138 and a retracted state of a rod 149 of the door actuator 135, the door 130 is in a closed state in FIG. 15.

Figure 16:
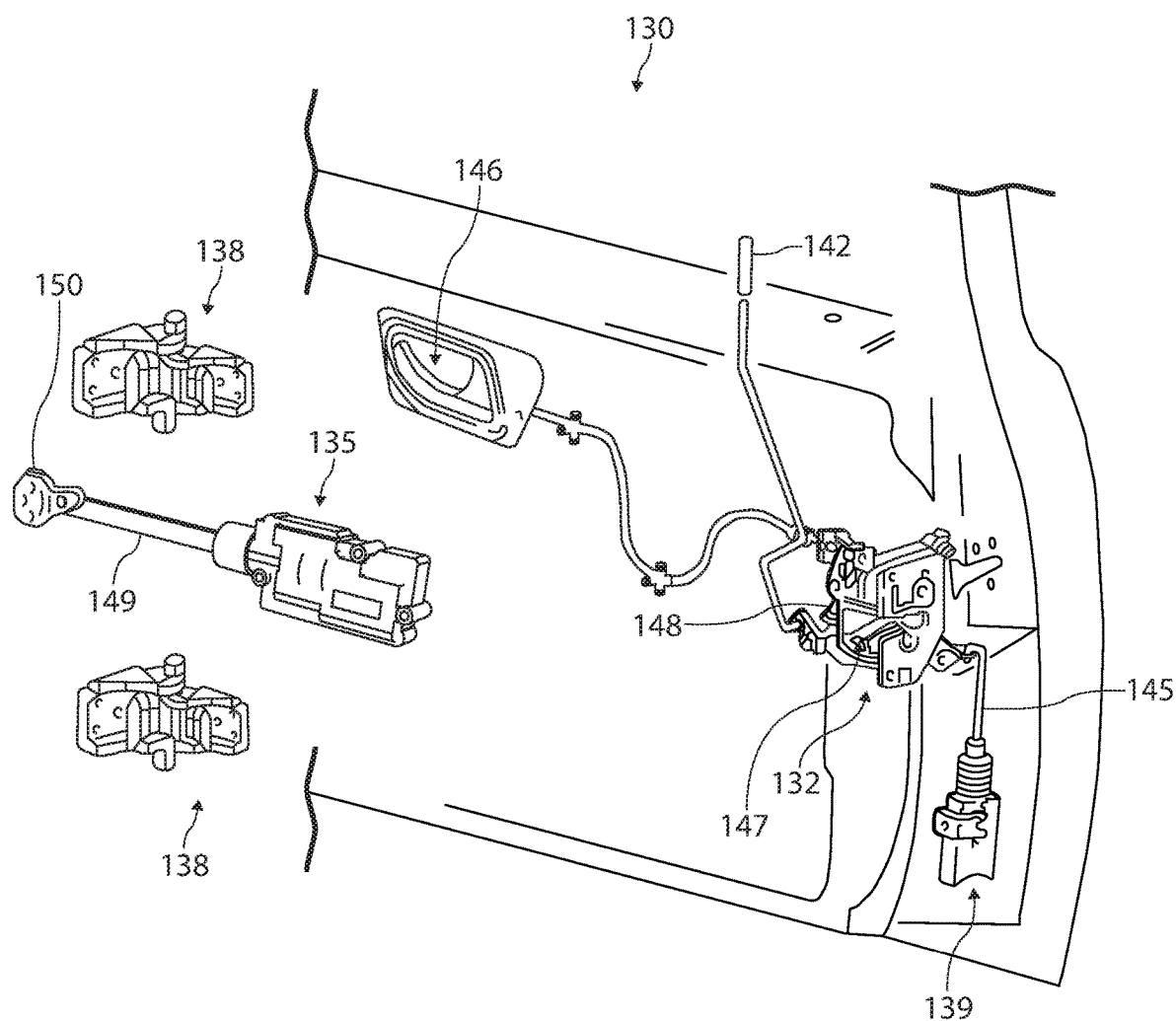

FIG. 16 illustrates a perspective view of an open state of the door 130 of the vehicle 2. Some portions of the door 130 are hidden to focus attention on the features shown in FIG. 16. As indicated by the open state of the hinges 138 and an extended state of the rod 149 of the door actuator 135, the door 130 is in an open state in FIG. 16.

The rod 149 can retract into an outer housing of the door actuator 135 (which can be a linear actuator) to pull the door 130 closed. The rod 149 can extend out of the outer housing of the door actuator 135 to push the door 130 open. An anchor 150 couples a distal end of the rod 149 to a frame of the vehicle 2.

The vehicle 2 can comprise power door locks. A button 142 can be configured to lock and unlock the door 130. The button 142 can mechanically and/or electrically interact with the door lock 132. Pressing the button 142 can send electrical power to a door lock actuator 139 that is configured to unlock the door 130 by placing the door lock 132 in an unlocked state.

Referring now primarily to FIGS. 9, 15, and 16, the computer system 7 can control the locked and unlocked states of the door lock 132. For example, program instructions 76 can be configured to lock or unlock the door in response to a safety system detecting various items.

A door lock actuator 139 can place the door lock 132 in a locked state (e.g., when a rod 145 of the door lock actuator 139 is in a first position). A door lock actuator 139 can place the door lock 132 in an unlocked state (e.g., when a rod 145 of the door lock actuator 139 is in a second position).

The rod 145 can extend out of an outer housing of the door lock actuator 139 and can retract into the outer housing of the door lock actuator 139 to place the door lock 132 in a locked state or in an unlocked state. The door 130 can comprise a door latch 147. When the door latch 147 is engaged with an anchor coupled to a frame of the vehicle 2, the door latch 147 holds the door 130 in a closed state. Moving the door latch 147 to disengage the door latch 147 from the anchor coupled to the frame enables the door 130 to open.

When the door lock 132 is in a locked state, moving the door handle 146 does not move the door latch 147. When the door lock 132 is in an unlocked state, moving the door handle 146 moves the door latch 147 to enable opening the door 130. The door latch 147 can be moved by the door handle 146 or by a door latch actuator 148 that is part of the door lock 132 and/or part of the door latch 147.

The computer system 7 can control the movement of the door lock actuator 139, the door latch actuator 148, and the door actuator 135. Program instructions 76 can be configured to cause movement of the door lock actuator 139, the door latch actuator 148, and the door actuator 135.

Embodiments can use many different types of actuators (e.g., for the door lock actuator 139, the door latch actuator 148, and the door actuator 135). Some embodiments use electric linear actuators. Actuators can be electric, hydraulic, pneumatic, twisted and coiled polymer (TCP), supercoiled polymer (SCP), thermal, magnetic, and/or mechanical. Actuators can comprise electric motors, comb drives, electroactive polymers, hydraulic cylinders, piezoelectric components, pneumatic components, screw jacks, servomechanism, servomotors, solenoids, stepper motors, shape memory alloys, and/or thermally active components.

Figure 17:
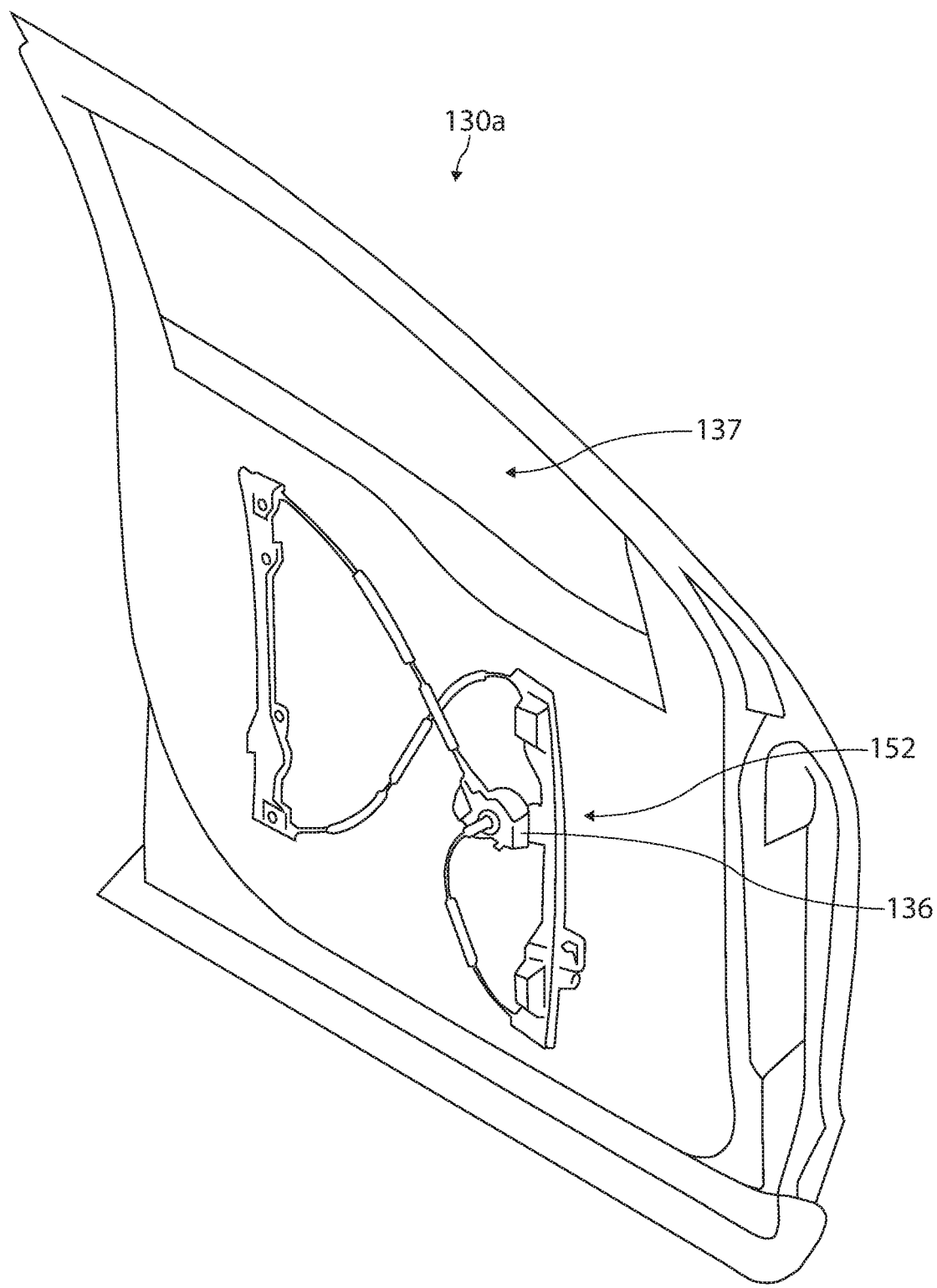

FIG. 17 illustrates a perspective view of a door 130a. The door 130 illustrated in FIGS. 15 and 16 can include all of the components described in the context of the door 130a in FIG. 17. Many components of the door 130a are hidden to more clearly show particular components in FIG. 17.

Referring now primarily to FIGS. 9 and 17, the door 130a can comprise a window regulator 152 configured to open and close a window 137 of the door 130a. A motor 136 can cause a cable and pulley system of the window regulator 152 to move the window up and down.

The computer system 7 can control the open and closed states of the window 137 by causing the motor 136 of the window regulator 152 to move the window 137 up and down. The motor 136 can be an electric motor that is electronically controlled by the computer system 7. Program instructions 76 can be configured to open and close the window 137 in response to a safety system detecting various items.

Additional vehicle details are described in U.S. Pat. Nos. 6,530,251; 5,386,713; 6,328,353; and 4,929,007. The entire contents of U.S. Pat. Nos. 6,530,251; 5,386,713; 6,328,353; and 4,929,007 are incorporated by reference herein.

In many embodiments, a safety system includes a self-driving vehicle 2 and a vehicle management system configured to autonomously drive the self-driving vehicle. The safety system may also include a smoke detection system 74 coupled to the self-driving vehicle 2 and configured to detect smoke inside a cabin of the self-driving vehicle 2.

With reference to FIG. 15, the self-driving vehicle 2 may include a door 130 and a door lock 132 configured to impede opening the door 130. In many embodiments, the safety system comprises at least one processor 77 and at least one memory 75 having program instructions 76 that when executed by the at least one processor are configured to cause the vehicle management system to unlock the door 130 of the self-driving vehicle 2 in response to the smoke detection system 74 detecting the smoke inside the self-driving vehicle 2.

When smoke is present in the self-driving vehicle 2, the rider's instinct may cause the rider to panic and open the door 130. However, if the vehicle 2 is moving at relatively high rate of speed (e.g. greater than 15 mph) it may be very dangerous to open the door 130. Accordingly, as shown in FIG. 9, the safety system may further comprise a speed detection system 134. In some embodiments, the program instructions are configured to cause the vehicle management system to automatically unlock the door 130 in response to the smoke detection system 74 detecting the smoke inside the self-driving vehicle 2 and the speed detection system 134 determining that the self-driving vehicle 2 is moving at a first speed that is less than a first speed threshold. In some embodiments, the first speed threshold is less than 30 miles per hour.

Even still, in some embodiments, the program instructions are configured to cause the vehicle management system to unlock the door 130 in response to the smoke detection system 74 detecting the smoke inside the self-driving vehicle 2 and the speed detection system 134 determining that the self-driving vehicle 2 is moving at a first speed that is less than a first speed threshold. Furthermore, in some embodiments, the program instructions are configured to cause the motor to at least partially open the door 130 in response to the smoke detection system 74 detecting the smoke inside the self-driving vehicle 2 and the speed detection system 134 determining that the self-driving vehicle 2 is moving at a second speed that is less than a second speed threshold. In some embodiments, the second speed threshold is less than 15 miles per hour.

In some embodiments, the speed threshold for unlocking doors is less than 30 miles per hour, less than 20 miles per hour, less than 10 miles per hour, greater than 5 miles per hour, and/or greater than 1 mile per hour. In some embodiments, the speed threshold for opening doors is less than 21 miles per hour, less than 15 miles per hour, less than 5 miles per hour, and/or greater than 1 mile per hour. In some embodiments, the program instructions are not configured to unlock the doors and/or open the doors until at least a portion of the safety system verifies that the vehicle is no longer moving.

Many different types of speed detection systems can be used. In some embodiments, a self-driving vehicle 2 comprises a speed detection system 134 that enables the speedometer of the self-driving vehicle 2 to display a speed of the vehicle 2. In some embodiments, the safety system uses GPS data (e.g., including locations of the vehicle every 0.1 second) to calculate the speed of the self-driving vehicle 2.

Smoke inhalation may pose a serious health and safety risk to the rider(s). For example, a rider may inhale smoke from inside the cabin of the self-driving vehicle 2 and thereby become incapacitated leaving the rider trapped in the vehicle 2. As such, it may be desirable to configure the self-driving vehicle 2 such that the door 130 automatically opens in response to the presence of smoke. Accordingly, the self-driving vehicle 2 may comprise a motor (e.g., of the door actuator 135) configured to at least partially open the door 130. Furthermore, the program instructions may thereby be configured to cause the motor 135 to at least partially open the door in response to the smoke detection system 74 detecting the smoke inside the self-driving vehicle 2.

With reference to FIG. 17, the self-driving vehicle may include a window 137 and a motor 136 configured to at least partially open the window 137. In such embodiments, the program instructions may be configured to cause the motor 136 to at least partially open the window 137 in response to the smoke detection system 74 detecting the smoke inside the self-driving vehicle 2.

In some embodiments, the smoke detection system 74 is configured to determine particle size of the smoke and concentration of the smoke. In such embodiments, the program instructions may be configured to cause the vehicle management system to automatically unlock the door 130 and/or open the door 130 of the self-driving vehicle 2 in response to the smoke detection system 74 detecting the smoke inside the self-driving vehicle 2 and the safety system determining the concentration of the smoke is greater than a predetermined threshold. It should be appreciated that the concentration of smoke may indicate the amount of combustion products found in a specified volume of air, commonly expressed as micrograms of emission per cubic meter of air.

Additionally, in some embodiments, the smoke detection system 74 is configured to detect a particle size of the smoke, and the vehicle management system is configured to unlock the door 130 in response to the smoke detection system 74 detecting the smoke inside the self-driving vehicle 2 and the safety system determining the particle size is smaller than a predetermined threshold.

Now, with reference to FIG. 17, many embodiments of the self-driving vehicle 2 comprise a window 137 and a motor 136 configured to at least partially open the window. In some embodiments, the smoke detection system 74 is configured to detect a particle size of the smoke and the program instructions are configured to cause the vehicle management system to unlock the door 130 in response to the safety system determining the particle size is smaller than a first predetermined threshold. Furthermore, the program instructions may also be configured to cause the motor 136 to at least partially open the window 137 in response to the safety system determining the particle size is larger than a second predetermined threshold. In some embodiments, the first predetermined threshold is smaller than or equal to the second predetermined threshold. However, in some embodiments, the first predetermined threshold is larger than the second predetermined threshold.

Many different ways of detecting particle sizes are described herein and/or incorporated by reference. In some embodiments, the smoke detection system 74 comprises an optical smoke detection system that uses several different infrared light wavelengths. The infrared light wavelengths selected for use in the optical smoke detection system can be chosen because they approximately correspond (in length) to particles sizes emitted in vehicle fires.

Furthermore, an optical smoke detector can use a first infrared light wavelength, a second infrared light wavelength (that is longer than the first wavelength), a third infrared light wavelength (that is longer than the second wavelength), and a fourth infrared light wavelength (that is longer than the third wavelength). Optical smoke detectors can sense smoke particles when smoke particles scatter a beam of the infrared light onto a light detector. An optical smoke detection system can detect an indication of smoke particle size by determining which of the first, second, third, and fourth wavelengths were scattered by the smoke particle.

As described heretofore, the self-driving vehicle 2 may comprise an actuator 139 configured to move the door lock 132 to an unlocked state. In some embodiments, the program instructions are configured to verify the door 130 is in the unlocked state in response to the smoke detection system 74 detecting the smoke inside the self-driving vehicle 2. If the door 130 is in the locked state, the program instructions can be configured to cause the vehicle management system to put the door 130 in the unlocked state in response to the smoke detection system 74 detecting the smoke inside the self-driving vehicle 2. In some embodiments, the program instructions can cause the vehicle management system to put the door 130 in the unlocked state in response to the smoke detection system 74 detecting the smoke inside the self-driving vehicle 2, without first verifying the whether the door 130 is in the unlocked state.

In some embodiments, the smoke detection system 74 comprises a camera 10 and at least one of an ionization smoke detector and an optical smoke detector. In some embodiments, the camera 10 is configured to take a picture showing at least a portion of the cabin. Furthermore, the program instructions may thereby be configured to cause the motor 136 to at least partially open the window 137 in response to the safety system determining that the picture shows the smoke, and the program instructions are configured to cause the door lock actuator 139 to move the door lock 132 to the unlocked state in response to at least one of the ionization smoke detector and the optical smoke detector detecting the smoke inside the self-driving vehicle 2. In some embodiments, program instructions are configured to at least partially open the window 137 in response to at least one of the ionization smoke detector and the optical smoke detector detecting the smoke inside the self-driving vehicle 2.

Figure 23:
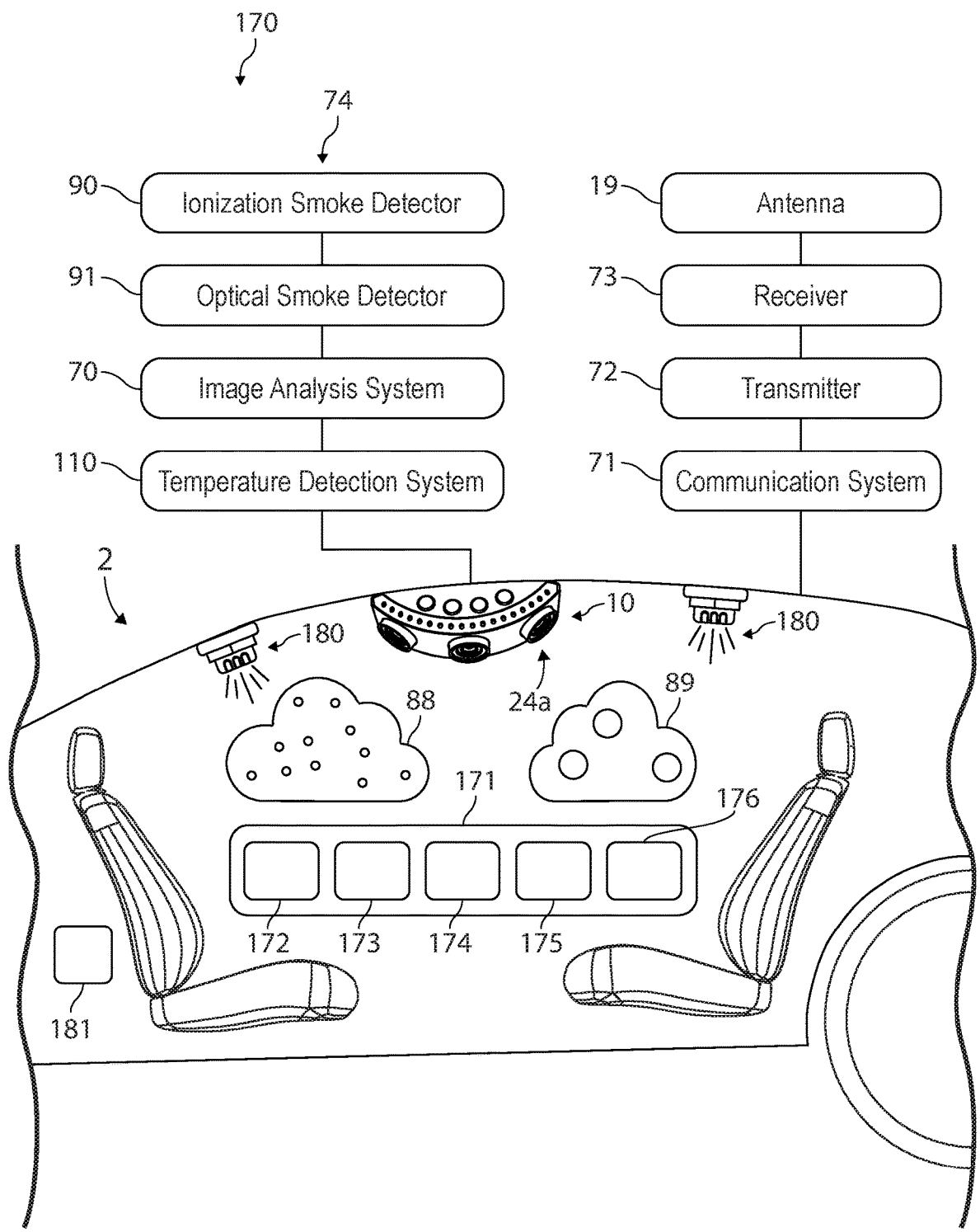
FIG. 23 illustrates a side view of a vehicle and a diagrammatic view of various devices and systems used in conjunction with the vehicle, according to some embodiments.

Because of the risk of false positives, in some embodiments, the self-driving vehicle 2 is configured to verify the presence of smoke by receiving a verification from a rider present inside the vehicle 2. Accordingly, as shown in FIG. 23, the program instructions are configured to automatically unlock the door lock 132 in response to the smoke detection system 74 detecting the smoke inside the self-driving vehicle 2 and the safety system receiving a verification input 171 from a rider. The verification input 171 may be configured to confirm a presence of the smoke 88, 89 in the self-driving vehicle 2.

As shown in FIGS. 2 and 3, the self-driving vehicle 2 may comprise a display screen 93. Now, with reference to FIG. 23, the program instructions may be configured to receive the verification input 171 from the rider via at least one of the display screen 93 and a button pressed by the rider in response to a visual request shown on the display screen 93, such input(s) are referred to as display screen input 172. Accordingly, in response to the smoke detection system 74 detecting the smoke, the program instructions may thereby be configured to cause the display screen 93 to emit, display, and/or present the visual request for the rider to confirm the presence of the smoke. The display screen 93 can be a touch screen. In some embodiments, the verification input 171 comprises a touch input 173 received by a touch sensor coupled to the self-driving vehicle 2 and communicatively coupled to the vehicle management system 181.

The verification input 171 may define a variety of formats, such as a verbal response 174 from the rider. Accordingly, the self-driving vehicle 2 may comprise a microphone 186 and a speaker 86. In such embodiments, the verification input 171 comprises a verbal response 174 received from the rider via the microphone 186 in response to the program instructions causing the speaker 86 to emit an audio request for the rider to confirm the presence of the smoke. In response to the smoke detection system 74 detecting the smoke, the program instructions may thereby be configured to cause the speaker 86 to emit the audio request.

The verification input 171 may take on additional forms, such as a physical gesture 175 made by the rider. In such embodiments, the self-driving vehicle 2 may comprise a camera 24c, and the verification input 171 may comprise a gesture 175 made by the rider and recorded by the camera 24c. In some embodiments, in response to the smoke detection system 74 detecting the smoke, the program instructions are configured to ask the rider to make a particular gesture if she believes there is smoke in the vehicle 2. The gesture 175 can be nodding her head, using sign language, or any other gesture that the system can interpret.

In some embodiments, the program instructions do not ask the rider to make a particular gesture if she believes there is smoke in the vehicle. Instead, a vision recognition system can use artificial intelligence (such as AWS machine learning made by Amazon Web Services, Inc.) to identify gestures associated with how riders respond to smoke in the vehicle. For example, the rider may express panic via facial expressions, may make wild movements that are uncharacteristic of normal riding behavior, may make rapid movements to open the window or bang on the window, may yell for "help," etc.

As shown in FIG. 23, in some embodiments, the safety system 170 and the smoke detection system 74 include a communication system 71, a transmitter 72, a receiver 73, and an antenna 19. The antenna 19 can communicatively couple at least one of the vehicle management system 181, the safety system 170, and the smoke detection system 74 to a remote computing device(s) 12. Accordingly, the verification input 171 may comprise a wireless communication 176 transmitted from a remote computing device 12 of the rider to the safety system 170. In this regard, the wireless communication 176 may comprise or be caused by a touch input received on a display screen of the remote computing device 12, such as via an app running on the remote computing device 12. In some embodiments, the wireless communication 176 comprises a text message or any transmission via radio communications, such as Bluetooth, cellular, WiFi, and the like. It should be appreciated that the wireless communication 176 may be transmitted directly or indirectly via intermediary communication systems 5.

In some embodiments, the self-driving vehicle 2 is configured to provide additional ways of alerting the rider. For example, in response to the smoke detection system 74 detecting the smoke inside the self-driving vehicle 2, the program instructions may be configured to cause the speaker 86 to emit audio instructions. The audio instructions may be configured to alert a rider regarding at least one of the smoke and the door being unlocked. In this regard, if the rider is not paying attention or is incapacitated (sleeping, drunk, disabled, and the like), then the audio instructions may provide for another way of alerting the rider and hopefully getting the rider's attention and thereby getting them to safety.

As shown in FIG. 23, in some embodiments, the self-driving vehicle 2 includes a fire extinguisher 180 arranged and configured to extinguish or at least control a fire inside a cabin of the vehicle 2. Accordingly, the safety system 170 may comprise at least one processor and at least one memory having program instructions that when executed by the at least one processor are configured to cause the vehicle management system 181 to cause the fire extinguisher 180 to extinguish or at least control (i.e. contain) the fire in response to the smoke detection system 74 detecting smoke inside the cabin of the vehicle 2. The fire extinguisher 180 may comprise a water fire extinguisher, AFFF foam fire extinguisher, carbon dioxide fire extinguisher, ABC powder fire extinguisher, water mist fire extinguisher, wet chemical fire extinguisher, and the like. In some embodiments, the fire extinguisher 180 is implemented as a fire suppression system using a combination of dry chemicals and/or wet agents to suppress fires. In some embodiments, the fire extinguisher 180 is an X-Tinguish® Fire Suppression System for Transportation made by Flame Guard USA having a manufacturing facility in Lake Barrington, Ill.

As illustrated in FIGS. 9, 14, and 23, the safety system 170 may also comprise a temperature detection system 110 coupled to the self-driving vehicle 2 and configured to detect a temperature inside at least a portion of self-driving vehicle 2. Accordingly, the program instructions may be configured to cause the vehicle management system 181 to unlock the door 130 in response to the smoke detection system 74 detecting the smoke inside the self-driving vehicle 2 and the temperature detection system 74 detecting the temperature greater than a predetermined temperature threshold.

In some embodiments, the temperature detection system 110 comprises a camera system configured to identify the smoke. In some embodiments, cameras 24a, 24b, 24c are configured to take pictures based on detecting light that is visible to the human eye. In some embodiments, at least some of the cameras 24a, 24b, 24c are thermal imaging cameras configured to detect the heat from a fire. The thermal imaging cameras can be part of the temperature detection system 110. A thermal imaging camera can be an infrared camera made by FLIR Systems, Inc. Embodiments can analyze infrared radiation to detect fires in a vehicle 2. In some embodiments, the infrared radiation is rendered as visible light to aid in heat analysis. Program instructions 76 can analyze the infrared light detected by infrared cameras to detect fires inside the vehicle 2.

The fire may be from a small object such as a laptop computer located inside the cabin of the vehicle 2. Program instructions 76 can cause an image analysis system 70 to analyze a thermal image taken by one of the cameras 24a, 24b, 24c to determine if the thermal image comprises a portion that has a temperature over a predetermined threshold (e.g., at least 150 degrees Fahrenheit, at least 180 degrees Fahrenheit, at least 200 degrees Fahrenheit). The program instructions 76 can be configured to respond to detecting the temperature over the predetermined threshold in any of the ways in which other embodiments respond to detecting smoke.

In some embodiments, the temperature detection system 110 is configured to precisely identify the location of the fire and/or smoke. In some embodiments, the temperature detection system 110 is configured to determine the temperature located within 36 inches of the smoke, 24 inches of the smoke, 12 inches of the smoke, 1 inch of the smoke, and distances greater than 1 inch from the smoke.

FIGS. 18-22 illustrate additional seat 51 and seat belt 153 embodiments that can be used with any of the other embodiments described herein and/or incorporated by reference. The seat 51 can be located in the vehicle 2. The camera device 10 can be located inside a cabin of the vehicle 2. The smoke detection system 74 can be located inside the cabin of the vehicle 2. Additional details related to FIGS. 18-22 are described in U.S. patent application Ser. No. 16/266,698. The entire contents of U.S. patent application Ser. No. 16/266,698 are incorporated herein by reference.

A seat belt is a restraining device configured to hold a rider in a seat of a vehicle during a collision. Many different types of seat belts can be used with the embodiments described herein and/or incorporated by reference.

Seat belt embodiments can use two-point seat belts, lap seat belts, shoulder seat belts, sash seat belts, three-point seat belts, four-point seat belts, five-point seat belts, six-point seat belts, eight-point seat belts, and any other type of restraining device configured to hold a rider in a seat of a vehicle during a collision.

Figure 18:
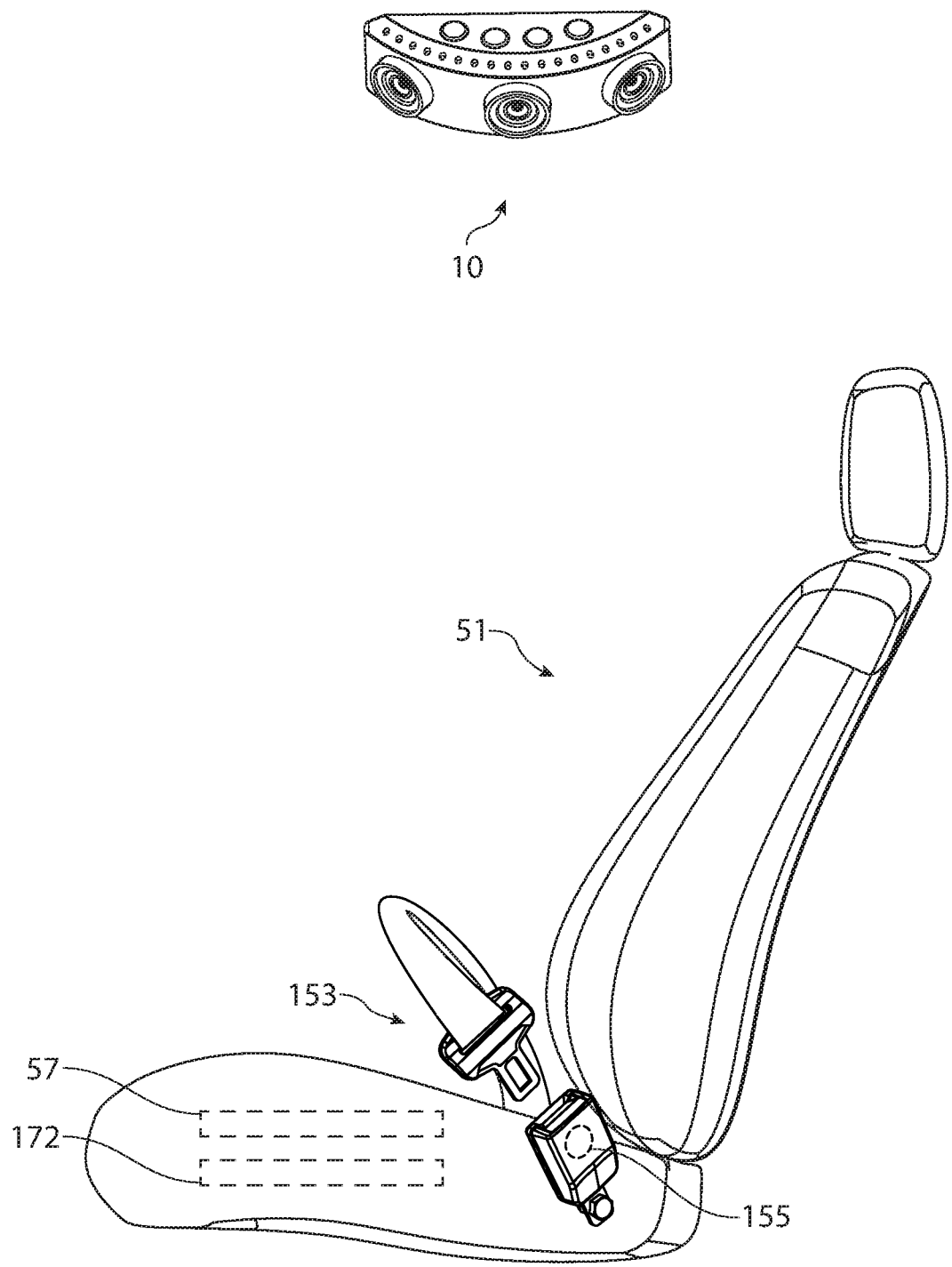
FIG. 18 illustrates a side view of a seat of a vehicle, according to some embodiments.

FIG. 18 illustrates a side view of a first seat 51. A camera device 10 is also shown in FIG. 18. The camera device 10 can be configured to detect if a rider is sitting in the first seat 51. An optional shoulder strap is hidden in FIG. 18.

Figure 19:
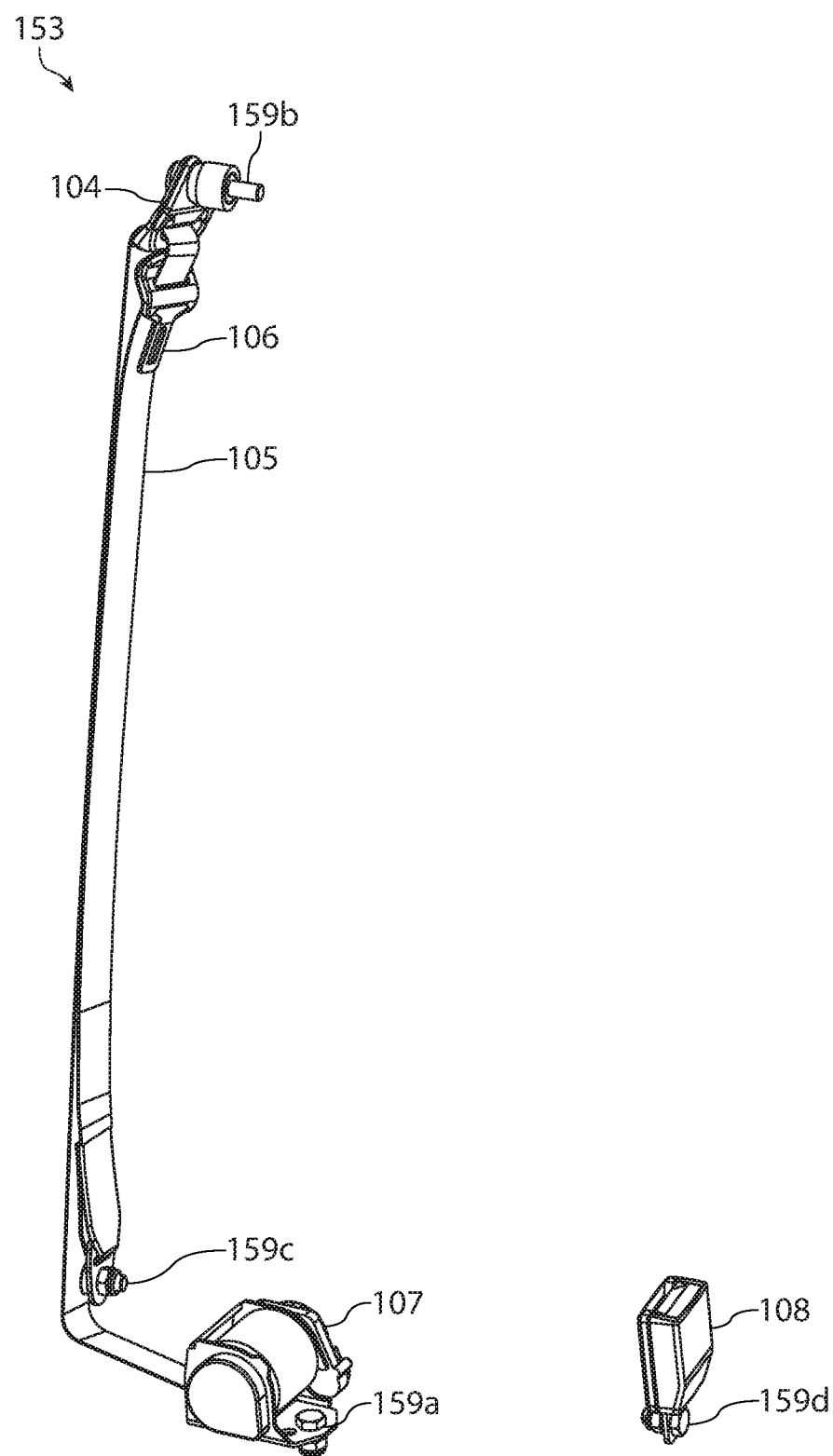
FIG. 19 illustrates a perspective view of a seat belt having anchor points that can be bolted to a frame of a self-driving vehicle, according to some embodiments.

FIG. 19 illustrates a seat belt 153 having anchor points 159a, 159b, 159c, 159d that can be bolted to a frame of a self-driving vehicle 2. The seat belt 153 can comprise a strap 105. The strap 105 can include webbing. The strap 105 can be flexible. The strap 105 can be rigid. Many other types of seat belts can be used.

The seat belt 153 can include a retractor 107 that is spring loaded to apply a force to the strap 105 that wraps at least a portion of the seat belt 153 around a rotating portion of the retractor 107. Pulling the seat belt tongue 106 toward the buckle 108 can create a triangular shape that forms a shoulder belt and a lap belt as the strap 105 slides through the pillar loop 104.

Figure 20:
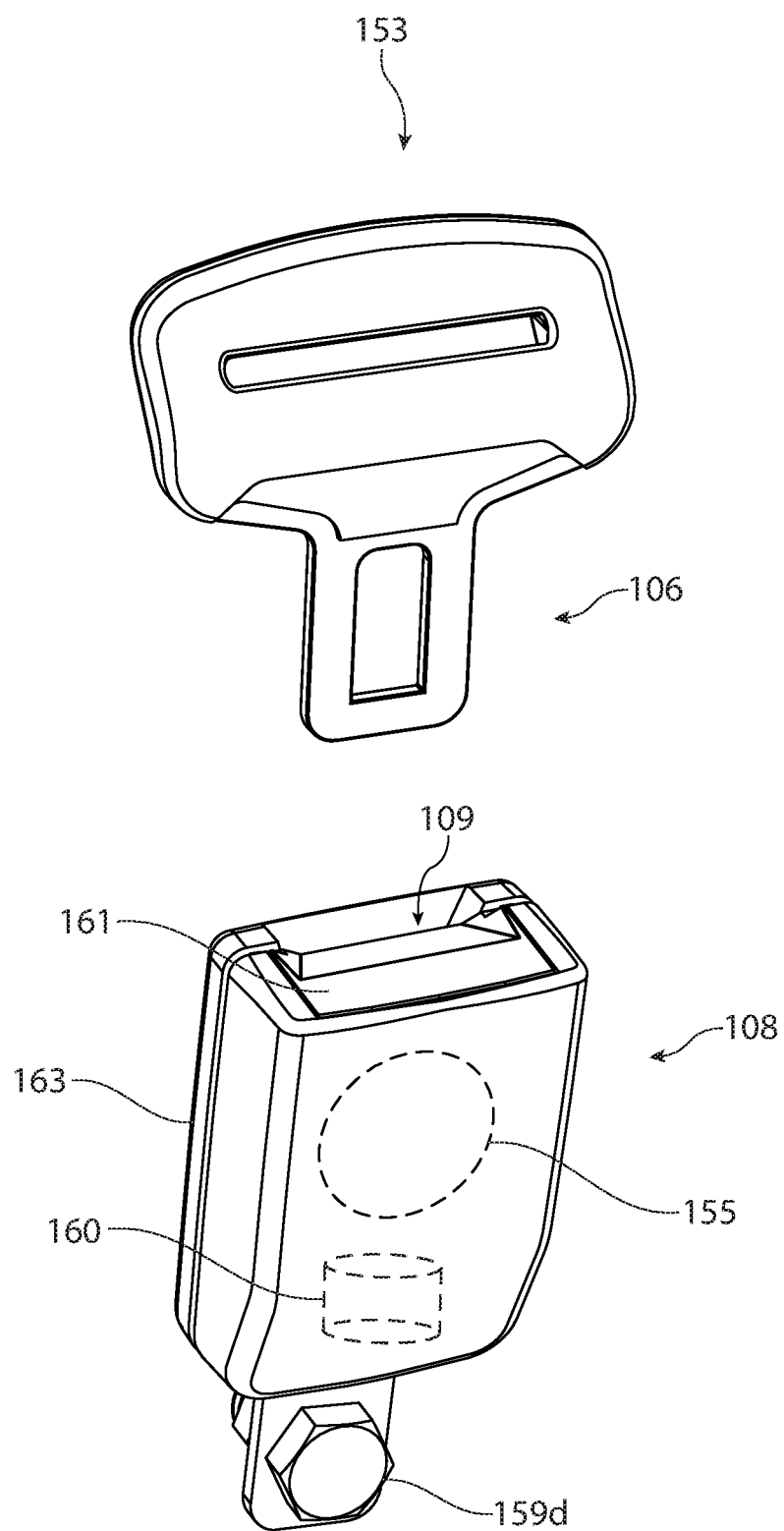
FIG. 20 illustrates a perspective view of portions of a seat belt, according to some embodiments.

FIG. 20 illustrates a perspective view of portions of the seat belt 153. Inserting the tongue 106 (which can be metal) into an opening 109 of the buckle 108 can "buckle" the seat belt 153.

Inserting the tongue 106 into the opening 109 can compress a spring 160. The compression of the spring 160 can cause the buckle 108 to eject the tongue 106 when a rider presses a button 161 configured to unbuckle the seat belt 153.

Figure 21:
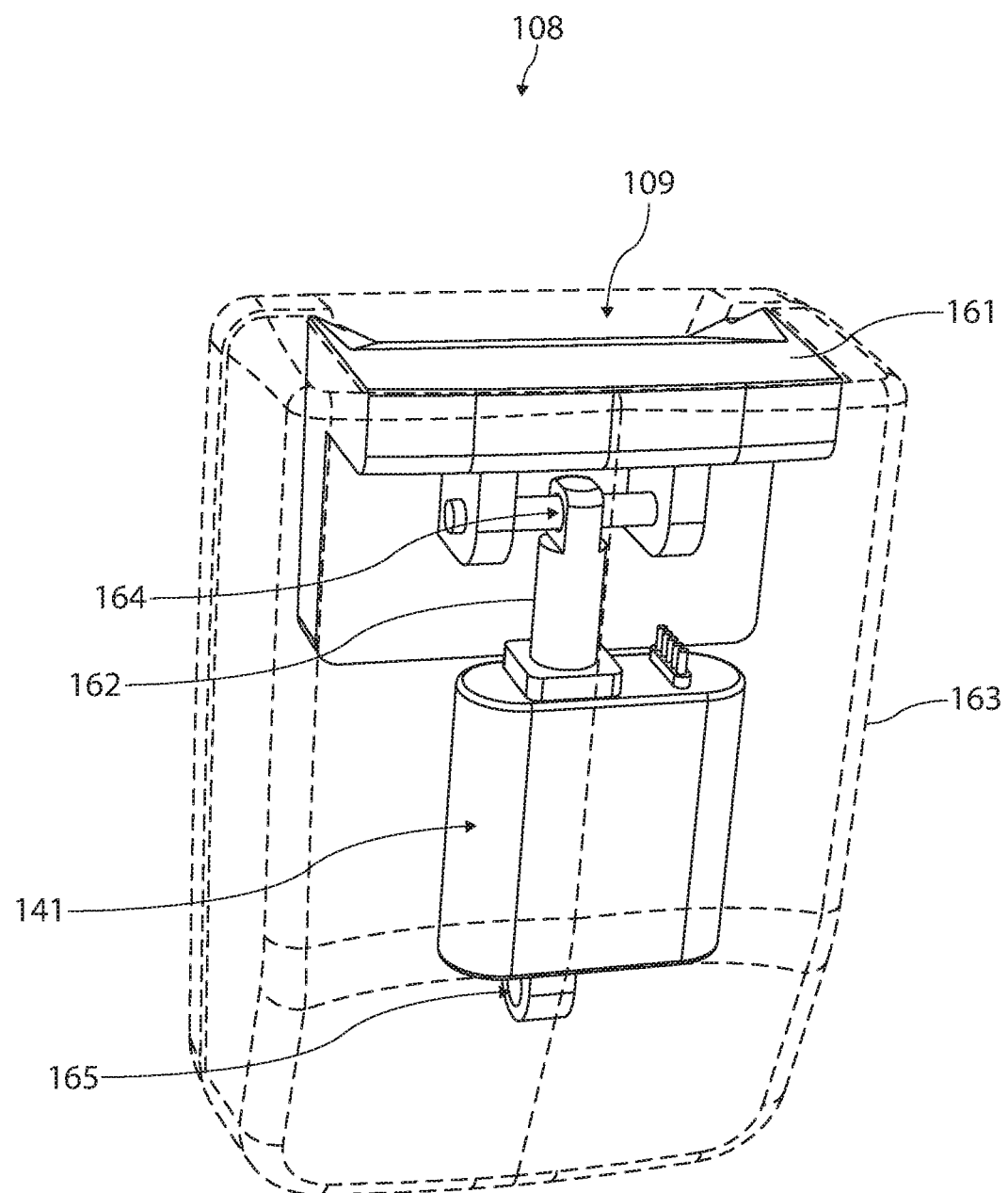
FIGS. 21 and 22 illustrate a perspective view of an actuator of a seat belt, according to some embodiments.

As shown in FIG. 21, an actuator 141 can also be configured to depress the button 161 (e.g., by pulling the button assembly downward into the outer housing 163 of the buckle 108). The retractor 107 (shown in FIG. 19) can be spring loaded such that once the buckle 108 ejects the tongue 106 (e.g., in response to the button 161 moving), the retractor 107 reels in at least a portion of the strap 105 to pull the seat belt 153 off of the rider to enable the rider to exit the vehicle 2.

In some embodiments, the actuator 141 is an electric linear actuator controlled by the computer system 7 shown in FIG. 9. (Actuators can be purchased from many companies including Actuonix Motion Devices Inc.) Program instructions 76 can be configured to cause the actuator 141 to move the button 161 in response to various items.

The actuator 141 can comprise a rod 162 configured to extend (e.g., to push the button 161 upward) and retract (e.g., to depress the button 161). A distal end of the rod 162 can comprise an anchor 164 that couples the distal end of the rod 162 to the button 161. A lower end of the actuator 141 can comprise an anchor 165 that is coupled to the outer housing 163.

Referring now primarily to FIGS. 9 and 18-22, a seat belt sensor 155 is configured to detect at least one of a buckled state of the first seat belt 153 and an unbuckled state of the first seat belt 153. In some embodiments, a seat belt sensor detects if a strap 105 is coupled to an anchor such that the seat belt 153 is arranged to restrain a rider in the event of a collision. In some embodiments, a seat belt sensor 155 detects if there is strain on the strap 105 (e.g., due to one end of the strap 105 being coupled to an anchor and another end of the strap 105 being pulled by a retractor 107) such that the seat belt 153 is arranged to restrain a rider in the event of a collision. Many types of seat belt sensors can be used with the embodiments described herein and/or incorporated by reference.

U.S. Pat. No. 7,093,515 teaches a seat belt sensor to detect whether a seat belt is in a buckled state: "The buckle switch 17 is turned off when the seat belt 14 is fastened by inserting and thereby hooking a tongue 15 to a buckle 16. The buckle switch 17 is turned on when the tongue 15 is not inserted into and hooked on the buckle 16 and thus the seat belt 14 is unfastened." See FIG. 4 of U.S. Pat. No. 7,093,515. The entire contents of U.S. Pat. No. 7,093,515 are incorporated by reference herein.

U.S. Pat. Nos. 5,960,523; 6,554,318; and 5,871,063 teach about seat belt sensors. The entire contents of U.S. Pat. Nos. 5,960,523; 6,554,318; and 5,871,063 are incorporated by reference herein.

U.S. Pat. Nos. 5,965,827; 5,996,421; 5,765,774; 6,205,868; and 6,357,091 teach about seat belt sensors. The entire contents of U.S. Pat. Nos. 5,965,827; 5,996,421; 5,765,774; 6,205,868; and 6,357,091 are incorporated by reference herein.

In some embodiments, a seat belt sensor 155 comprises a switch that is triggered by inserting the tongue 106 into the opening 109 of the buckle 108. The switch can be a mechanical switch. The switch can be an electrical component configured to, for example, complete an electrical current in response to inserting the tongue 106 into the opening 109 of the buckle 108. Many different types of electrical switches can be used. Some embodiments use a reed switch. Some embodiments use a light switch configured such that inserting the tongue 106 into the opening 109 of the buckle 108 blocks light emitted from a light source (located inside the buckle 108) from reaching a light sensor (located inside the buckle 108). If the buckle sensor does not detect the light from the light source, then the system determines that the seat belt 153 is "buckled."

In some embodiments, the tongue 106 comprises a signal emitting portion and the buckle 108 comprises a signal receiving portion. If the buckle sensor does not detect the signal, then the system determines that the seat belt 153 is "unbuckled."

In some embodiments, the tongue 106 comprises a signal receiving portion and the buckle 108 comprises a signal emitting portion. If the buckle sensor does not detect the signal, then the system determines that the seat belt 153 is "unbuckled."

In some embodiments, the buckle sensor 155 is a strain gauge coupled to the strap 105 such that when the seat belt 153 is "buckled," the resulting strain is sensed by the buckle sensor 155 (such that the system can determine that the seat belt 153 is "buckled").

A seat belt may be extendable (e.g., the retractor 107 may allow additional strap length to unroll) but still may be arranged to help secure the rider if a collision occurs. In some embodiments, a seat belt arranged across a lap of a rider, across a chest and shoulder area of a rider, and/or across a frontside (e.g., of an upper body) of the rider is arranged to help secure a rider if a collision occurs.

As used herein, "buckled state" is used broadly to mean that the seat belt is arranged to help secure a rider if a collision occurs. As used herein, "unbuckled state" is used broadly to mean that the seat belt is not arranged to help secure a rider if a collision occurs. In some embodiments, if the seat belt is simply located at the side of the rider and the tongue 106 is not coupled to the buckle 108, then the seat belt is not arranged to help secure the rider if a collision occurs.

Some seat belts do not have a buckle but can still be placed in a "buckled state" if the seat belt is arranged to help secure a rider if a collision occurs. A seat belt (even without a buckle) can be positioned across a lap of a rider such that the seat belt is arranged to help secure a rider if a collision occurs.

Embodiments can use the terminology "uncoupled state" for a seat belt that is not arranged to help secure a rider if a collision occurs and "coupled state" for a seat belt that is arranged to help secure a rider if a collision occurs.

Embodiments can use the terminology "unfastened state" for a seat belt that is not arranged to help secure a rider if a collision occurs. Embodiments can use the terminology "fastened state" for a seat belt that is arranged to help secure a rider if a collision occurs.

Motorized seat belts can be placed in a buckled state via a motor that moves the seat belt into a position to help secure a rider if a collision occurs. The seat belt can begin in an unbuckled state that enables the rider to enter the vehicle and sit in the seat. Then, the motor can move the seat belt (e.g., along a track coupled to a frame of the vehicle) into a buckled state such that the seat belt is in a position to help secure the rider if a collision occurs. In some motorized seat belts, actuating a buckle is not necessary to transition from an unbuckled state to a buckled state because movement of an end of the seat belt along the track (rather than actuating the buckle) places the seat belt in a position to help secure a rider if a collision occurs. The entire contents of U.S. Pat. No. 4,995,640 are incorporated by reference herein.

In some embodiments, a seat-belt monitoring system comprises a first occupancy sensor 57 configured to detect the rider sitting in the first seat 51. Occupancy sensor embodiments can use any type of sensor that enables the seat-belt monitoring system to detect whether a rider is located in a seat. Many types of sensors can be used.

In some embodiments, an occupancy sensor comprises a camera (e.g., 10) configured to take a picture of the rider. A computer system 7 can comprise program instructions 76 configured to visually analyze the picture to determine if the picture shows a rider (a person) sitting in a seat 51. For example, Amazon Web Services, Inc. provides an application programming interface ("API") called "Amazon Rekognition" to automatically recognize people and objects in pictures. A communication system 71 of a self-driving vehicle 2 can send the picture to the API for analysis. The API can then tell a computer system 7 if the picture shows a rider located in the seat of the vehicle. The API can also tell a computer system 7 if the picture shows the seat belt in a buckled state or in an unbuckled state. Thus, the API can enable a camera-based system to serve as both an occupancy sensor (to determine if a person is sitting in the seat) and as a seat belt sensor configured to detect a buckled state of the seat belt and an unbuckled state of the seat belt.

In some embodiments, an occupancy sensor comprises a camera. U.S. Pat. No. 7,505,841 includes an occupancy sensor that comprises a camera. The entire contents of U.S. Pat. No. 7,505,841 are incorporated by reference herein. U.S. Pat. No. 7,415,126 includes an occupancy sensor that comprises a camera. The entire contents of U.S. Pat. No. 7,415,126 are incorporated by reference herein.

In some embodiments, an occupancy sensor comprises a pressure sensor configured to detect whether a rider is sitting in a seat of a vehicle. The pressure sensor can collect data indicative of a rider's weight. The rider likely has her feet on the floor, so the weight data may not reflect the rider's entire weight. Even so, the weight data can help identify the rider. For example, a first rider may have a weight of 120 pounds with 30 pounds resting on the floor (due to the first rider's feet being on the floor) and 90 pounds resting on a first seat. The distribution between the first rider's weight on the floor and weight on the first seat may vary (e.g., by plus or minus fifteen percent) depending on how the first rider is sitting on the first seat, but generally is fairly consistent.

A second rider may have a weight of 200 pounds with 50 pounds resting on the floor (due to the second rider's feet being on the floor) and 150 pounds resting on a second seat. The distribution between the second rider's weight on the floor and weight on the second seat may vary (e.g., by plus or minus fifteen percent) depending on how the second rider is sitting on the second seat, but generally is fairly consistent.

Program instructions 76 can be configured to use the weight on the seat (and/or on the floor) to help identify which rider is sitting in a particular seat. For example, the first rider may travel in four vehicles on four different days with recorded weights (e.g., in seats of each vehicle) of 90+/−8 pounds, 92+/−7 pounds, 91+/−8 pounds, and 89+/−7 pounds. The second rider may travel in four vehicles on four different days with recorded weights (e.g., in seats of each vehicle) of 150+/−9 pounds, 148+/−7 pounds, 148+/−5 pounds, and 151+/−8 pounds.

If the first and second riders are located in a vehicle, the program instructions can be configured to use the weight history data of the first and second riders to determine which rider is located in a particular seat. For example, "seat A" may detect a weight of 92 pounds and "seat B" may detect a weight of 148 pounds. The computer system can then compare the detected weights to a weight history in a profile of each rider to determine that the first rider is located in "seat A" and the second rider is located in "seat B." If a seat belt sensor of "seat B" detects an unbuckled state, the program instructions can be configured to fine an account of the second rider (rather than mistakenly fining an account of the first rider).

A weight (e.g., detected by an occupancy sensor) over a predetermined threshold can be used to enable the system to determine that the weight is due to a person rather than another object such as a laptop, a backpack, or a grocery bag. In some embodiments, the predetermined threshold is greater than 20 pounds, greater than 30 pounds, less than 50 pounds, and/or less than 70 pounds.

U.S. Pat. No. 6,609,054 includes occupancy sensor information. The entire contents of U.S. Pat. No. 6,609,054 are incorporated by reference herein.

U.S. Pat. No. 6,918,612 includes occupancy sensor information. The entire contents of U.S. Pat. No. 6,918,612 are incorporated by reference herein.

U.S. Pat. No. 6,927,678 includes occupancy sensor information. The entire contents of U.S. Pat. No. 6,927,678 are incorporated by reference herein.

U.S. Pat. No. 6,920,256 includes occupancy sensor information. The entire contents of U.S. Pat. No. 6,920,256 are incorporated by reference herein. Occupancy sensor systems can use effects of a presence of a rider sitting in a seat to detect whether a rider is sitting in a seat. In some embodiments, light from a light source is blocked by the rider sitting on a seat. The blocked light is not detected by a light sensor. Failing to detect the light is a signal that a rider is sitting in the seat.

In some embodiments, an occupancy sensor comprises a weight sensor 172. U.S. Pat. No. 6,636,792 includes weight sensor information. The entire contents of U.S. Pat. No. 6,636,792 are incorporated by reference herein.

The disclosure also includes a safety system 170 comprising a self-driving vehicle 2 configured to transport a rider, a vehicle management system configured to autonomously drive the self-driving vehicle 2, a seat 51 coupled to the self-driving vehicle 2, and a seat belt 153 configured to alternatively have a buckled state and an unbuckled state. In many embodiments, the safety system 170 includes a smoke detection system 74 coupled to the self-driving vehicle 2 and configured to detect smoke inside a cabin of the self-driving vehicle 2.

In the buckled state the seat belt 153 is configured to secure the rider in the seat 51 and in the unbuckled state the seat belt 153 is configured to enable the rider to exit the seat 51. The seat belt 153 is configured to alternatively have a buckled state and an unbuckled state. In other words, if the seat belt 153 is in the buckled state, the seat belt 153 is not in the unbuckled state. If the seat belt 153 is in the unbuckled state, the seat belt 153 is not in the buckled state.

In many embodiments, the safety system 170 further includes at least one processor 77 and at least one memory 75 having program instructions 76 that when executed by the at least one processor 77 are configured to cause the vehicle management system to switch the seat belt 153 from the buckled state to the unbuckled state in response to the smoke detection system detecting the smoke inside the self-driving vehicle 2. Some embodiments comprise at least one processor 77 and at least one memory 75 having program instructions 76 that when executed by the at least one processor 77 are configured to cause the vehicle management system to unbuckle the seat belt 153 in response to the smoke detection system 74 detecting the smoke inside the self-driving vehicle 2. The program instructions 76 can cause the vehicle management system to change the seat belt 153 from the buckled state to the unbuckled state in response to the smoke detection system 74 detecting the smoke inside the self-driving vehicle 2. The program instructions 76 can also cause the vehicle management system to change the seat belt 153 from the unbuckled state to the buckled state. In some embodiments, the rider manually buckles the seat belt and can manually unbuckle the seat belt 153, but in some cases, the vehicle management system unbuckles the seat belt 153 before the rider even tries to unbuckle the seat belt.

Figure 22:
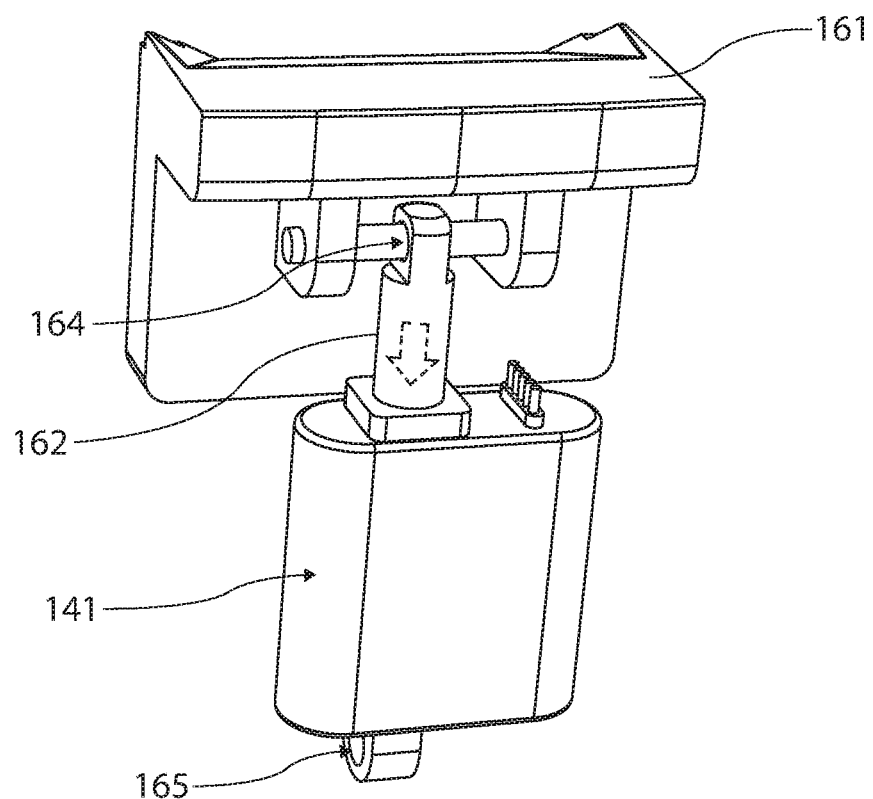

As illustrated in FIGS. 21 and 22, the safety system 170 may further include a first actuator 141 configured to switch the seat belt 153 from the buckled state to the unbuckled state. In some embodiments, the program instructions 76 are configured to send a control signal to the first actuator 141 in response to the smoke detection system 74 detecting the smoke inside the self-driving vehicle 2. In some embodiments, the control signal is configured to cause the first actuator 141 to switch the seat belt 153 from the buckled state to the unbuckled state.

Now, with reference to FIGS. 18 and 20, some embodiments of the safety system 170 include a seat belt sensor 155 configured to detect the buckled state of the seat belt 153. In this regard, the program instructions 76 are configured to cause the vehicle management system to switch the seat belt 153 from the buckled state to the unbuckled state in response to the smoke detection system 74 detecting the smoke inside the self-driving vehicle 2 and the seat belt sensor 155 detecting the buckled state.

Additionally, in some embodiments, the safety system 170 further includes an occupancy sensor 57 configured to detect the rider sitting in the seat 51. In such embodiments, the program instructions 76 are configured to cause the vehicle management system to switch the seat belt 153 from the buckled state to the unbuckled state in response to the smoke detection system 74 detecting the smoke inside the self-driving vehicle 2 and the occupancy sensor 57 detecting the rider sitting in the seat 51.

In some embodiments, the safety system 170 includes both a seat belt sensor 155 and an occupancy sensor 57. In this regard, the program instructions 76 may be configured to cause the vehicle management system to switch the seat belt 153 from the buckled state to the unbuckled state in response to: the smoke detection system 74 detecting the smoke inside the self-driving vehicle 2, the occupancy sensor 57 detecting the rider sitting in the seat 51, and the seat belt sensor 155 detecting the buckled state.

In some embodiments, the seat belt sensor 155 directly detects the buckled state of the seat belt 153. In some embodiments, the seat belt sensor 155 indirectly detects the buckled state of the seat belt 153 by not detecting the unbuckled state (such that the system knows the buckled state is present because the unbuckled state is not detected). If the system detects that the seat belt 153 is not unbuckled, then the system can use that information to determine that the seat belt 153 is buckled.

Danger is inherent when traveling by vehicle. This danger can be worsened based upon the speed that a vehicle is traveling. Accordingly, various safety systems are arranged and configured to keep riders safely buckled in their seat 51 if the self-driving vehicle 2 is traveling above various speed thresholds, such as 30 miles per hour. With reference to FIG. 9, in some embodiments, the safety system 170 includes a speed detection system 134. Accordingly, the program instructions 76 may be configured to cause the vehicle management system to automatically switch the seat belt 153 from the buckled state to the unbuckled state in response to the smoke detection system 74 detecting the smoke inside the self-driving vehicle 2 and the speed detection system 134 determining that the self-driving vehicle 2 is moving at a first speed that is less than a first speed threshold. In some embodiments, the first speed threshold is less than 30 miles per hour. In some embodiments, the first speed threshold is greater than one mile per hour. In some embodiments, the first speed threshold is less than 30 miles per hour, less than 20 miles per hour, less than 10 miles per hour, greater than 5 miles per hour, and/or greater than one mile per hour. Many different types of speed detection systems can be used. In some embodiments, a self-driving vehicle 2 comprises a speed detection system 134 that enables the speedometer of the self-driving vehicle 2 to display a speed of the vehicle 2. In some embodiments, the safety system 170 uses GPS data (e.g., including locations of the vehicle every second) to calculate the speed of the self-driving vehicle 2.

As shown in FIGS. 15 and 16, in some embodiments, the self-driving vehicle comprises a door 130, a door lock 132 configured to impede opening the door 130, and a door lock actuator 139 configured to arrange the door lock 132 to an unlocked state. The program instructions 76 may thereby be configured to cause the door lock actuator 139 to unlock the door 130 in response to the smoke detection system 74 detecting the smoke inside the self-driving vehicle 2.

Additionally, in some embodiments, the self-driving vehicle 2 further includes a door actuator 135 configured to at least partially open the door 130. In some embodiments, the program instructions are configured to cause the door actuator 135 to at least partially open the door 130 in response to the smoke detection system 74 detecting the smoke inside the self-driving vehicle 2, and the safety system 170 further comprises a speed detection system 134, and the program instructions are configured to cause the vehicle management system to switch the seat belt 153 from the buckled state to the unbuckled state in response to the smoke detection system 74 detecting the smoke inside the self-driving vehicle 2 and the speed detection system 134 determining that the self-driving vehicle 2 is moving at a first speed that is less than a first speed threshold. The program instructions 76 may thereby be configured to cause the door actuator 135 to at least partially open the door 130 in response to the smoke detection system 74 detecting the smoke inside the self-driving vehicle 2 and the speed detection system 134 determining that the self-driving vehicle 2 is moving at a second speed that is less than a second speed threshold. In some embodiments, the second speed threshold is less than 15 miles per hour, less than 10 miles per hour, less than 5 miles per hour, greater than 5 miles per hour, and/or greater than one mile per hour. In some embodiments, the first speed threshold is greater than 1 mile per hour and is greater than the second speed threshold.

In some embodiments, the speed threshold for unbuckling a seat belt 153 is less than 30 miles per hour, less than 20 miles per hour, less than 10 miles per hour, greater than 5 miles per hour, and/or greater than 1 mile per hour.

In some embodiments, the speed threshold for opening doors 130 is less than 21 miles per hour, less than 15 miles per hour, less than 5 miles per hour, and/or greater than 1 mile per hour. In some embodiments, the program instructions are not configured to unbuckle the seat belt 153 and/or open the doors 130 until at least a portion (e.g., the speed detection system 134) of the safety system 170 verifies that the vehicle 2 is no longer moving.

In many embodiments, the self-driving vehicle 2 comprises a window 137 and a motor 136 configured to at least partially open the window 137. In some embodiments, in response to the smoke detection system 74 detecting the smoke inside the self-driving vehicle 2 the program instructions 76 are configured to cause the motor 136 to at least partially open the window 137 prior to the seat belt 153 switching from the buckled state to the unbuckled state. For example, if the vehicle 2 is traveling 70 miles per hour, the window 137 might open as soon as the smoke detection system 74 detects smoke, but the seat belt 153 would not unbuckle until the vehicle 2 is going much slower.

In some embodiments, the smoke detection system 74 is configured to detect a concentration of the smoke, which may be indicative of the type of fire. Accordingly, the program instructions 76 are configured to cause the vehicle management system to automatically switch the seat belt 153 from the buckled state to the unbuckled state in response to the smoke detection system 74 detecting the smoke inside the self-driving vehicle 2 and the safety system 170 determining the concentration of the smoke is greater than a predetermined threshold. As used herein, to "switch" the seat belt from the buckled state to the unbuckled state does not necessarily require a physical switch or a mechanical switch.

Furthermore, in some embodiments, the smoke detection system 74 is configured to detect a particle size of the smoke. In this regard, the vehicle management system can be configured to switch the seat belt 153 from the buckled state to the unbuckled state in response to the smoke detection system 74 detecting the smoke inside the self-driving vehicle 2 and the safety system 170 determining the particle size is smaller than a predetermined threshold. Contra, in some embodiments, the vehicle management system can even be configured to switch the seat belt 153 from the buckled state to the unbuckled state in response to the smoke detection system 74 detecting the smoke inside the self-driving vehicle 2 and the safety system 170 determining the particle size is greater than a predetermined threshold.

The system may also be configured to perform dual responses with respect to the smoke particle size detected. In some embodiments, wherein the self-driving vehicle 2 comprises a window 137 and a motor 136 configured to at least partially open the window 137, the smoke detection system 74 is configured to detect a particle size of the smoke, the program instructions 76 are configured to cause the vehicle management system to switch the seat belt 153 from the buckled state to the unbuckled state in response to the safety system 170 determining the particle size is smaller than a first predetermined threshold, and the program instructions 76 are configured to cause the motor 136 to at least partially open the window 137 in response to the safety system 170 determining the particle size is larger than a second predetermined threshold. Even still, in some embodiments, the program instructions 76 are configured to cause the vehicle management system to switch the seat belt 153 from the buckled state to the unbuckled state in response to the safety system 170 determining the particle size is greater than a first predetermined threshold, and the program instructions 76 are configured to cause the motor 136 to at least partially open the window 137 in response to the safety system 170 determining the particle size is smaller than a second predetermined threshold. Generally, it should be appreciated that any combination of events disclosed herein may be caused by the vehicle management system in response to the smoke detection system 74 determining that the particle sizes are greater than or less than the first predetermined threshold or the second predetermined threshold. The second predetermined threshold can be larger than the first predetermined threshold.

Many different ways of detecting particle sizes are described herein and/or incorporated by reference. As illustrated in FIGS. 10, 11, and 23, the smoke detection system 74 can include an optical smoke detection system 91 that uses several different infrared light wavelengths. The infrared light wavelengths selected for use in the optical smoke detection system 91 can be chosen because they approximately correspond (in length) to particles sizes emitted in vehicle fires.

An optical smoke detector can use a first infrared light wavelength, a second infrared light wavelength (that is longer than the first wavelength), a third infrared light wavelength (that is longer than the second wavelength), and a fourth infrared light wavelength (that is longer than the third wavelength). Optical smoke detectors can sense smoke particles when smoke particles scatter a beam of the infrared light onto a light detector. An optical smoke detection system can detect an indication of smoke particle size by determining which of the first, second, third, and fourth wavelengths were scattered by the smoke particle.

Some fire and/or smoke events may constitute acute dangerous situations while other smoke events pose no immediate danger, but are rather just a nuisance. In some embodiments, wherein the self-driving vehicle 2 comprises a window 137 and a motor 136 configured to at least partially open the window 137, the smoke detection system 74 comprises a camera 24*a* and at least one of an ionization smoke detector 90 and an optical smoke detector 91, wherein the camera 24*a* is configured to take a picture showing at least a portion of the cabin. In such embodiments, the program instructions 76 may be configured to cause the motor 136 to at least partially open the window 137 in response to the safety system 170 determining that the picture shows the smoke, and the program instructions 76 are configured to cause the vehicle management system to switch the seat belt 153 from the buckled state to the unbuckled state in response to at least one of the ionization smoke detector and the optical smoke detector detecting the smoke inside the self-driving vehicle. In some embodiments, program instructions 76 are configured to at least partially open the window 137 in response to at least one of the ionization smoke detector 90 and the optical smoke detector 91 detecting the smoke inside the self-driving vehicle 2.

Elevated temperature may also be an indication of a dangerous situation versus a nuisance. As shown in FIGS. 9, 14, and 23, in some embodiments, the safety system 170 further includes a temperature detection system 110 coupled to the self-driving vehicle 2 and configured to detect a temperature inside at least a portion of the self-driving vehicle 2. Accordingly, in some embodiments, the program instructions 76 are configured to cause the vehicle management system to switch the seat belt 153 from the buckled state to the unbuckled state in response to the smoke detection system 74 detecting the smoke inside the self-driving vehicle and the temperature detection system detecting that the temperature is greater than a predetermined temperature threshold. Conversely, in some embodiments, the program instructions 76 are configured to cause the vehicle management system to leave the seat belt 153 in its existing state (whether buckled or unbuckled) and at least partially open the window 137 in response to the smoke detection system 74 detecting the smoke inside the self-driving vehicle and the temperature detection system detecting that the temperature is lower than a predetermined temperature threshold.

In some embodiments, the temperature detection system 110 comprises a thermal imaging camera. The thermal imaging camera can be an infrared camera made by FLIR Systems, Inc. In some embodiments, the temperature detection system 110 comprises a thermometer.

The safety system 170 may also be configured to react according to various objects located around the self-driving vehicle 2*a*. In some embodiments, the safety system 170 further includes an object detection system configured to detect a second vehicle 2*b* and having at least one of a camera, a radar, and a lidar. In some embodiments, at least one of the camera, the radar, and the lidar is coupled to the self-driving vehicle 2 to enable the objection detection system to detect the second vehicle 2*b*, and the program instructions 76 are configured to cause the vehicle management system to switch the seat belt 153 from the buckled state to the unbuckled state in response to the smoke detection system 74 detecting the smoke inside the self-driving vehicle 2*a* and in response to at least one of: the object detection system detecting that the second vehicle 2*b* is at least a predetermined distance from the self-driving vehicle 2*a*, the object detection system detecting that the second vehicle 2*b* is not on a collision course with the self-driving vehicle 2*a*, and the vehicle management system determining, based on data from the object detection system, that the second vehicle 2*b* has less than a predetermined risk threshold of colliding with the self-driving vehicle 2*a*.

In some embodiments, the program instructions 76 are configured to automatically switch the seat belt 153 from the buckled state to the unbuckled state in response to the smoke detection system 74 detecting the smoke inside the self-driving vehicle 2 and the safety system 170 receiving a verification input 171 from a rider. The verification input 171 is configured to confirm a presence of the smoke in the self-driving vehicle 2.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

The self-driving vehicle 2 can be any suitable vehicle. For example, the self-driving vehicle 2 can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle 2 can also be a Waymo car. Waymo was formerly the Google self-driving car project. Waymo, which is owned by Alphabet Inc., has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real world driving data. In some embodiments, self-driving vehicles sometimes drive themselves, sometimes are driven remotely by a computer system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive (e.g., steer and control speed) itself (e.g., in response to a destination requested by the human).

The remote computing device 12 can be a smartphone, a tablet computer, a laptop computer, a desktop computer, a server, augmented reality glasses, an implanted computer, and/or any type of computer. A rider can bring her remote computing device 12 into the self-driving vehicle 2 and then can leave the self-driving vehicle 2 with her remote computing device 12. In some embodiments, the rider requests a ride at her home with a remote computing device 12, but then leaves the remote computing device 12 at home when she goes to get a ride from the vehicle 2.

In some embodiments, the remote computing device 12 is an iPhone made by Apple Inc. or an Android phone based on software made by Alphabet Inc. The remote computing device 12 can comprise a speaker configured to emit sounds, a microphone configured to record sounds, and a display screen configured to display images. The remote computing device 12 can comprise a battery configured to provide electrical power to operate the remote computing device 12.

In some embodiments, portions of the vehicle management system 65 can be physically coupled to the self-driving vehicle 2 while other others of the vehicle management system 65 are not physically coupled to the vehicle 2 and are located remotely relative to the vehicle 2.

In some embodiments, at least a portion of the vehicle management system 65 is located in the vehicle 2. In several embodiments, at least a portion of the vehicle management system 65 is located remotely relative to the vehicle 2. The vehicle management system 65 can comprise many servers, computers, and vehicles. The vehicle management system 65 can comprise cloud computing and cloud storage.

In several embodiments, the entire vehicle management system 65 is located in the self-driving vehicle 2. The vehicle 2 can comprise the vehicle management system 65. In some embodiments, a first portion of the vehicle management system 65 is physically coupled to the vehicle 2, and a second portion of the vehicle management system 65 is not physically coupled to the vehicle 2. The second portion can be located remotely relative to the vehicle 2. In several embodiments, the entire vehicle management system 65 is located remotely relative to the vehicle 2.

The phrase "communicatively coupling" can include any type of direct and/or indirect coupling between the self-driving vehicle 2, remote computing device 12, and vehicle management system 65. For example, the remote computing device 12 can be communicatively coupled to the vehicle management system 65 via servers, the Cloud, the Internet, satellites, Wi-Fi networks, cellular networks, and any other suitable communication means.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps are installed directly on remote computing devices, whereby developers create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A safety system comprising:
    a self-driving vehicle configured to transport a rider;
    a vehicle management system configured to autonomously drive the self-driving vehicle;
    a seat coupled to the self-driving vehicle;
    a seat belt configured to alternatively have a buckled state and an unbuckled state, wherein in the buckled state the seat belt is configured to secure the rider in the seat and in the unbuckled state the seat belt is configured to enable the rider to exit the seat;
    a smoke detection system coupled to the self-driving vehicle and configured to detect smoke inside a cabin of the self-driving vehicle; and
    at least one processor and at least one memory having program instructions that when executed by the at least one processor are configured to cause the vehicle management system to switch the seat belt from the buckled state to the unbuckled state in response to the smoke detection system detecting the smoke inside the self-driving vehicle.

2. The safety system of claim 1, further comprising a first actuator configured to switch the seat belt from the buckled state to the unbuckled state, wherein the program instructions are configured to send a control signal to the first actuator in response to the smoke detection system detecting the smoke inside the self-driving vehicle, wherein the control signal is configured to cause the first actuator to switch the seat belt from the buckled state to the unbuckled state.

3. The safety system of claim 1, further comprising a seat belt sensor configured to detect the buckled state of the seat belt, wherein the program instructions are configured to cause the vehicle management system to switch the seat belt from the buckled state to the unbuckled state in response to the smoke detection system detecting the smoke inside the self-driving vehicle and the seat belt sensor detecting the buckled state.

4. The safety system of claim 1, further comprising an occupancy sensor configured to detect the rider sitting in the seat, wherein the program instructions are configured to cause the vehicle management system to switch the seat belt from the buckled state to the unbuckled state in response to the smoke detection system detecting the smoke inside the self-driving vehicle and the occupancy sensor detecting the rider sitting in the seat.

5. The safety system of claim 4, further comprising a seat belt sensor configured to detect the buckled state of the seat belt, wherein the program instructions are configured to cause the vehicle management system to switch the seat belt from the buckled state to the unbuckled state in response to
    the smoke detection system detecting the smoke inside the self-driving vehicle,
    the occupancy sensor detecting the rider sitting in the seat, and
    the seat belt sensor detecting the buckled state.

6. The safety system of claim 1, further comprising a speed detection system, wherein the program instructions are configured to cause the vehicle management system to automatically switch the seat belt from the buckled state to the unbuckled state in response to the smoke detection system detecting the smoke inside the self-driving vehicle and the speed detection system determining that the self-driving vehicle is moving at a first speed that is less than a first speed threshold, wherein the first speed threshold is less than 30 miles per hour.

7. The safety system of claim 6, wherein the first speed threshold is greater than one mile per hour.

8. The safety system of claim 1, wherein the self-driving vehicle comprises a door, a door lock configured to impede opening the door, and a door lock actuator configured to arrange the door lock to an unlocked state, wherein the program instructions are configured to cause the door lock actuator to unlock the door in response to the smoke detection system detecting the smoke inside the self-driving vehicle.

9. The safety system of claim 8, wherein the self-driving vehicle comprises a door actuator configured to at least partially open the door, and the program instructions are configured to cause the door actuator to at least partially open the door in response to the smoke detection system detecting the smoke inside the self-driving vehicle.

10. The safety system of claim 1, wherein the self-driving vehicle comprises a door and a door actuator configured to at least partially open the door, and the program instructions are configured to cause the door actuator to at least partially open the door in response to the smoke detection system detecting the smoke inside the self-driving vehicle,
    wherein the safety system further comprises a speed detection system, and the program instructions are configured to cause the vehicle management system to switch the seat belt from the buckled state to the unbuckled state in response to the smoke detection system detecting the smoke inside the self-driving vehicle and the speed detection system determining that the self-driving vehicle is moving at a first speed that is less than a first speed threshold, wherein the first speed threshold is less than 30 miles per hour, and the program instructions are configured to cause the door actuator to at least partially open the door in response to the smoke detection system detecting the smoke inside the self-driving vehicle and the speed detection system determining that the self-driving vehicle is moving at a second speed that is less than a second speed threshold, wherein the second speed threshold is less than 15 miles per hour.

11. The safety system of claim 10, wherein the first speed threshold is greater than 1 mile per hour and is greater than the second speed threshold.

12. The safety system of claim 1, wherein the self-driving vehicle comprises a window and a motor configured to at least partially open the window, wherein in response to the smoke detection system detecting the smoke inside the self-driving vehicle the program instructions are configured to cause the motor to at least partially open the window prior to the seat belt switching from the buckled state to the unbuckled state.

13. The safety system of claim 1, wherein the smoke detection system is configured to detect a concentration of the smoke, and the program instructions are configured to cause the vehicle management system to automatically switch the seat belt from the buckled state to the unbuckled state in response to the smoke detection system detecting the smoke inside the self-driving vehicle and the safety system determining the concentration of the smoke is greater than a predetermined threshold.

14. The safety system of claim 1, wherein the smoke detection system is configured to detect a particle size of the smoke, and the vehicle management system is configured to switch the seat belt from the buckled state to the unbuckled state in response to the smoke detection system detecting the smoke inside the self-driving vehicle and the safety system determining the particle size is smaller than a predetermined threshold.

15. The safety system of claim 1, wherein the self-driving vehicle comprises a window and a motor configured to at least partially open the window, the smoke detection system is configured to detect a particle size of the smoke, the program instructions are configured to cause the vehicle management system to switch the seat belt from the buckled state to the unbuckled state in response to the safety system determining the particle size is smaller than a first predetermined threshold, and the program instructions are configured to cause the motor to at least partially open the window in response to the safety system determining the particle size is larger than a second predetermined threshold.

16. The safety system of claim 1, wherein the self-driving vehicle comprises a window and a motor configured to at least partially open the window, the smoke detection system comprises a camera and at least one of an ionization smoke detector and an optical smoke detector, wherein the camera is configured to take a picture showing at least a portion of the cabin, the program instructions are configured to cause the motor to at least partially open the window in response to the safety system determining that the picture shows the smoke, and the program instructions are configured to cause the vehicle management system to switch the seat belt from the buckled state to the unbuckled state in response to at least one of the ionization smoke detector and the optical smoke detector detecting the smoke inside the self-driving vehicle.

17. The safety system of claim 1, further comprising a temperature detection system coupled to the self-driving vehicle and configured to detect a temperature inside at least a portion of the self-driving vehicle, wherein the program instructions are configured to cause the vehicle management system to switch the seat belt from the buckled state to the unbuckled state in response to the smoke detection system detecting the smoke inside the self-driving vehicle and the temperature detection system detecting that the temperature is greater than a predetermined temperature threshold.

18. The safety system of claim 17, wherein the temperature detection system comprises a thermal imaging camera.

19. The safety system of claim 1, further comprising an object detection system configured to detect a second vehicle and having at least one of a camera, a radar, and a lidar, wherein at least one of the camera, the radar, and the lidar is coupled to the self-driving vehicle to enable the objection detection system to detect the second vehicle, and the program instructions are configured to cause the vehicle management system to switch the seat belt from the buckled state to the unbuckled state in response to the smoke detection system detecting the smoke inside the self-driving vehicle and in response to the object detection system detecting that the second vehicle is at least a predetermined distance from the self-driving vehicle.

20. The safety system of claim 1, further comprising an object detection system configured to detect a second vehicle and having at least one of a camera, a radar, and a lidar, wherein at least one of the camera, the radar, and the lidar is coupled to the self-driving vehicle to enable the objection detection system to detect the second vehicle, and the program instructions are configured to cause the vehicle management system to switch the seat belt from the buckled state to the unbuckled state in response to the smoke detection system detecting the smoke inside the self-driving vehicle and in response to the object detection system detecting that the second vehicle is not on a collision course with the self-driving vehicle.

21. The safety system of claim 1, further comprising an object detection system configured to detect a second vehicle and having at least one of a camera, a radar, and a lidar, wherein at least one of the camera, the radar, and the lidar is coupled to the self-driving vehicle to enable the objection detection system to detect the second vehicle, and the program instructions are configured to cause the vehicle management system to switch the seat belt from the buckled state to the unbuckled state in response to the smoke detection system detecting the smoke inside the self-driving vehicle and in response to the vehicle management system determining, based on data from the object detection system, that the second vehicle has less than a predetermined risk threshold of colliding with the self-driving vehicle.

22. The safety system of claim 1, wherein the self-driving vehicle comprises a door and a door actuator configured to at least partially open the door, and the program instructions are configured to cause the door actuator to at least partially open the door in response to the smoke detection system detecting the smoke inside the self-driving vehicle.

23. The safety system of claim 1, further comprising a speed detection system, wherein the program instructions are configured to cause the vehicle management system to switch the seat belt from the buckled state to the unbuckled state in response to the smoke detection system detecting the smoke inside the self-driving vehicle and the speed detection system determining that the self-driving vehicle is moving at a first speed that is less than a first speed threshold.

24. The safety system of claim 23, wherein the first speed threshold is less than 10 miles per hour.

25. The safety system of claim 1, further comprising a speed detection system,
   wherein the self-driving vehicle comprises a door, a door lock configured to impede opening the door, and a door lock actuator configured to arrange the door lock to an unlocked state,
   wherein the program instructions are configured to cause the door lock actuator to unlock the door in response to the smoke detection system detecting the smoke inside the self-driving vehicle and in response to the speed detection system determining that the self-driving vehicle is moving at a first speed that is less than a first speed threshold, wherein the first speed threshold is less than 30 miles per hour.

26. The safety system of claim 25, wherein the program instructions are configured to cause the vehicle management system to switch the seat belt from the buckled state to the unbuckled state in response to the smoke detection system detecting the smoke inside the self-driving vehicle and the speed detection system determining that the self-driving vehicle is moving at a second speed that is less than a second speed threshold, wherein the second speed threshold is less than 30 miles per hour, and
   wherein the self-driving vehicle comprises a door actuator configured to at least partially open the door, and the program instructions are configured to cause the door actuator to at least partially open the door in response to the smoke detection system detecting the smoke inside the self-driving vehicle and the speed detection system determining that the self-driving vehicle is moving at a third speed that is less than a third speed threshold, wherein the third speed threshold is less than 15 miles per hour.

\* \* \* \* \*